United States Patent
Lee et al.

(10) Patent No.: US 11,483,673 B2
(45) Date of Patent: Oct. 25, 2022

(54) METHOD OF WIRELESSLY CONNECTING DEVICES, AND DEVICE THEREOF

(71) Applicant: Samsung Electronics Co., Ltd., Suwon-si (KR)

(72) Inventors: Kang-min Lee, Hwaseong-si (KR); Hyun-geun Jo, Seoul (KR); Hyung-rae Cho, Seoul (KR); Gi-ppeum Choi, Suwon-si (KR); Jae-keun Na, Suwon-si (KR); Young-eun Lee, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 16/838,733

(22) Filed: Apr. 2, 2020

(65) Prior Publication Data

US 2020/0236502 A1 Jul. 23, 2020

Related U.S. Application Data

(63) Continuation of application No. 14/989,307, filed on Jan. 6, 2016.

(30) Foreign Application Priority Data

| Jan. 7, 2015 | (KR) | .......................... | 10-2015-0002021 |
| Jun. 12, 2015 | (KR) | .......................... | 10-2015-0083665 |

(51) Int. Cl.
*H04W 4/02* (2018.01)
*H04M 11/00* (2006.01)

(52) U.S. Cl.
CPC ........... *H04W 4/026* (2013.01); *H04M 11/00* (2013.01)

(58) Field of Classification Search
CPC .............................. H04W 4/026; H04M 11/00
See application file for complete search history.

(56) References Cited

U.S. PATENT DOCUMENTS

| 8,213,917 B2 | 7/2012 | Anderl |
| 8,260,324 B2 | 9/2012 | Jantunen et al. |
| 8,295,766 B2 | 10/2012 | Zimbric et al. |
| 8,312,392 B2 | 11/2012 | Forutanpour et al. |

(Continued)

FOREIGN PATENT DOCUMENTS

| CN | 101682837 A | 3/2010 |
| EP | 2293531 A1 | 3/2011 |

(Continued)

OTHER PUBLICATIONS

Chinese Office Action dated Dec. 4, 2019, issued in Chinese Patent Application No. 201680014380.1.

(Continued)

*Primary Examiner* — Steven S Kelley
(74) *Attorney, Agent, or Firm* — Jefferson IP Law, LLP

(57) ABSTRACT

A method of wirelessly connecting a first device to a target device is provided. The method includes searching for at least one device located in an orientation region of the first device, when a first input signal is received, determining the target device based on a direction that the first device is oriented, performing a wireless connection with the target device, and determining whether to maintain the wireless connection with the target device, when a second input signal is received.

14 Claims, 51 Drawing Sheets

(56) References Cited

U.S. PATENT DOCUMENTS

| | | | |
|---|---|---|---|
| 8,457,651 B2* | 6/2013 | Forutanpour | G06F 3/017 |
| | | | 455/456.1 |
| 8,525,868 B2 | 9/2013 | Forutanpour et al. | |
| 9,058,477 B2 | 6/2015 | Flack et al. | |
| 9,886,100 B2* | 2/2018 | Jung | G06F 1/1652 |
| 10,386,992 B2* | 8/2019 | Shin | H04L 65/403 |
| 2005/0053017 A1* | 3/2005 | Komiya | G08C 17/02 |
| | | | 370/255 |
| 2008/0152263 A1 | 6/2008 | Harrison | |
| 2008/0311957 A1 | 12/2008 | Jantunen et al. | |
| 2009/0140986 A1 | 6/2009 | Karkkainen et al. | |
| 2009/0156123 A1 | 6/2009 | Kim | |
| 2009/0238156 A1 | 9/2009 | Yong et al. | |
| 2009/0291841 A1 | 11/2009 | Ohno et al. | |
| 2009/0320073 A1 | 12/2009 | Reisman | |
| 2010/0160004 A1 | 6/2010 | Alameh et al. | |
| 2010/0161744 A1 | 6/2010 | Kim et al. | |
| 2010/0167646 A1 | 7/2010 | Alameh et al. | |
| 2011/0081923 A1 | 4/2011 | Forutanpour et al. | |
| 2011/0134112 A1 | 6/2011 | Koh et al. | |
| 2011/0237193 A1 | 9/2011 | Shen et al. | |
| 2011/0316790 A1 | 12/2011 | Ollila et al. | |
| 2012/0009924 A1 | 1/2012 | Lee | |
| 2012/0013609 A1 | 1/2012 | Reponen et al. | |
| 2012/0058801 A1* | 3/2012 | Nurmi | G06F 3/011 |
| | | | 455/566 |
| 2013/0217330 A1 | 8/2013 | Gardenfors et al. | |
| 2013/0222266 A1* | 8/2013 | Gardenfors | H04M 1/72412 |
| | | | 345/173 |
| 2013/0288603 A1* | 10/2013 | Iwasaki | H04W 4/80 |
| | | | 455/41.2 |
| 2014/0053115 A1 | 2/2014 | Perski et al. | |
| 2014/0071042 A1 | 3/2014 | Eilat | |
| 2014/0075349 A1 | 3/2014 | Yun et al. | |
| 2014/0149859 A1 | 5/2014 | Van Dyken et al. | |
| 2014/0240225 A1 | 8/2014 | Eilat | |
| 2014/0241215 A1 | 8/2014 | Massover et al. | |
| 2014/0258880 A1 | 10/2014 | Holm et al. | |
| 2014/0304612 A1 | 10/2014 | Collin | |
| 2014/0359493 A1 | 12/2014 | Hong et al. | |
| 2014/0365580 A1* | 12/2014 | Azenkot | H04W 4/026 |
| | | | 709/205 |
| 2015/0163542 A1* | 6/2015 | Kashyap | G06V 10/10 |
| | | | 725/12 |
| 2015/0237493 A1* | 8/2015 | Won | G06F 3/0488 |
| | | | 715/734 |
| 2015/0254036 A1* | 9/2015 | Konishi | G06F 3/123 |
| | | | 358/1.13 |
| 2015/0278534 A1* | 10/2015 | Thiyagarajan | G06F 21/84 |
| | | | 726/28 |
| 2015/0373016 A1 | 12/2015 | Gupta et al. | |

FOREIGN PATENT DOCUMENTS

| | | |
|---|---|---|
| KR | 10-2009-0121195 A | 11/2009 |
| KR | 10-2010-0070765 A | 6/2010 |
| KR | 10-2011-0091570 A | 8/2011 |
| KR | 10-2012-0062014 A | 6/2012 |
| KR | 10-2012-0068646 A | 6/2012 |
| KR | 10-2013-0061711 A | 6/2013 |
| KR | 10-2014-0140957 A | 12/2014 |
| WO | 2006/120596 A2 | 11/2006 |
| WO | 2013/154476 A1 | 10/2013 |

OTHER PUBLICATIONS

Naver; Smart TV market behavior recognition . . . 131% annual growth until 2018; http://news.naver.com/main/tool/prinl.nhn?oid=138&aid=0002023264; Nov. 3, 2014.

Georgios Marentakis et al.,"A Study on Gestural Interaction with a 3D Audio Display", XP055202348, Jan. 1, 2004.

European Office Action dated Jun. 2, 2020, issued in European Patent Application No. 16735177.4-1213.

Korean Office Action dated May 12, 2021, issued in Korean Patent Application No. 10-2015-0083665.

Chinese Office Action dated Mar. 16, 2021, issued in Chinese Patent Application No. 201680014380.1.

Chinese Notification of Reexamination with English translation dated May 30, 2022; Chinese Patent Application No. 201680014380.1.

\* cited by examiner

FIG. 18
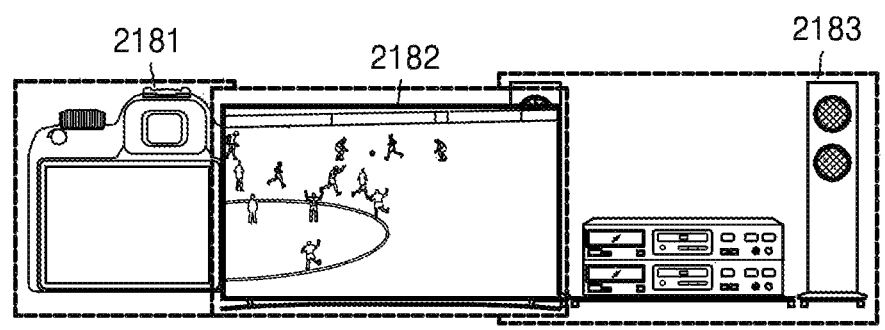
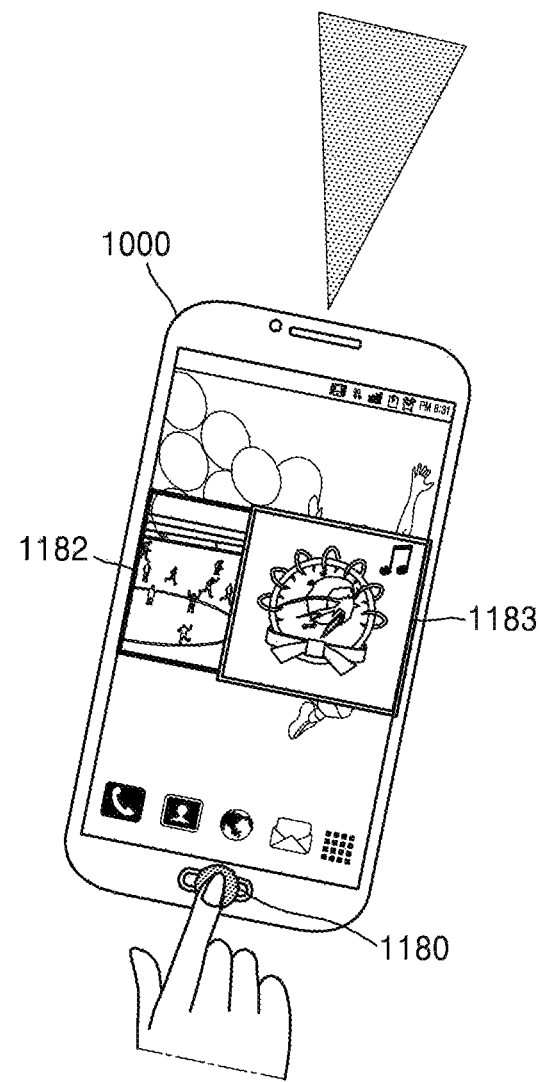

FIG. 19
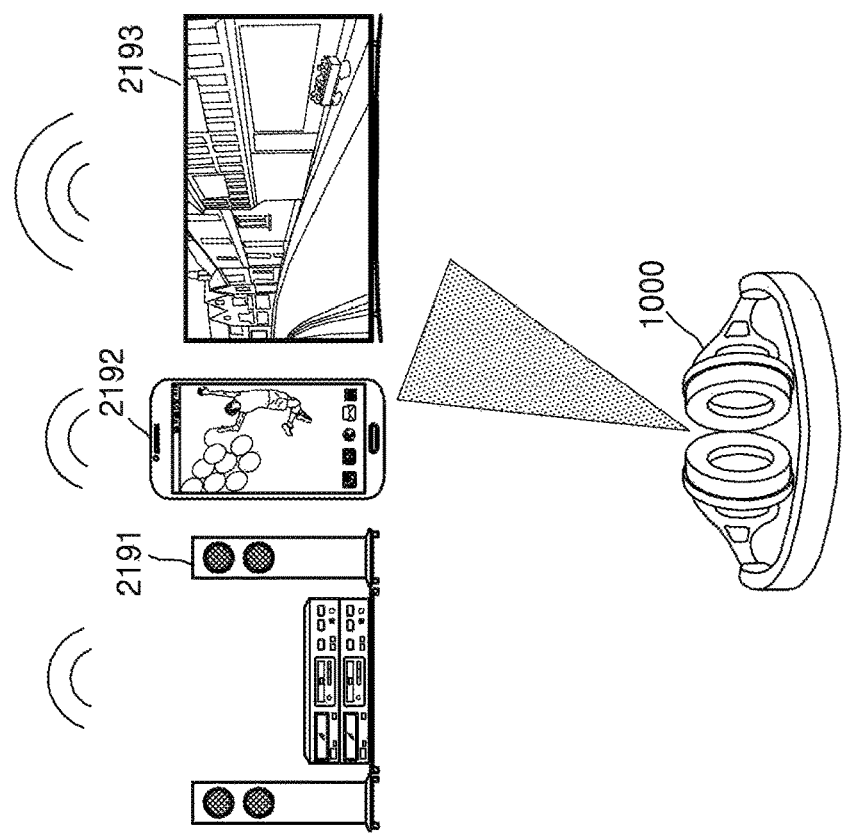
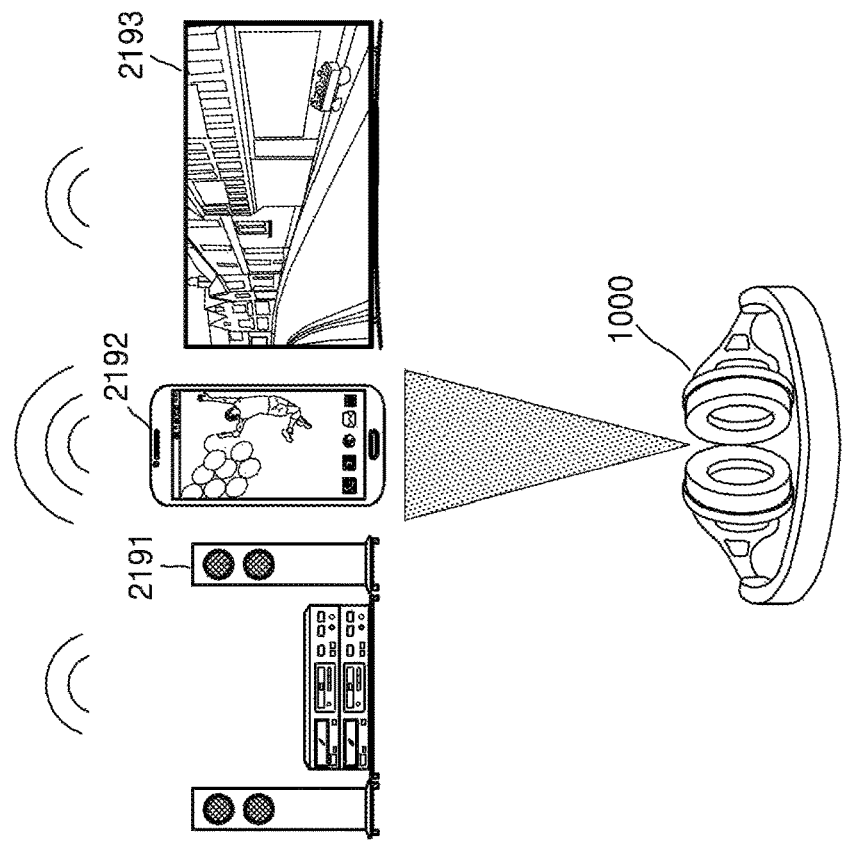

FIG. 21
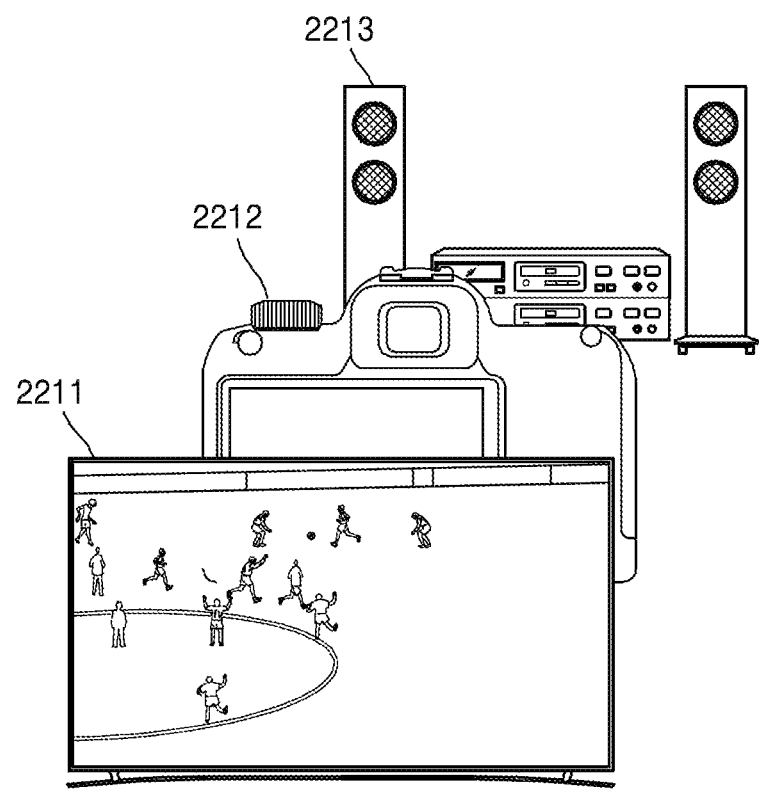
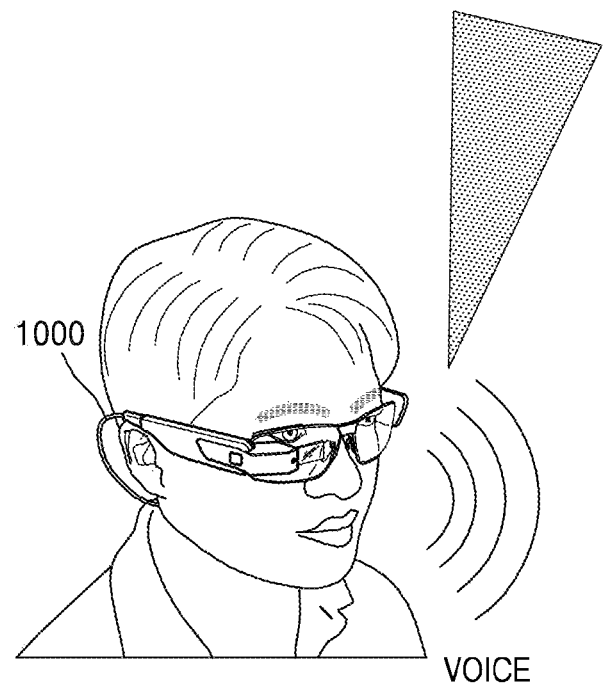

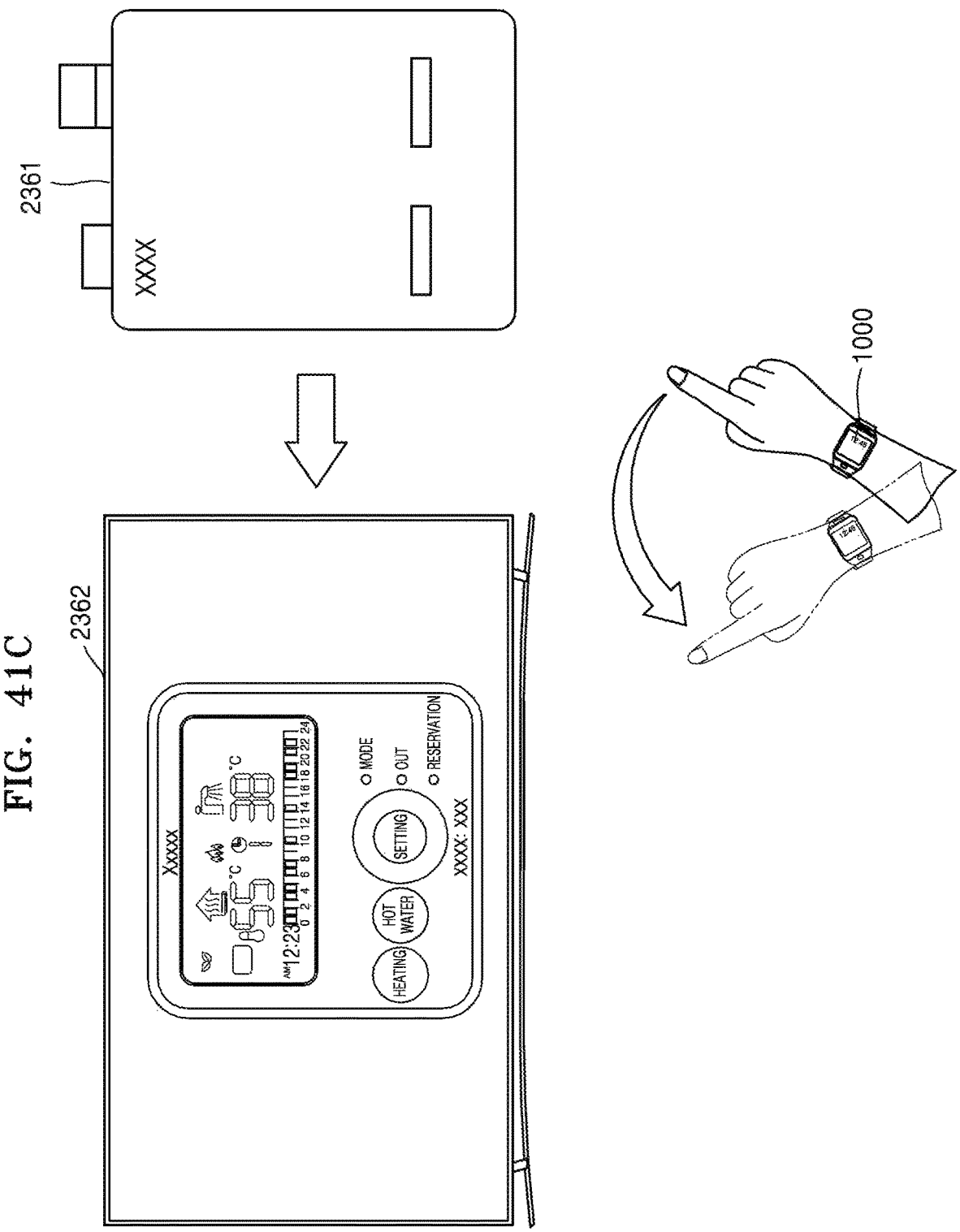

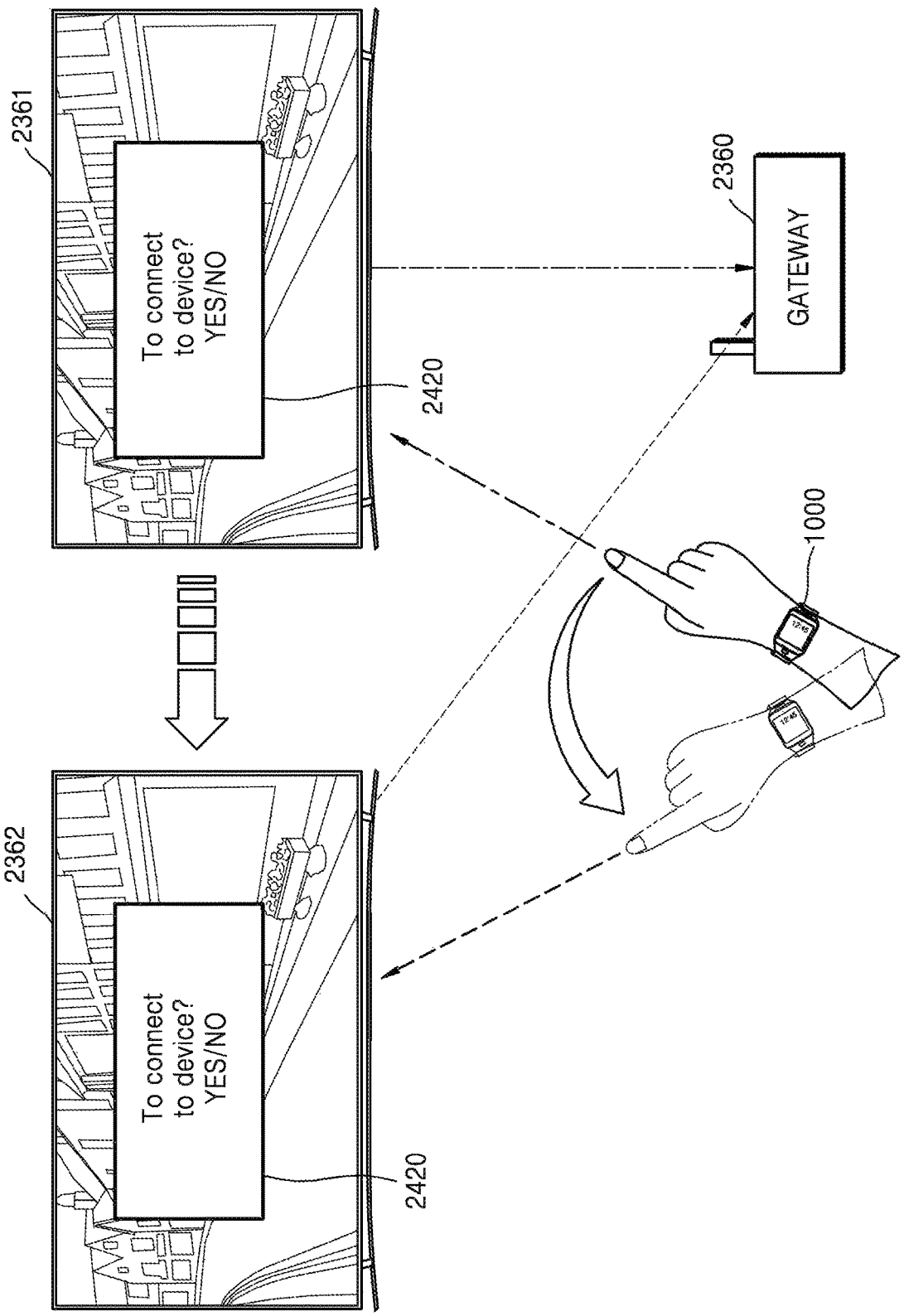

METHOD OF WIRELESSLY CONNECTING DEVICES, AND DEVICE THEREOF

CROSS-REFERENCE TO RELATED PATENT APPLICATION(S)

This application is a continuation application of prior application Ser. No. 14/989,307, filed on Jan. 6, 2016, which claims the benefit under 35 U.S.C. § 119(a) of a Korean patent application filed on Jan. 7, 2015 in the Korean Intellectual Property Office and assigned Serial Number 10-2015-0002021, and of a Korean patent application filed on Jun. 12, 2015 in the Korean Intellectual Property Office and assigned Serial Number 10-2015-0083665, the entire disclosure of each of which is incorporated hereby incorporated by reference.

TECHNICAL FIELD

Background

The present disclosure relates to a method of wirelessly connecting a plurality of devices.

With developments in technology, electronic devices have become more compact and light. Electronic devices that have various shapes such as smart watches or smart glasses are being developed. Smart watches are embedded system watches having enhanced functions compared with general watches. Smart glasses include a wearable computer with a head mounted display (HMD). Wearable devices may be classified into standalone devices or interoperable devices. Standalone devices include input/output devices, computing devices, storage devices, communication devices, and the like, and may be used independently. Interoperable devices can be used after being connected to a separate device such as a smartphone.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. As electronic devices become more compact and light, there is an increased need for content sharing and linkage services between the devices. Accordingly, an aspect of the present disclosure is to provide methods of performing a wireless connection with a target device located in a front direction of a device, by which the device may be intuitively connected to a target device that the device faces to be connected thereto, by using the directivity of beamforming technology and a front direction that is determined according to usage behavioral characteristics that are naturally generated due to the characteristics of a form factor.

Additional aspects will be set forth in part in the description which follows and, in part, will be apparent from the description, or may be learned by practice of the presented embodiments.

In accordance with an aspect of the present disclosure, a method of wirelessly connecting a first device to a target device is provided. The method includes searching for at least one device located in an orientation region of the device, when a first input signal is received, determining the target device based on a direction that the first device is oriented, performing a wireless connection with the target device, and determining whether to maintain the wireless connection with the target device, when a second input signal is received.

The determining of whether to maintain the wireless connection with the target device may include receiving content from the target device, and outputting the content.

The determining of whether to maintain the wireless connection with the target device may include receiving first content from the target device and second content from another target device, and mixing the first and second content based on a distance between the target device, the other target device, and the directions of the target device and the other target device with respect to the first device, and outputting the mixed content.

The first input signal corresponds to pushing and holding of a button included in the device, and the second input signal corresponds to releasing of the button.

The determining of whether to maintain the wireless connection with the target device may include recognizing at least one of a touch input of a user, a gesture of the user, a voice of the user, an eye direction of the user, and a device motion, and determining whether to maintain the wireless connection with the target device.

The searching for the at least one device located in an orientation region of the device comprises generating a signal using a beamforming method.

When it is determined that the wireless connection with the target device is maintained and when the direction that the first device is oriented changes, the wireless connection with the target device is maintained when the orientation of the first device changes.

The determining of the target device based on a direction that the first device is oriented may include, when a plurality of devices are located in the direction that the first device is oriented, recognizing a gesture and determining the target device based on the gesture.

The determining of whether to maintain the wireless connection with the target device may include, when a plurality of devices are located in the direction that the first device is oriented and when a third input is received, determining whether to maintain a wireless connection with another target device from the plurality of devices.

The determining of whether to maintain the wireless connection with the other target device further comprises providing a user interface for controlling data of the target device and the other target device.

The determining of whether to maintain the wireless connection with the target device may include determining content that is reproducible by the first device, and receiving the content from the target device.

The determining of whether to maintain the wireless connection with the target device comprises providing a user interface for controlling the target device.

The determining of whether to maintain the wireless connection with the target device comprises controlling the target device to provide an alarm.

The determining of whether to maintain the wireless connection with the target device comprises receiving preview content from the target device.

The method may further include, when it is determined that the wireless connection with the target device is maintained, performing authentication between the first device and the target device, and, when the authentication is completed, receiving authentication content from the target device.

In accordance with an aspect of the present disclosure, a first device is provided. The first device includes a user input device configured to receive user input, a transceiver, and a processor configured to search for at least one device located in an orientation region of the device, when a first input signal is received, determine a target device based on a direction that the first device is oriented, create a wireless connection to the target device, and determine whether to maintain the wireless connection with the target device when the second input signal is received.

The first device may include an output device configured to output content, and the processor may be configured to receive the content from the target device.

The transceiver is configured to receive first content from the target device and second content from another target device, and the processor may mix the first and second content based on a distance between the target device, the other target device, and the directions of the target device and the other target device with respect to the first device, and output the mixed content.

When a plurality of devices are located in the direction that the first device is oriented and when a third input is received, it may be determined whether to maintain a wireless connection with another target device from the from the plurality of devices.

In accordance with an aspect of the present disclosure, a method of sharing content between a target device and a first device is provided. The method includes detecting a trigger motion by the first device, determining orientation directions by using the detected trigger motion, identifying a first target device and a second target device based on the orientation directions, determining a sequence for content sharing between the first target device and the second target device, sequentially transmitting a beam to the first target device and the second target device based on the sequence, and requesting the first target device to transmit content to the second target device based on the sequence.

According to an aspect of the present disclosure, a non-transitory computer-readable recording medium has recorded thereon a computer program, which, when executed by a computer, performs the method.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which:

FIG. 18 illustrates an example of a wireless connecting method when a plurality of target devices are located in a front direction of a device according to various embodiments of the present disclosure;

FIG. 19 illustrates another example of a wireless connecting method when a plurality of target devices are located in a front direction of a device according to various embodiments of the present disclosure;

FIG. 21 illustrates another example of a wireless connecting method when a plurality of target devices are located in a front direction of a device according to various embodiments of the present disclosure;

FIGS. 41A to 42 illustrate performing a wireless connection between target devices by using a device according to various embodiments of the present disclosure;

Throughout the drawings, it should be noted that like reference numbers are used to depict the same or similar elements, features, and structures.

DETAILED DESCRIPTION

Figure 1:
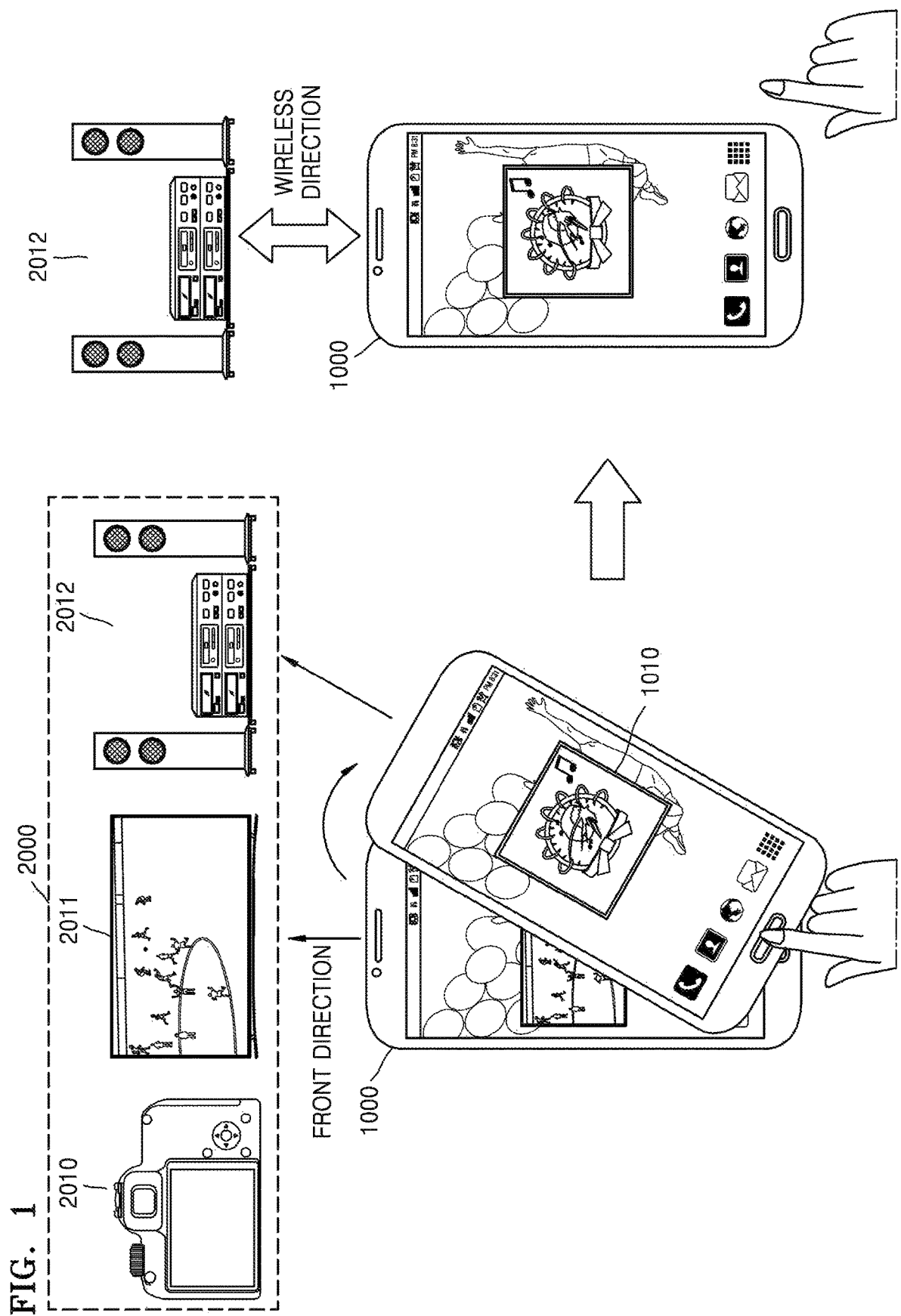
FIG. 1 illustrates an example of a wireless connection between a device and a target device according to various embodiments of the present disclosure.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

As used herein, the term "and/or" includes any and all combinations of one or more of the associated listed items. Expressions such as "at least one of," when preceding a list of elements, modify the entire list of elements and do not modify the individual elements of the list.

The above-described objectives, features, and merits of the present disclosure will be more apparent via the following detailed description in connection with the accompanying drawings. The present disclosure may, however, be embodied in many different forms and should not be construed as being limited to the various embodiments set forth herein. Rather, these embodiments are provided so that this disclosure will be thorough and complete, and will fully convey the scope of the inventive concept to one of ordinary skill in the art. Like reference numerals in the drawings basically denote like elements. In the description of the present disclosure, certain detailed explanations of related-art functions or structures are omitted when it is deemed that they may unnecessarily obscure the essence of the disclosure. While such terms as "first," "second," etc., may be used to describe various components, such components must not be limited to the above terms. The above terms are used only to distinguish one component from another.

Electronic devices associated with the present disclosure will now be described in more detail with reference to the accompanying drawings. Terms such as " . . . unit" and " . . . module," are used in the following description in consideration of only ease of drafting of the specification, and thus do not have distinct meanings or roles in themselves.

Herein, "an embodiment" of the principles of the present disclosure indicates a specific feature, structure, and characteristic of the present disclosure. Thus, the expression "according to various embodiments" or "according to an embodiment" used in the entire specification do not necessarily indicate the same embodiment.

Examples of a device and a target device described in the specification may include a personal computer (PC), a smart television (TV), a mobile phone, a smartphone, a laptop computer, a digital photographing device, a digital broadcasting terminal, a personal digital assistant (PDA), a portable multimedia player (PMP), a navigation, a keyboard, a mouse, and a wearable device. However, embodiments are not limited thereto, and examples of the device and the target device may include all electronic devices capable of being connected to other devices via wireless communication.

An application described in the specification denotes application software, and may be a program for allowing a computer to actually perform a task according to use purposes. The application may mean software that is executed in an operating system (OS) provided in a device, in a broad sense. Accordingly, the application may be software such as a word processor, a spreadsheet, or a web browser, and may also be a compiler, a linker, or the like. The application is shortened to be referred to as an app.

Throughout the specification, when an element is referred to as being "connected" or "coupled" to another element, it can be directly connected or coupled to the other element, or can be electrically connected or coupled to the other element with intervening elements interposed therebetween. The terms used in the present specification are merely used to describe particular embodiments of the present disclosure, and are not intended to limit the scope of the disclosure. An expression used in the singular encompasses the expression of the plural, unless it has a clearly different meaning in the context. In the present specification, it is to be understood that the terms such as "including," "having," and "comprising" are intended to indicate the existence of the features, numbers, actions, components, parts, or combinations thereof disclosed in the specification, and are not intended to preclude the possibility that one or more other features, numbers, actions, components, parts, or combinations thereof may exist or may be added.

The present disclosure will now be described more fully with reference to the accompanying drawings, in which various embodiments of the disclosure are shown.

FIG. 1 illustrates an example of a wireless connection between a device and a target device according to various embodiments of the present disclosure.

According to various embodiments of the present disclosure, when a first input of a user for wirelessly connecting the device 1000 to at least one target device 2000 is received, content received from the at least one target device 2000 may be provided via the device 1000.

The first input may mean a button input, a touch input, or a voice input. However, embodiments are not limited thereto, and examples of the first input may include inputs via gesture recognition, electromyogram recognition, eye direction recognition, and device motion recognition that may be sensed via a trigger motion for intuitively performing a wireless connection.

For example, when the device 1000 is oriented toward a smart TV 2011 as shown in FIG. 1, content provided by the smart TV 2011 is provided to a user via a screen 1010 of the device 1000 without prior manipulations for searching for and selecting a target device. When the device 1000 changes a front direction thereof and is oriented toward an audio player 2012, content received from the audio player 2012 is provided to the user via an output unit of the device 1000.

The content may mean an image, a screen image, sound, and the like that are reproducible via the device 1000. Embodiments are not limited thereto, and examples of the content may include information and data that may be received from the target device 2000 and provided to a user via the device 1000 when the target device 2000 and the device 1000 have been wirelessly connected to each other.

When a second input of the user is received while content received from the target device 2000 is being provided to the user via the device 1000, the wireless connection between the device 1000 and the target device 2000 that the device 1000 faces is determined. The second input may mean a button input, a touch input, or a voice input. However, embodiments are not limited thereto, and examples of the second input may include inputs via gesture recognition, electromyogram recognition, eye direction recognition, and device motion recognition that may be sensed via a trigger motion for intuitively determining a wireless connection.

For example, when the device 1000 receives the second input while the device 1000 is being oriented toward the audio player 2012, connection with the audio player 2012 is finally maintained. In other words, a wireless connection of the device 1000 to the audio player 2012 that is located in the front direction of the device 1000 during the reception of the second input is determined. When a wireless connection is determined, the device 1000 may receive additional content or may control the audio player 2012. Even when the front direction of the device 1000 is changed, content provided by the other target devices 2010 and 2011 may be no longer received.

The front direction of the device 1000 may be determined using the directivity of beamforming technology, and usage behavioral characteristics that are naturally generated due to the characteristics of a form factor. Accordingly, the user may intuitively perform a wireless connection via only an operation of facing the target device 2000 that is to be wirelessly connected to the device 1000.

In another example, the device 1000 controls the target devices 2010 and 2011 such that the target devices 2010 and 2011 may share content with each other. In detail, as the device 1000 senses a trigger motion of the user (for example, a change in the front direction while the first input is maintained), the device 1000 sequentially transmits a beam to at least one target device, namely, the target devices 2011 and 2012, corresponding to the trigger motion, such that wireless communication between the target devices 2011 and 2012 may be performed.

Alternatively, the target devices 2011 and 2012 that have received beams from the device 1000 may transmit beam-receiving confirmation signals to a gateway (not shown) and the gate way may control a wireless connection between the target devices 2011 and 2012, based on the beam-receiving confirmation signals.

Figure 2:
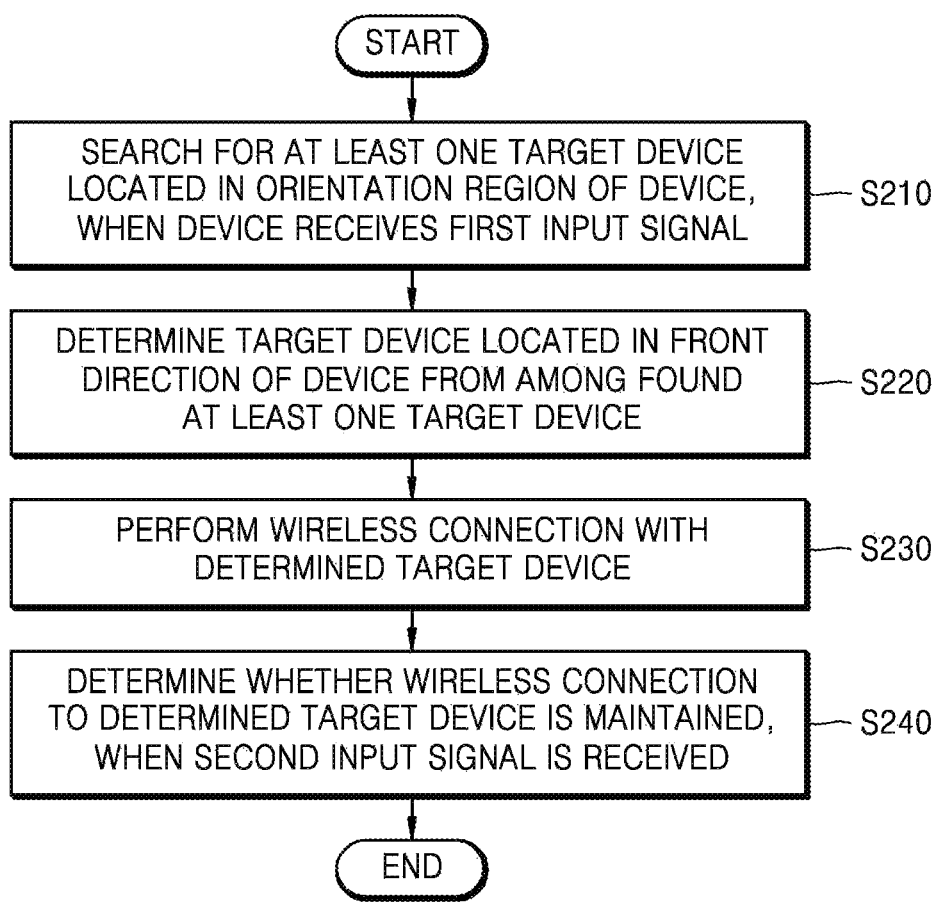
FIG. 2 is a flowchart of a method for wirelessly connecting a device with a target device based on an orientation direction of the device according to various embodiments of the present disclosure.

FIG. 2 is a flowchart of a method for wirelessly connecting a device with a target device based on an orientation direction of the device according to various embodiments of the present disclosure.

Referring to FIG. 2, in operation S210, as the device 1000 receives a first input signal, the device 1000 searches for at least one target device 2000 located in an orientation region of the device 1000. For example, the orientation region may mean a region in a 180-degree direction of the front of the device 1000. However, the angle of the orientation region is not limited to 180 degrees.

In operation S220, the device 1000 may determine a target device located in a front direction of the device 1000 from among the found at least one target device 2000. For example, the device 1000 may receive device information including direction (angle) information from the found at least one target device 2000. Thus, the device 1000 may determine, as the target device located in the orientation direction, a target device located most directly in front of the device 1000 from among the found target devices, by using the received direction information. A method of receiving the direction information from the found target devices may be easily implemented by one of ordinary skill in the art to which the present embodiment pertains, in view of beamforming technology included in wireless gigabits (WiGig) communication standard technology, and thus a detailed description thereof will be omitted herein. The front direction may denote a specific angle within which an antenna direction of the device 1000 and an antenna direction of the target device 2000 range.

In operation S230, the device 1000 may perform a wireless connection with the determined target device. The wireless connection may denote a state in which the device 1000 and a target device are capable of data transmission and reception based on a wireless communication standard such as wireless-fidelity (Wi-Fi), WiGig, or Bluetooth. For example, the wireless connection may include pairing based on the Bluetooth communications standard. Thus, when the device 1000 is wirelessly connected with the determined target device, the device 1000 may receive content from the target device and output the received content. For example the device 1000 may receive sound content from the target device and output the received content via a speaker.

In operation S240, as a second input signal is received, the device 1000 may determine whether the wireless connection to the determined target device is maintained. For example, when the device 1000 performs wireless connection with a target device corresponding to the front direction from among the found at least one target device in real time but the second input signal is not received and the front direction is changed, the current wireless connection with the target device may be disconnected, and the device 1000 may perform a wireless connection with a target device that is newly determined to be located in the front direction. On the other hand, when the second input signal is received while the device 1000 is being wirelessly connected to the determined target device and is receiving content, the current a wireless connection with the determined target device is determined to be maintained. Accordingly, once a wireless connection between a wireless target device and the device 1000 is determined according to the second input signal, the wireless connection is maintained even when the front direction of the device 1000 is changed. The first input signal and the second input signal may include a button input, a touch input, a gesture, a voice, an eye direction, and device-motion recognition. Although the first input signal and the second input signal are distinguished from each other in the aforementioned embodiment of the present disclosure, embodiments of the present disclosure are not limited thereto.

Figure 3:
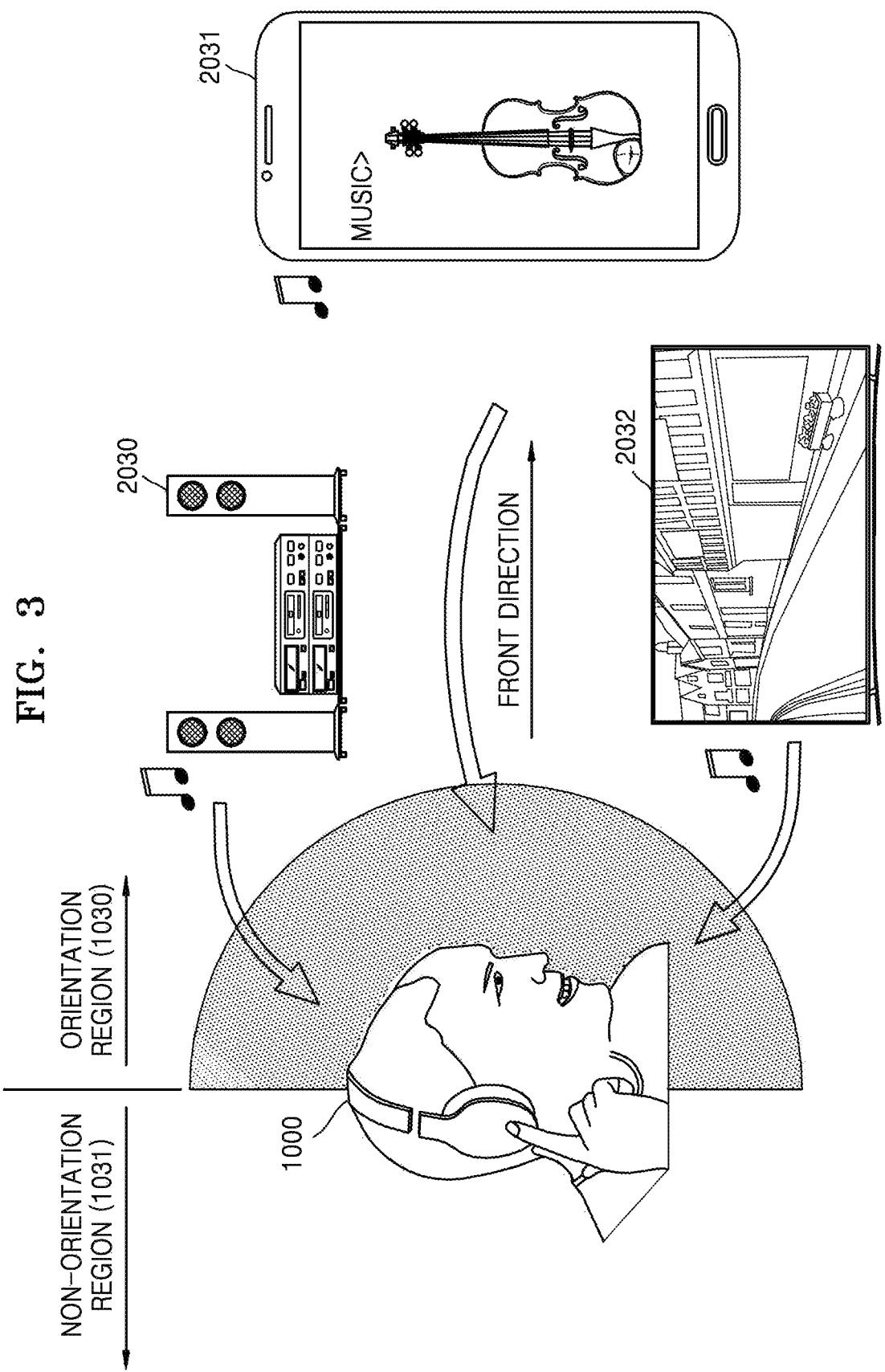
FIG. 3 illustrates an example in which a device is wirelessly connected to a target device according to various exemplary embodiments.

FIG. 3 illustrates an example in which a device is wirelessly connected to a target device according to various embodiments of the present disclosure.

Referring to FIG. 3, the device 1000 may search for a plurality of target devices, namely, an audio player 2030, a mobile terminal 2031, and a TV 2032, located in an orientation region 1030, according to a first input (for example, pressing and holding of a button) of a user. In this case, target devices located in a non-orientation region 1031 may be excluded from being searched.

The device 1000 may determine the mobile terminal 2031 located in the front direction from among found target devices, as a target device located in the front direction. The device 1000 may perform a wireless connection with the mobile terminal 2031 determined as the target device located in the front direction and may receive currently-being-reproduced content from the mobile terminal 2031. The received content may be output to the user via the device 1000, and thus the user may determine that the target device currently wirelessly connected with the device 1000 is the mobile terminal 2031, based on the received content.

If the user wants to wirelessly connect the device 1000 to the TV 2032, the front direction of the device 1000 may be moved to a direction of the TV 2032, and thus the device 1000 may determine the target device located in the front direction to be the TV 2032. Thus, the wireless connection with the mobile terminal 2031 may be disconnected, and a wireless connection to the TV 2032 may be performed. The target device located in the front direction of the device 1000 may be determined at predetermined time intervals, or may be determined every time a change in the front direction of the device 1000 is recognized.

While the device 1000 is being wirelessly connected with the mobile terminal 2031, when the user wants to maintain the wireless connection with the mobile terminal 2031, the wireless connection with the currently wirelessly-connected mobile terminal 2031 may be fixed according to a second input (for example, a button release) of the user. Once the maintenance of the wireless connection with the mobile terminal 2031 may be determined according to the second input, the wireless connection with the mobile terminal 2031 is not disconnected until special setting is made, even when the front direction of the device 1000 is changed.

Thus, after the user temporarily receives content of a device desired to be wirelessly connected from the device 1000 without special prior manipulations for a wireless connection, the user may enable the device 1000 to perform a wireless connection with the desired target device.

In the aforementioned embodiment of the present disclosure, a front direction and an orientation region of each device may be determined according to usage behavioral characteristics that are naturally generated due to the characteristics of a form factor of the device. A method of determining the front direction of the device 1000 will now be described in detail with reference to FIGS. 4 and 5.

Figure 4:
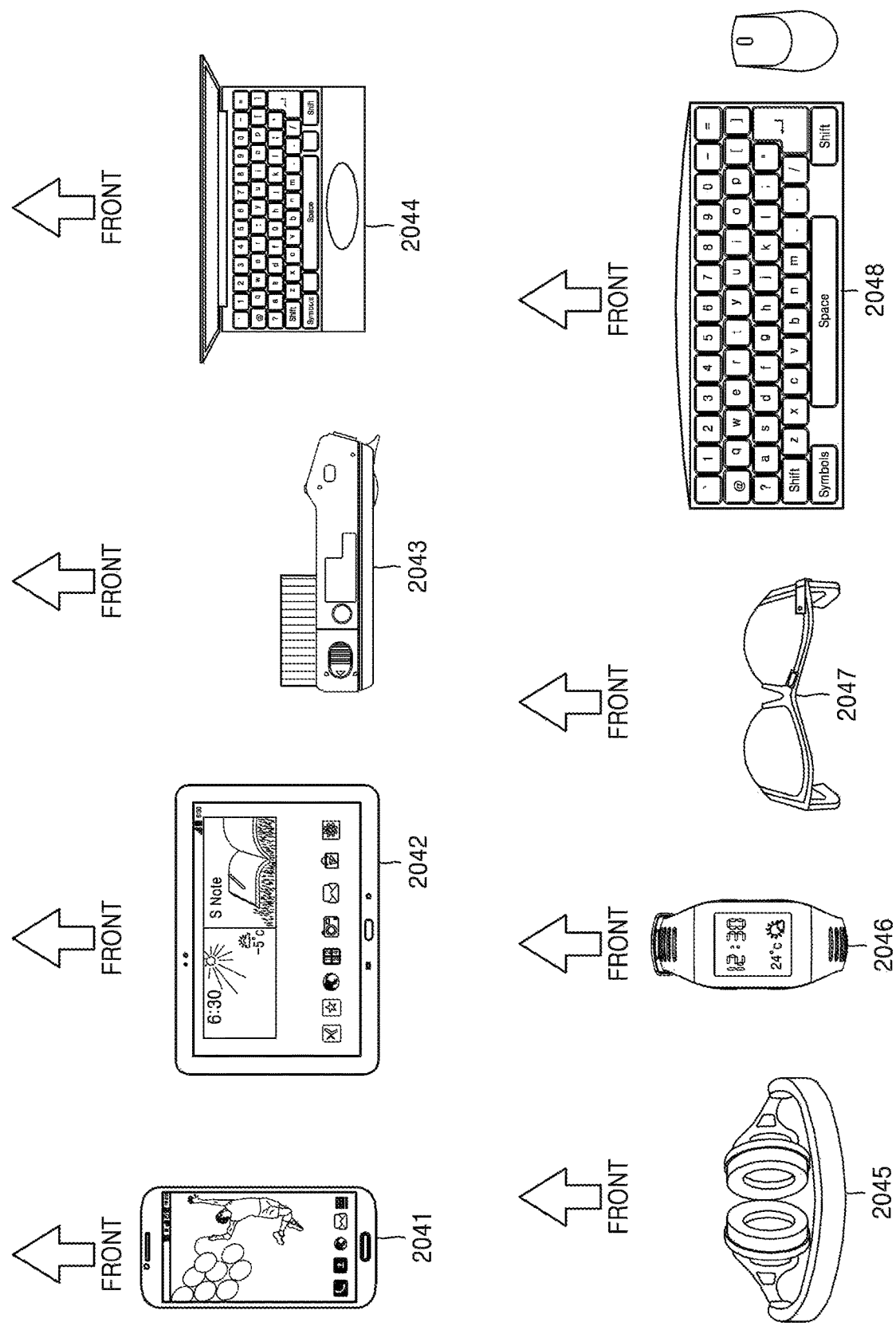
FIG. 4 illustrates a device front direction that is determined according to usage behavioral characteristics according to various embodiments of the present disclosure.

FIG. 4 illustrates a device front direction that is determined according to usage behavioral characteristics according to various embodiments of the present disclosure.

Referring to FIG. 4, a mobile terminal 2041, a tablet 2042, a camera 2043, a computer 2044, a headset 2045, a smart watch 2046, smart glasses 2047, and a keyboard and mouse 2048 may recognize the directions as front directions thereof, and may each determine a target device located right at the center of the front direction of the device as a target device located in the front direction of the device.

In detail, when the mobile terminal 2041 is oriented toward a target device by being gripped with one hand of a user, an upper end of the mobile terminal 2041 is naturally oriented toward the target device. Thus, an upper end direction of the mobile terminal 2041 may be the front direction of the mobile terminal 2041.

When the tablet 2042 is oriented toward a target device by being gripped with two hands of a user, a horizontal upper end of the tablet 2042 is oriented toward the target device according to form factor characteristics of the tablet 2042. Thus, a direction of the horizontal upper end of the tablet 2042 may be the front direction of the tablet 2042.

When a user has gripped the camera 2043, the lens of the camera 2043 is naturally oriented toward a target device, and thus the direction of the lens may be the front direction of the camera 2043.

As for the computer 2044, a rear side of the screen of the computer 2044 is oriented toward a target device such that a user may look at the target device. Thus, the rear side of the screen of the computer 2044 may be the front direction of the computer 2044.

When a user generally wears the headset 2045 (or earphones), the eye of the user is directed toward a target device. Thus, the eye direction of the user who is wearing the headset 2045 may be the front direction of the headset 2045.

In order for the smart watch 2046 to point a target device after being worn by a user, it is convenient for an upper end (outer surface) of the smart watch 2046 to face a target device. Thus, the direction of the upper end of the smart watch 2046 may be the front direction of the smart watch 2046.

After the smart glasses 2047 is normally worn by a user, the eye of the user may head for a target device. Thus, the eye direction of the user who has worn the smart glasses 2047 may be the front direction of the smart glasses 2047.

As for a keyboard and mouse 2048, an upper end thereof is oriented toward a target device. Thus, the direction of the upper end of the keyboard and mouse 2048 may be the front direction of the keyboard and mouse 2048.

Although examples in which the front direction of a device 1000 is determined are illustrated in FIG. 4, it will be easily understood by one of ordinary skill in the art to which the present embodiment pertains that front directions of various other devices 1000 when a user faces a target device may be determined as the front directions of the other devices 1000 according to usage behavioral characteristics.

Figure 5:
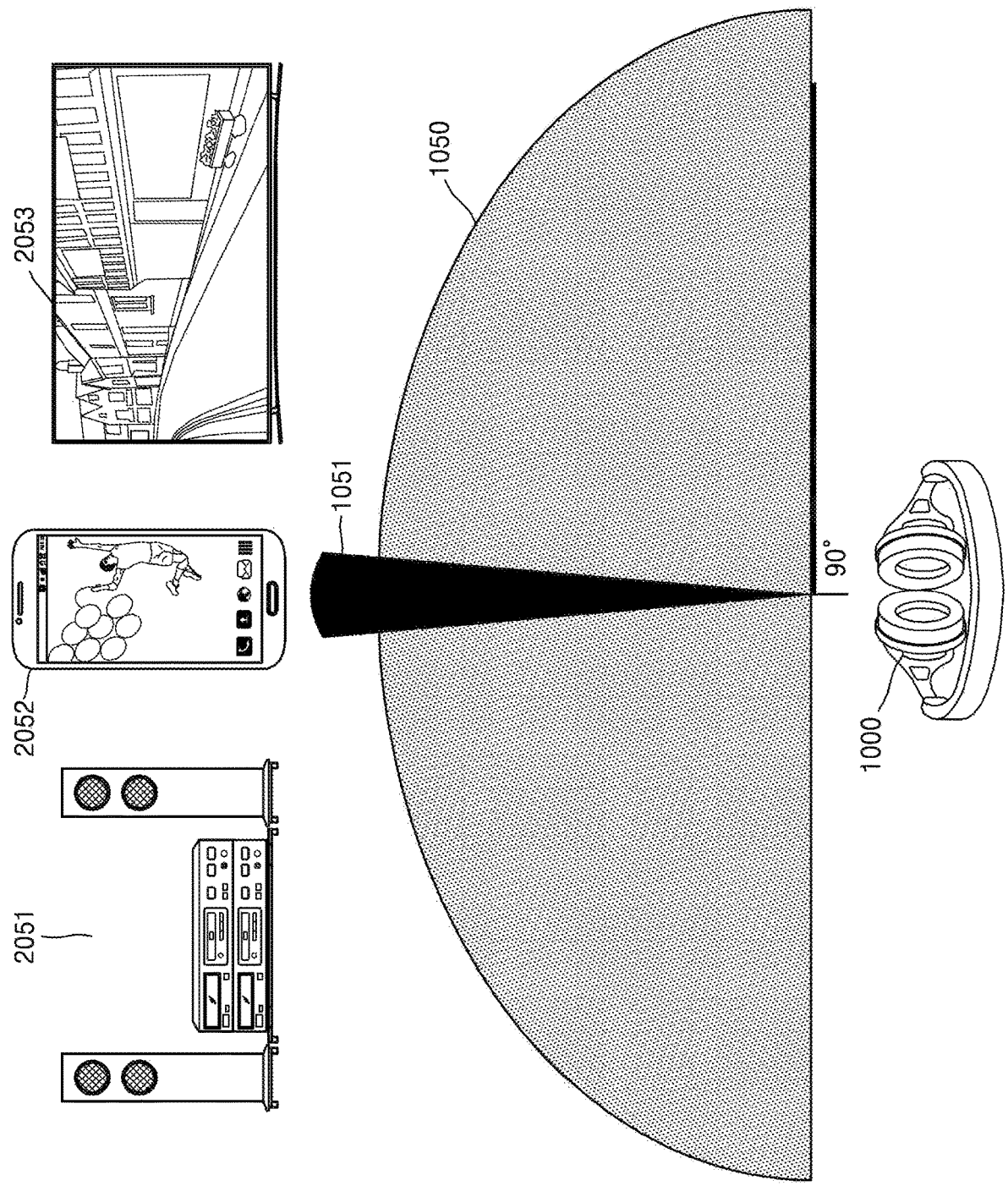
FIG. 5 illustrates determining an orientation region and a front direction of a device according to various embodiments of the present disclosure.
Figure 6:
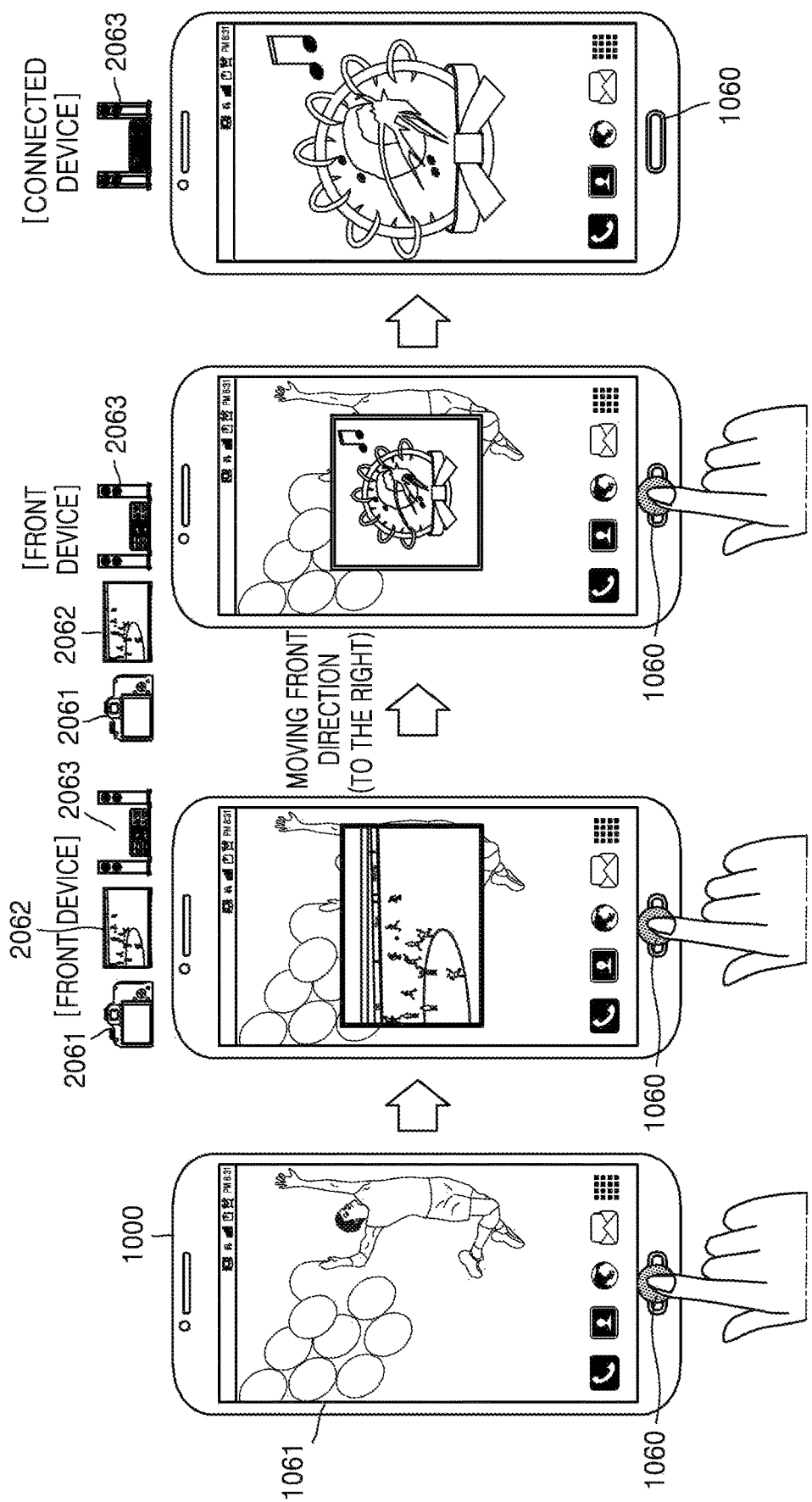
FIGS. 6A to 6D illustrate a device that determines a target device located in the front direction of the device according to various embodiments of the present disclosure.

FIG. 5 illustrates determining an orientation region and a front direction of the device according to various embodiments of the present disclosure.

Referring to FIG. 5, the orientation region 1050 of the device 1000 may denote a region ranging 180 degrees in the front direction of a device. The orientation region 1050 is not limited to the region between 0° to 180°, and may vary according to a setting value of the device 1000. For example, a region between 30° and 270° or a region between 0° and 360° may be set as the orientation region 1050.

The device 1000 may receive device information including direction (angle) information from a plurality of target devices 2051 and 2052 found from the orientation region 1050. For example, when the device 1000 performs a wireless connection by using beamforming technology, the device 1000 uses a directional antenna to accomplish fast transmission of data between devices. Thus, the device 1000 may determine the front direction 1051 of the device 1000 by using the direction information received using the directional antenna, and determine the target device 2052 as a target device located in the front direction 1051. The device 1000 may also determine relative locations of the target devices 2051 and 2053, which are not located in the front direction 1051.

The front direction 1051 may denote a specific angle within which an antenna direction of the device 1000 and an antenna direction of the target device 2000 range. The specific angle may denote an angle range that is narrower than the orientation region 1050.

For example, when the orientation region 1050 of FIG. 5 is set to be a range between 0°, which is the front of the device 1000, and 180° and orientation direction 1051 is set to be a range between 85° and 95°, which is the front of the device 1000, the device 1000 may determine the target device 2052 located between 85° and 95°, as a target device located in the front direction 1051.

FIGS. 6A to 6D illustrate a device that determines a target device located in the front direction of the device according to various embodiments of the present disclosure.

Referring to FIGS. 6A to 6D, the device 1000 may be a mobile terminal, and target devices may be a camera 2061, a TV 2062, or an audio player 2063.

Referring to FIG. 6A, in response to a first input of pushing a button 1060, the device 1000 searches for target devices, namely, the camera 2061, the TV 2062, and the audio player 2063, located in an orientation region of the device 1000. The first input is not limited to the structure of pushing the button 1060, and the first input may include, for example, a button input, a touch input, a gesture, a voice, an eye direction, and device-motion recognition.

Referring to FIG. 6B, the device 1000 determines the TV 2062 centrally located in front of the device 1000 from among the found target devices 2061, 2062, and 2063, as a target device located in the front direction of the device 1000, and performs a wireless connection with the determined target device. The device 1000 may receive image content from the TV 2062 and provides the image content to a user via a display 1061 of the device 1000.

Referring to FIG. 6C, when the front direction of the device 1000 is changed and thus the audio player 2063 is centrally positioned in front of the device 1000 while the first input is being held, the device 1000 may perform a wireless connection with the audio player 2063 centrally located in front of the device 1000. The device 1000 may receive content from the audio player 2063 and display the received content to the user via the display 1061. The device 1000 may also provide the content received from the audio player 2063 to the user via a speaker (not shown).

Referring to FIG. 6D, in response to a second input of releasing the button 1060, the device 1000 determines that the wireless connection to the currently wirelessly-connected audio player 2063 is maintained. The second input is not limited to the structure of releasing the button 1060, and the second input may include, for example, a button input, a touch input, a gesture, a voice, an eye direction, and device-motion recognition.

Accordingly, the device 1000 may maintain the wireless connection with the audio player 2063 even when the front direction of the device 1000 is changed.

When the front direction of a device is changed as illustrated in FIGS. 6B and 6C, the type of content that is displayed via the display 1061 is changed. However, in another embodiment of the present disclosure, the type of content that is displayed via the display 1061 may be changed via a third input (for example, a touch input) of a user.

For example, the device 1000 may search for a plurality of target devices existing within the orientation region (180 degrees in front) of the device 1000, and receive information and content of all of found target devices. After a user browses the received information about the plurality of target devices via only the third input (for example, a touch input) without changing the front direction of the device 1000, the user may select only one target device as the target device located in the front direction of the device 1000 and enable a wireless connection with the selected target device to be maintained.

Figure 7:
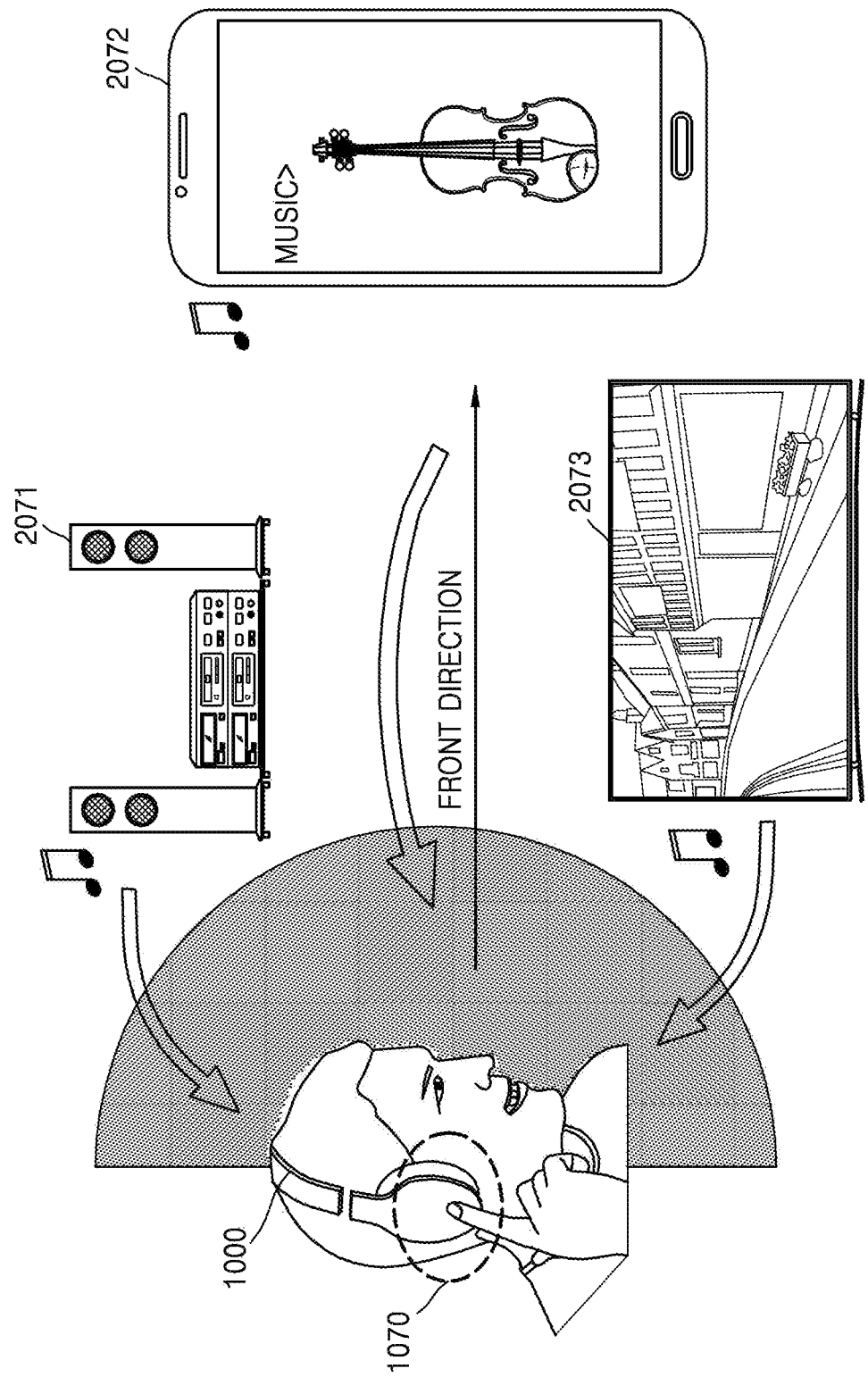
FIG. 7 illustrates another example in which a device determines a target device located in a front direction of the device according to various embodiments of the present disclosure.

FIG. 7 illustrates another example in which a device determines a target device located in the front direction of the device 1000 according to various embodiments of the present disclosure.

Referring to FIG. 7, the device 1000 may be a headset, and target devices may include an audio player 2071, a mobile terminal 2072, and a TV 2073.

In response to a first input of pushing a button 1070, the device 1000 searches for the target devices 2071, 2072, and 2073 located in an orientation region of the device 1000. The device 1000 determines the mobile terminal 2072 centrally located in front of the device 1000 from among found target devices 2071, 2072, and 2073, as the target device located in the front direction of the device 1000, and performs a wireless connection with the determined target device. When the wireless connection is performed, the device 1000 may receive currently-being-reproduced content from the mobile terminal 2072 and output the received content.

When the device 1000 is a headphone capable of outputting only sound, the device 1000 may receive only sound content from the mobile terminal 2073. In other words, the device 1000 may determine what content is reproducible, receive only reproducible content from the mobile terminal 2062, and output the received reproducible content to a user.

When the front direction of the device 1000 is changed, the wireless connection to the mobile terminal 2073 may be released, and a wireless connection to the other target devices 2071 and 2073 may be performed. In this case, the device 1000 may intuitively determine the front direction of the device 1000 by providing the user with content of newly wirelessly-connected target devices 2071 and 2073 together with a fade-in and fade-out effect.

In response to a second input of releasing the button 1070, the device 1000 may maintain the wireless connection to the currently wirelessly-connected mobile terminal 2072.

Thus, in a method of wirelessly connecting devices according to various embodiments of the present disclosure, even a device 1000 having no displays may intuitively select a target device by using sound output. In addition, the device 1000 may setup a wireless connection even by using only the button 1070 without complicated prior operations.

The first and second inputs are not limited to the structure of using a button, and the first and second inputs may include, for example, a button input, a touch input, a gesture, a voice, an eye direction, and device-motion recognition.

Figure 8:
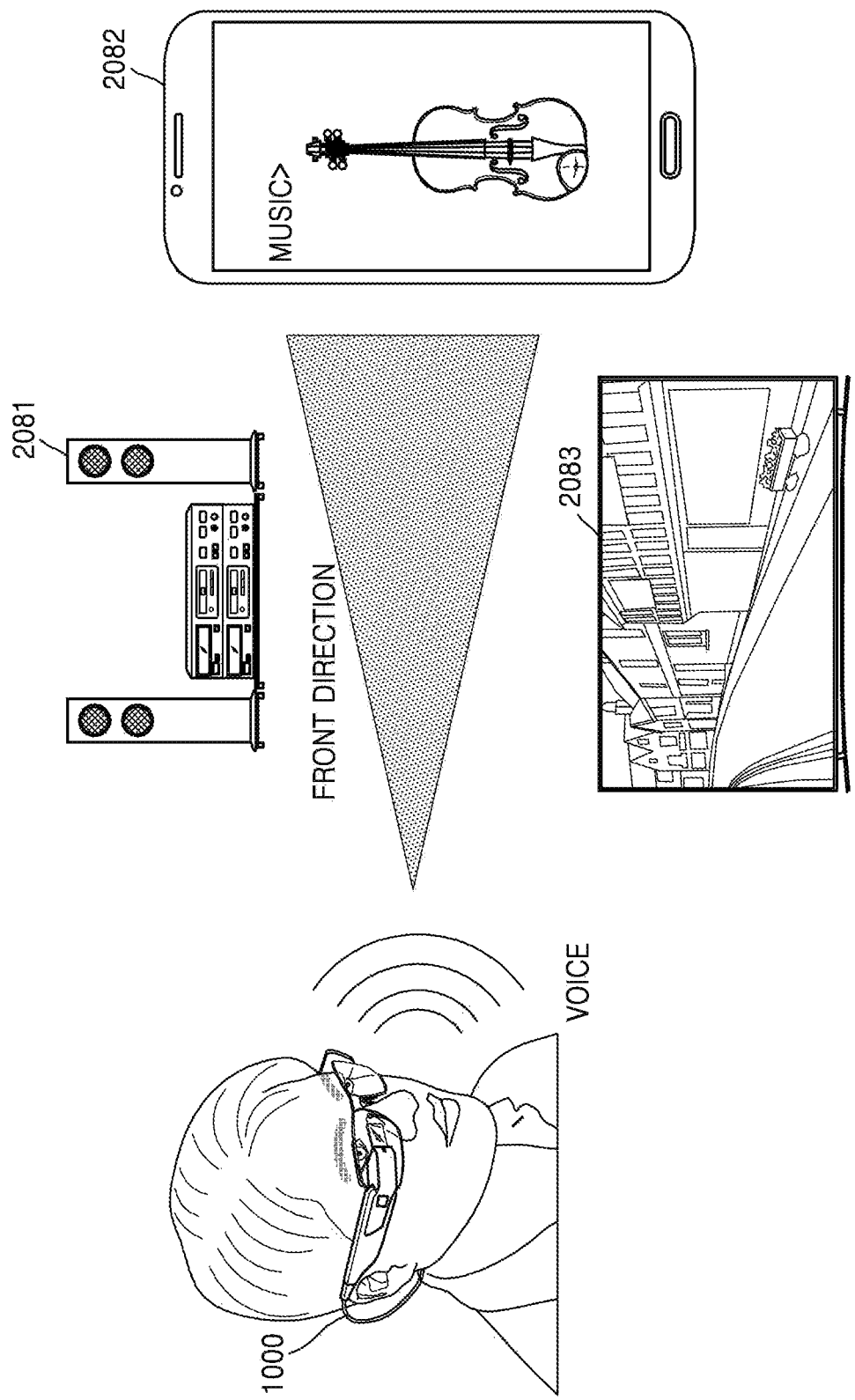
FIG. 8 illustrates another example in which a device determines a target device located in a front direction of the device according to various embodiments of the present disclosure.

FIG. 8 illustrates another example in which a device determines a target device located in the front direction of the device according to various embodiments of the present disclosure.

Referring to FIG. 8, the device 1000 may be smart glasses, and target devices may include an audio player 2081, a mobile terminal 2082, and a TV 2083.

When the device 1000 recognizes a first input from a received voice of a user, the device 1000 searches for the target devices 2081, 2082, and 2083 located in an orientation region of the device 1000. The device 1000 determines the mobile terminal 2082 centrally located in front of the device 1000 from among found target devices 2082, 2081, and 2083, as the target device located in the front direction, and performs a wireless connection with the determined target device. When the wireless connection is performed, the device 1000 may receive currently-being-reproduced content from the mobile terminal 2082 and output the received content.

As the device 1000 recognizes a second input from a voice of the user, the device 1000 may maintain the wireless connection to the currently wirelessly-connected mobile terminal 2082.

The first and second inputs are not limited to the structure of recognizing a voice, and the first and second inputs may include, for example, a button input, a touch input, a gesture, a voice, an eye direction, and device-motion recognition.

Figure 9:
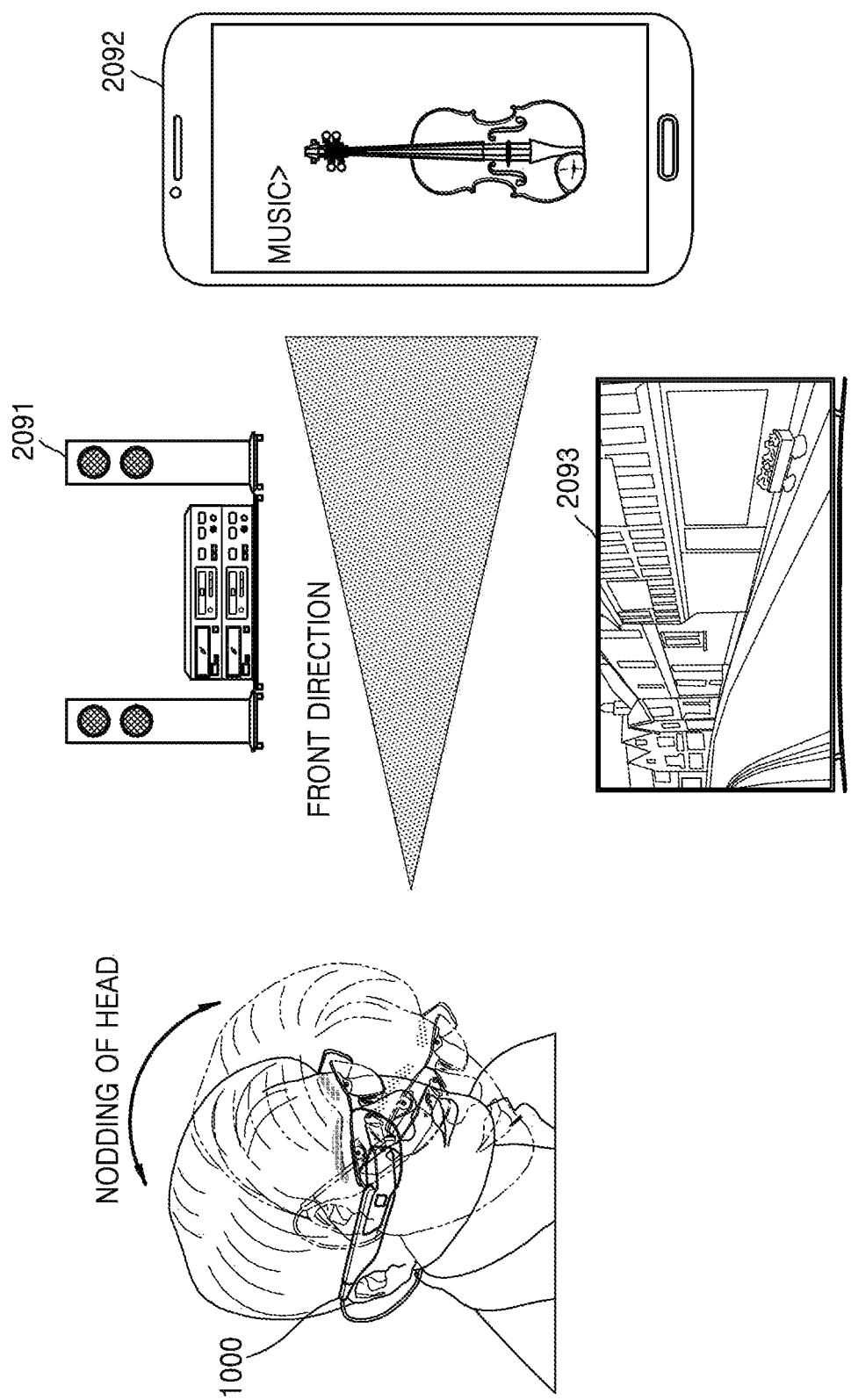
FIG. 9 illustrates another example in which a device determines a target device located in a front direction of the device, according to various embodiments of the present disclosure.

FIG. 9 illustrates another example in which a device determines a target device located in the front direction of the device according to various embodiments of the present disclosure.

Referring to FIG. 9, the device 1000 may be smart glasses, and target devices may include an audio player 2091, a mobile terminal 2092, and a TV 2093.

When the device 1000 recognizes a first input from a specific action (e.g., nodding) of a user, the device 1000 searches for the target devices 2091, 2092, and 2093 located in an orientation region of the device 1000. The specific action of the user may be recognized using an acceleration sensor and a magnetic sensor. The device 1000 determines the mobile terminal 2092 centrally located in front of the device 1000 from among found target devices 2091, 2092, and 2093, as the target device located in the front direction, and performs a wireless connection with the determined target device. When the wireless connection is performed, the device 1000 may receive currently-being-reproduced content from the mobile terminal 2092 and output the received content.

As the device 1000 recognizes a second input from a specific action of the user, the device 1000 may maintain the wireless connection to the currently wirelessly-connected mobile terminal 2092.

The first and second inputs are not limited to the structure of recognizing a specific action of a user, and the first and second inputs may include, for example, a button input, a touch input, a gesture, a voice, an eye direction, and device-motion recognition.

Figure 10:
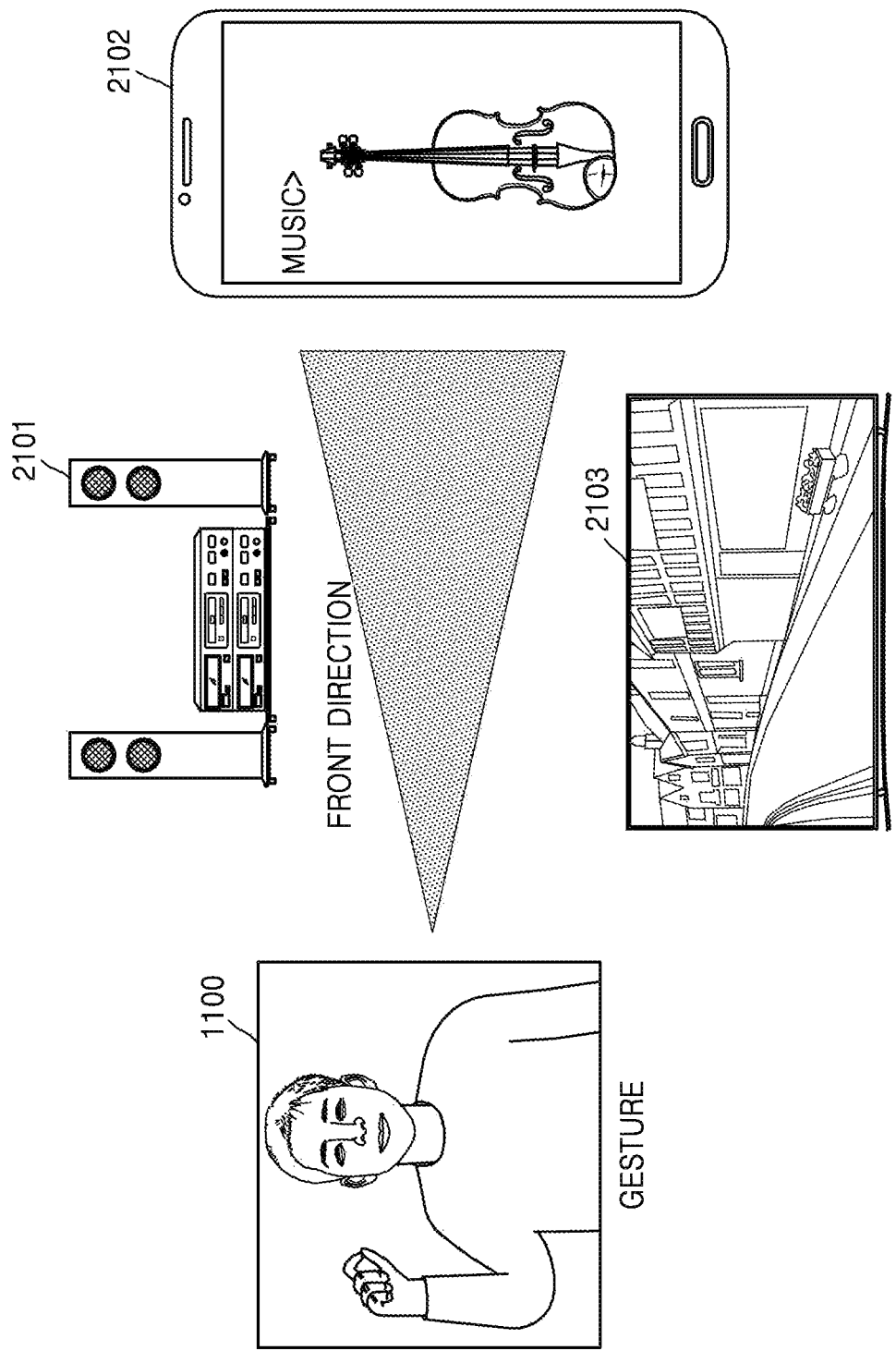
FIG. 10 illustrates another example in which a device determines a target device located in the front direction of the device according to various embodiments of the present disclosure.

FIG. 10 illustrates another example in which a device determines a target device located in the front direction of the device according to various embodiments of the present disclosure.

Referring to FIG. 10, the device 1000 may be a device including a photographing device, and target devices may be an audio player 2101, a mobile terminal 2102, and a TV 2103.

When the device 1000 recognizes a first input from a gesture (e.g., first clenching) of a user that is photographed by the photographing device, the device 1000 searches for the target devices 2101, 2102, and 2103 located in an orientation region of the device 1000. The device 1000 determines the mobile terminal 2102 centrally located in front of the device 1000 from among found target devices 2101, 2102, and 2103, as the target device located in the front direction, and performs a wireless connection with the determined target device. When the wireless connection is performed, the device 1000 may receive currently-being-reproduced content from the mobile terminal 2102 and output the received content.

As the device 1000 recognizes a second input (e.g., hand opening or OK signing) from a photographed gesture 1100 of the user, the device 1000 may maintain the wireless connection to the currently wirelessly-connected mobile terminal 2102.

The first and second inputs are not limited to the structure of recognizing a specific action of a user, and the first and second inputs may include, for example, a button input, a touch input, a gesture, a voice, an eye direction, and device-motion recognition.

Figure 11:
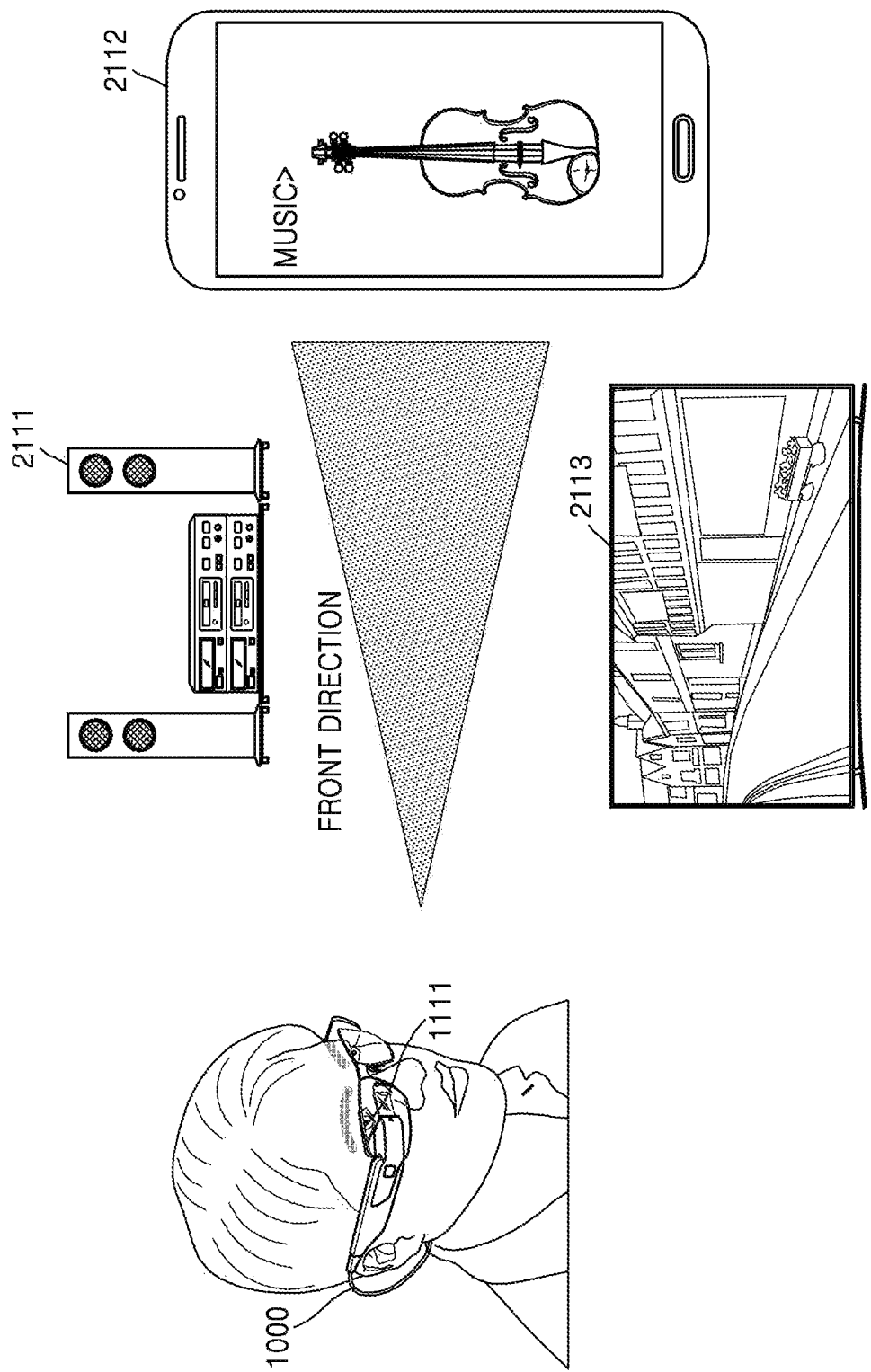
FIG. 11 illustrates another example in which a device determines a target device located in a front direction of the device according to various embodiments of the present disclosure.

FIG. 11 illustrates another example in which a device determines a target device located in the front direction of the device according to various embodiments of the present disclosure.

Referring to FIG. 11, the device 1000 may be a device including a photographing device capable of recognizing the iris of a user, and target devices may include an audio player 2111, a mobile terminal 2112, and a TV 2113.

When the device 1000 recognizes a first input (e.g., the user observing a lower left region thereof for a certain period of time) from an iris 1111 of a user that is photographed by the photographing device, the device 1000 searches for the target devices 2111, 2112, and 2113 located in an orientation region of the device 1000. The device 1000 determines the mobile terminal 2112 centrally located in front of the device 1000 from among found target devices 2111, 2112, and 2113, as the target device located in the front direction, and performs a wireless connection with the determined target device. When the wireless connection is performed, the device 1000 may receive currently-being-reproduced content from the mobile terminal 2112 and output the received content.

As the device 1000 recognizes a second input from the photographed iris 1111 of the user, the device 1000 may maintain the wireless connection to the mobile terminal 2112 located in the front direction.

Figure 12:
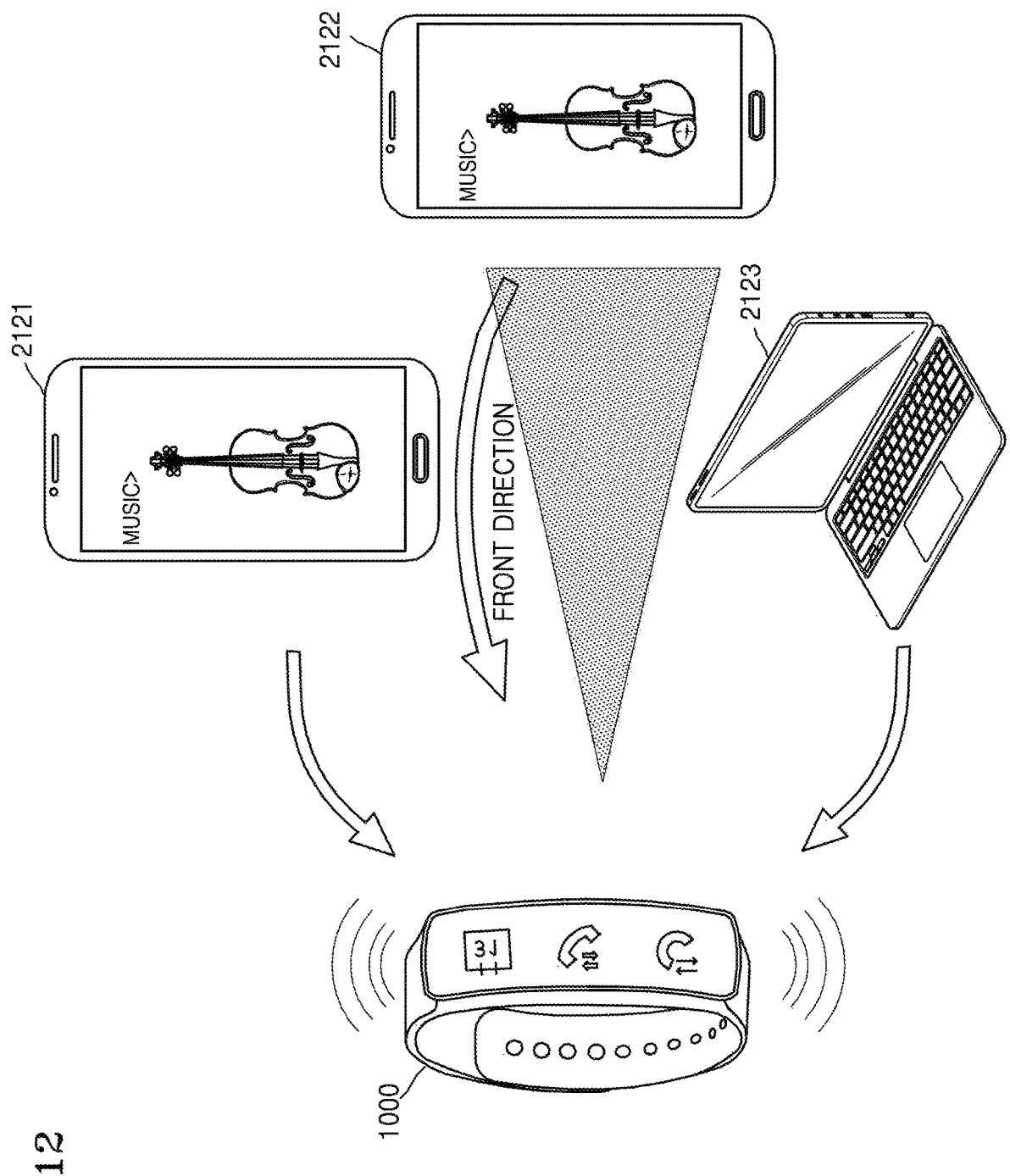
FIG. 12 illustrates another example in which a device determines a target device located in a front direction of the device, according to various embodiments of the present disclosure.

FIG. 12 illustrates another example in which a device determines a target device located in the front direction of the device according to various embodiments of the present disclosure.

Referring to FIG. 12, the device 1000 may be a wearable device, and target devices may include a mobile terminal 2121, a mobile terminal 2122, and a computer 2123.

When the device 1000 recognizes a first input from a specific action (e.g., vertically shaking) of a user, the device 1000 searches for the target devices 2121, 2122, and 2123 located in an orientation region of the device 1000. The specific action of the user may be recognized using an acceleration sensor and a magnetic sensor. The device 1000 determines the mobile terminal 2122 centrally located in front of the device 1000 from among found target devices 2121, 2122, and 2123, as the target device located in the front direction, and performs a wireless connection with the determined target device. When the wireless connection is performed, the device 1000 may receive currently-being-reproduced content from the mobile terminal 2122 and output the received content.

As the device 1000 recognizes a second input from a specific action of the user, the device 1000 may maintain the wireless connection to the currently wirelessly-connected mobile terminal 2122.

The first and second inputs are not limited to the structure of recognizing a specific action of a user, and the first and second inputs may include, for example, a button input, a touch input, a gesture, a voice, an eye direction, and device-motion recognition.

Although the first input and the second input are identical types of inputs in the above embodiment for convenience of explanation, embodiments are not limited thereto. For example, in response to a voice input of a user, the device 1000 may perform a wireless connection with the target device located in the front direction. In response to a gesture of the user, the device 1000 may determine whether the wireless connection with the target device is maintained.

In order to inform that the target device is located in the front direction of the device 1000, the device 1000 according to various embodiments may provide content via the target device instead of receiving content from the target device and outputting the received content to the user.

For example, the device 1000 may transmit content currently being reproduced by the device 1000 to a wirelessly-connected target device such that the content may be reproduced by the target device. Alternatively, the device 1000 may enable the wirelessly-connected target device to provide a certain alarm to the user.

Figure 13:
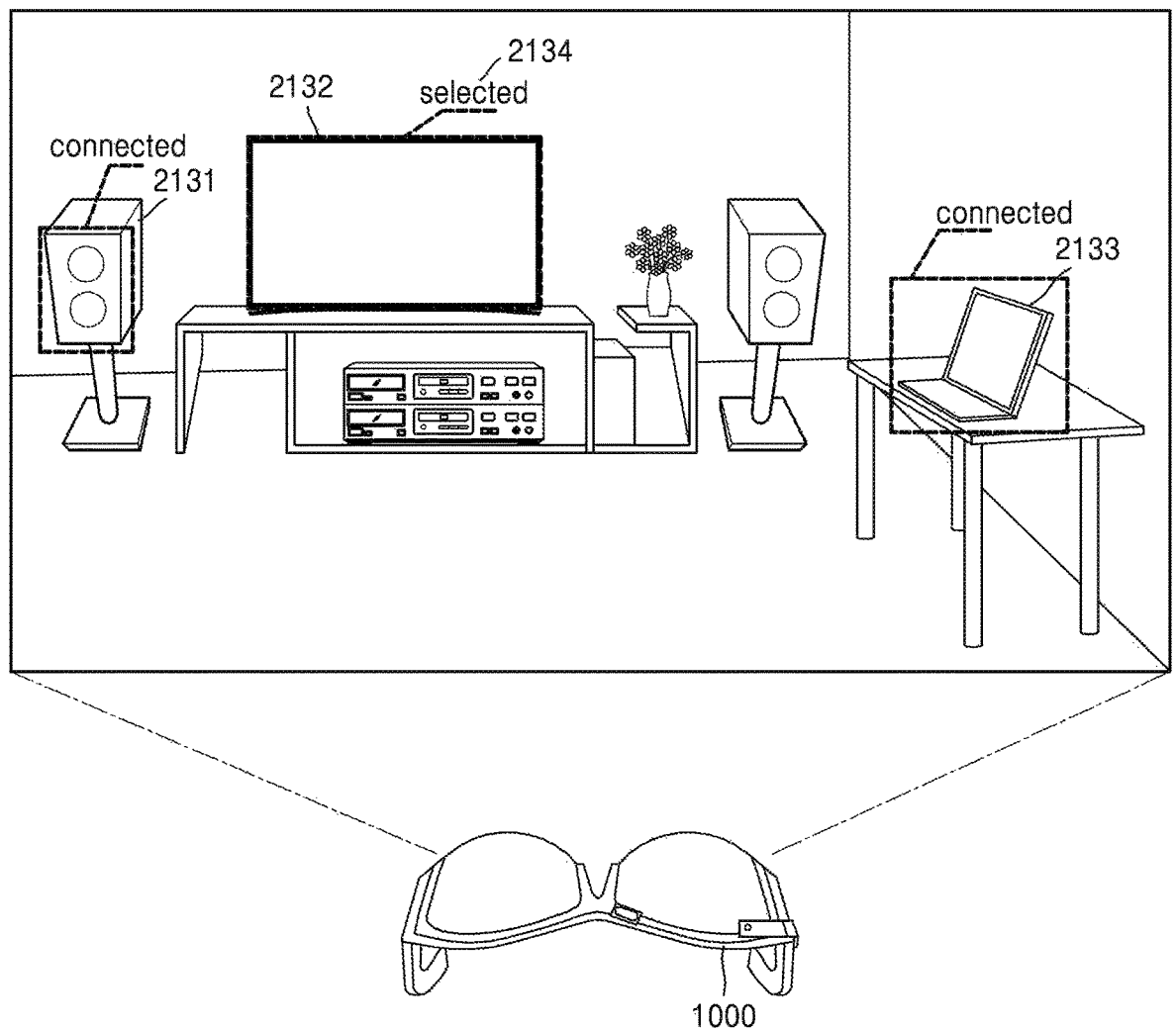
FIG. 13 illustrates an example of informing a user that a target device is located in a front direction of a device according to various embodiments of the present disclosure.

FIG. 13 illustrates an example of informing a user that a target device is located in a front direction of a device according to various embodiments of the present disclosure.

Referring to FIG. 13, the device 1000 may be a device capable of providing augmented reality to a user, and target devices may include an audio player 2131, a TV 2132, and a computer 2133.

The device 1000 according to various embodiments may provide the target devices 2131, 2132, and 2133 found from an orientation region of the device 1000 to a user via augmented reality. The device 1000 may apply a graphical indication 2134 to a target device corresponding to a current front direction of the device 1000 such that the user may recognize the graphical indicator 2134. Thus, by specifically indicating a target device located in the front direction of the device 1000 via augmented reality, the user may intuitively determine a target device that is to be wirelessly connected to the device 1000.

Figure 14:
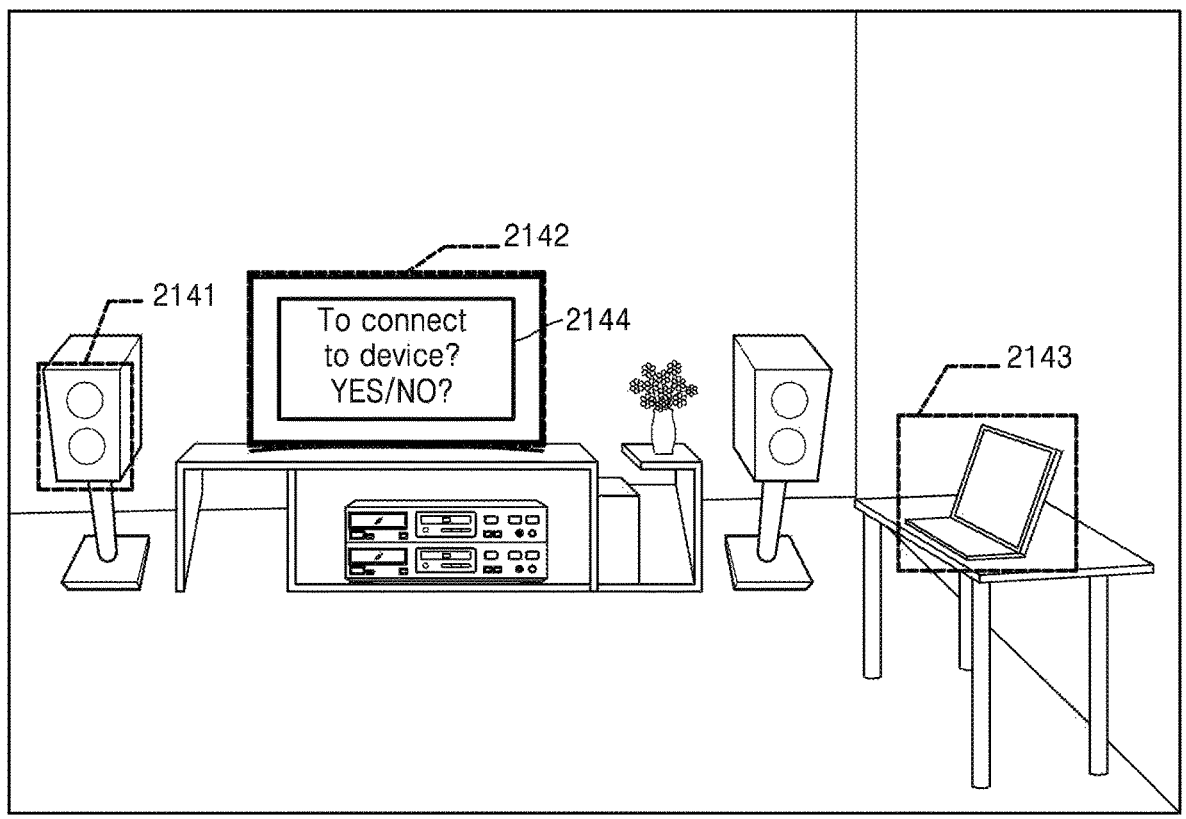
FIG. 14 illustrates another example of informing a user that a target device is located in a front direction of a device according to various embodiments of the present disclosure.

FIG. 14 illustrates another example of informing a user that a target device is located in a front direction of a device according to various embodiments of the present disclosure.

Referring to FIG. 14, when the device 1000 has been wirelessly connected to a TV 2142, the screen of the TV 2142 may display a popup window 2144 asking whether to maintain the connection with the device 1000. Alternatively, whether to maintain connection with the device 1000 may be informed by a voice via an audio player 2141, or whether to maintain connection with the device 1000 may be informed by flicking the screen of a computer 2143.

Figure 15:
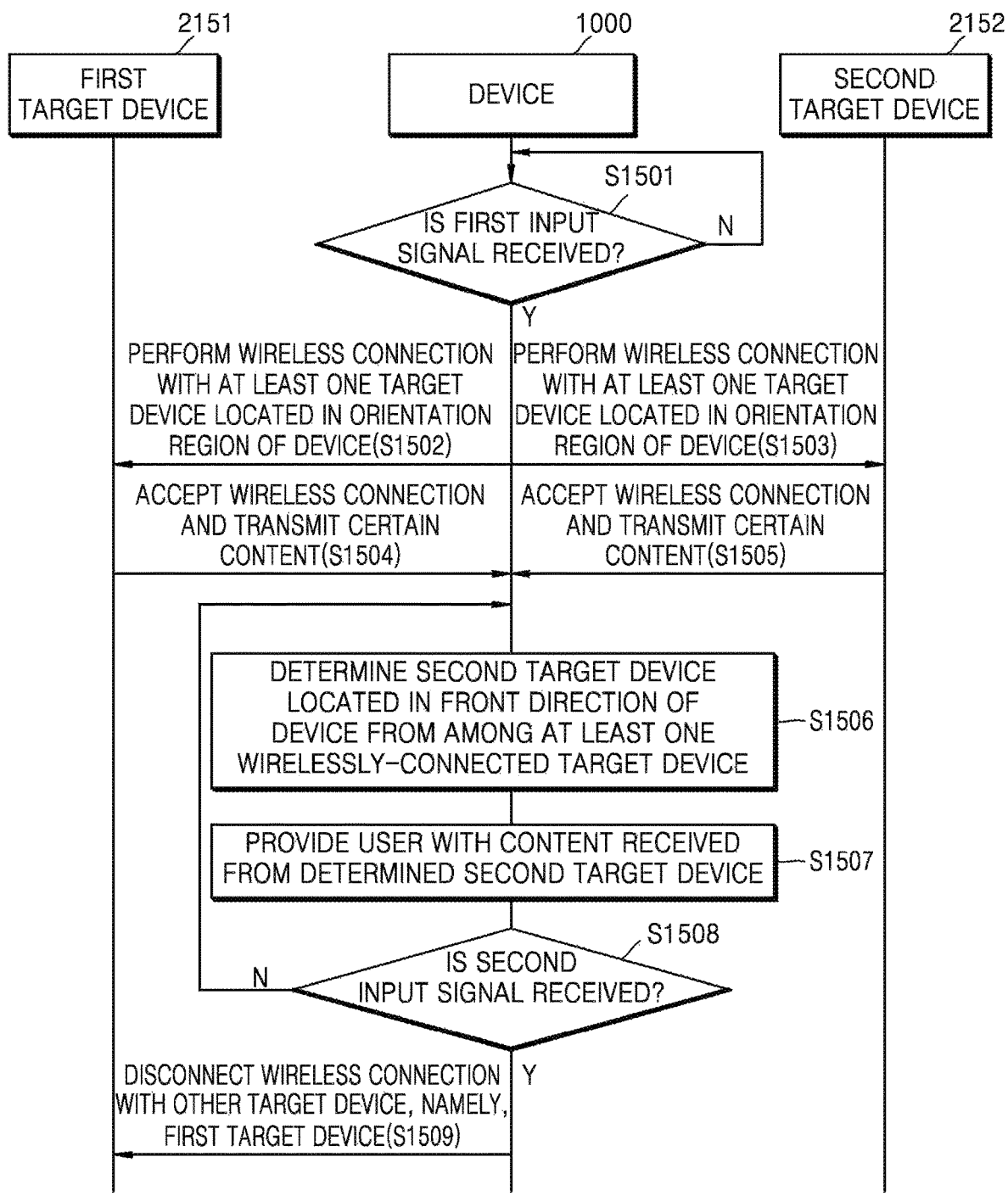
FIG. 15 is a flowchart of a method for wirelessly connecting a device to a target device according to various embodiments of the present disclosure.

FIG. 15 is a flowchart of a method for wirelessly connecting a device to a target device according to various embodiments of the present disclosure.

Referring to FIG. 15, a device 1000 according to another embodiment may temporarily perform a wireless connection with all of target devices existing in an orientation region of the device 1000 in response to a first input signal, determine a wireless connection with a target device located in a front direction of the device 1000 in response to a subsequent second input signal, and disconnect the wireless connections with the other target devices.

In detail, in operation S1501, the device 1000 may determine whether the first input signal is received.

The device 1000 may perform a wireless connection with at least one target device located in the orientation region of the device 1000, based on the first input signal. For example, when a plurality of target devices, namely, first and second target devices 2151 and 2152, exist in the orientation region of the device 1000, the device 1000 may perform a wireless connection with the target devices 2151 and 2152 in operations S1502 and S1503, respectively.

In operation S1504 and S1505, when the device 1000 is wirelessly connected to the at least one target device, the device 1000 may receive certain content from the at least one target device or control the at least one target device. The wireless connection may denote a state in which the device 1000 and a target device are capable of data transmission and reception based on a wireless communication standard (e.g., Wi-Fi, WiGig, Bluetooth, etc.).

In operation S1506, the device 1000 may determine the second target device 2152 located in the front direction of the device 1000 from among the at least one wirelessly-connected target device.

In operation S1507, the device 1000 may provide a user with content received from the determined second target device 2152 corresponding to the front direction. For example, when the device 1000 receives an image, the device 1000 may provide the image to the user via a display of the device 1000. When the received content is sound, the device 1000 may provide the received content to the user via a speaker of the device 1000.

When the device 1000 is wirelessly connected to a plurality of target devices, the device 1000 may mix content respectively received from the wirelessly connected target devices according to relative locations of the wirelessly connected target devices and output a result of the mixing, based on the determined front direction of the device. For example, the content respectively received from the target devices may be arranged according to the relative locations of the target devices and provided on the display of the device 1000. In another example, the device 1000 may output content received from a target device located on the left side in front of the device 1000, via a left speaker, content received from a target device located on the right side in front of the device 1000, via a right speaker, and content received from a target device centrally located in front of the device 1000, via both speakers.

In operation S1508, the device 1000 determines whether a second input signal is received. If the second input signal is not received, operations S1506 and S1507 are repeated.

If the second input signal is received, the device 1000 determines that the wireless connection to the target device located in the front direction of the device 1000 is maintained.

Operations S1506 and S1507 may be repeated while the first input signal is being maintained. Accordingly, in operation S1508, when the first input signal is no longer received, the device 1000 may determine that the second input signal is received. Accordingly, the device 1000 may maintain the wireless connection with the second target device 2152 corresponding to the front direction of the current device 1000 and disconnect the wireless connection with the other target device, namely, the first target device 2151, in operation S1509.

Figure 16:
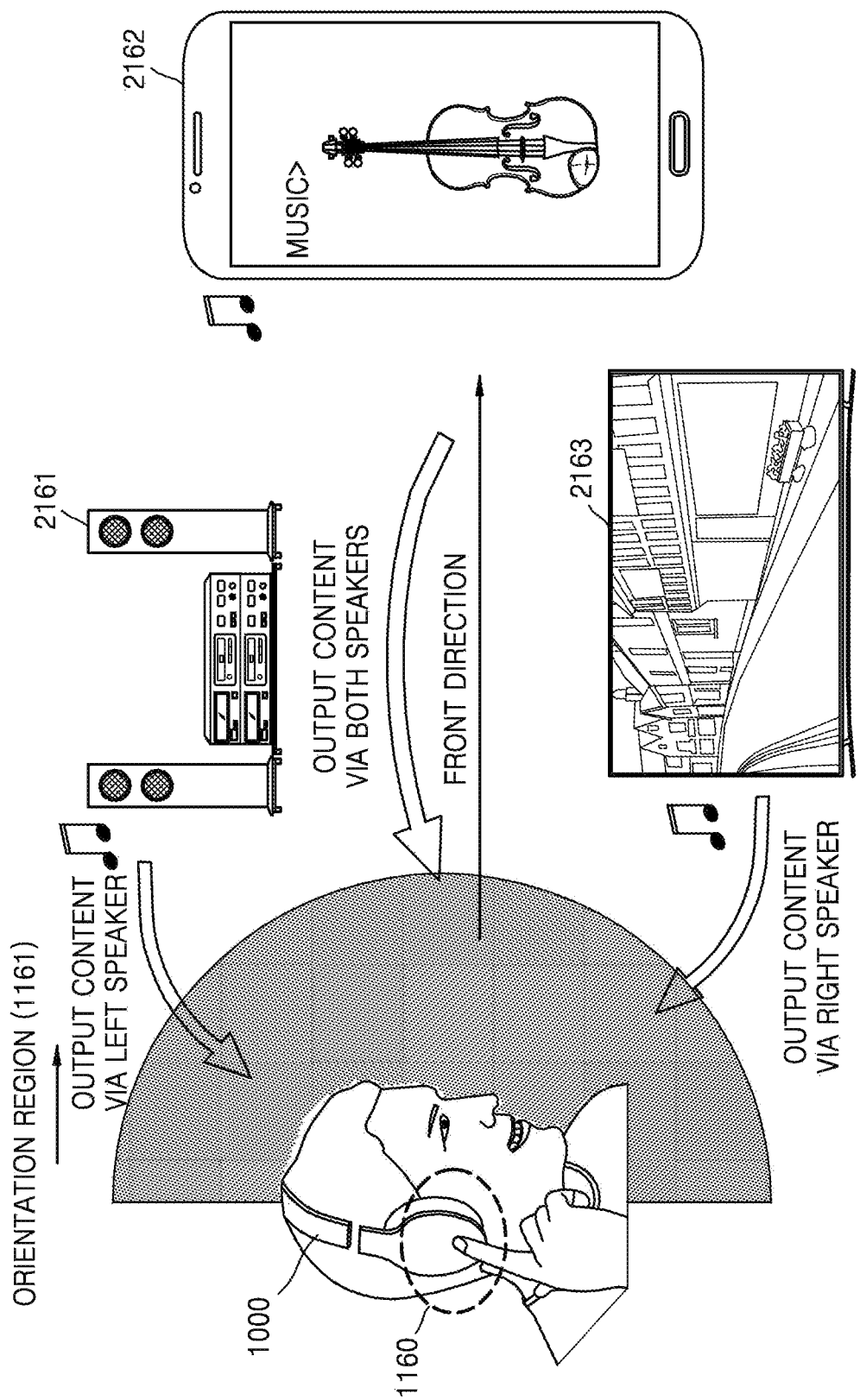
FIG. 16 illustrates an example of performing a wireless connection with a plurality of target devices located in an orientation region according to various embodiments of the present disclosure.

FIG. 16 illustrates an example of performing a wireless connection with a plurality of target devices located in an orientation region according to various embodiments of the present disclosure.

Referring to FIG. 16, a device 1000 may temporarily perform a wireless connection with at least one target device, namely, target devices 2161, 2162, and 2163, located in an orientation region 1161 of the device 1000, based on a first input 1160. The device 1000 may receive content received from each of the target devices 2161, 2162, and 2163 wirelessly connected with the device 1000.

When the target device 2162 located in a front direction of the device 1000 is determined, the device 1000 may mix the content received from each of the wirelessly-connected target devices according to relative locations of the wirelessly-connected target devices and output a result of the mixing, based on the determined front direction of the device 1000. For example, the content respectively received from the target devices may be arranged according to the relative locations of the target devices and provided on the display of the device 1000. In another example, the device 1000 may output the content received from the target device 2161 located on the left side in front of the device 1000, via a left speaker, the content received from the target device 2163 located on the right side in front thereof, via a right speaker, and content received from the target device 2162 centrally located in front thereof, via both speakers.

As the front direction of the device 1000 is changed, the device 1000 may mix content respectively received from the wirelessly-connected target devices according to distances from the device 1000 to the target devices and directions of the target devices in real time, and output a result of the mixing.

Figure 17:
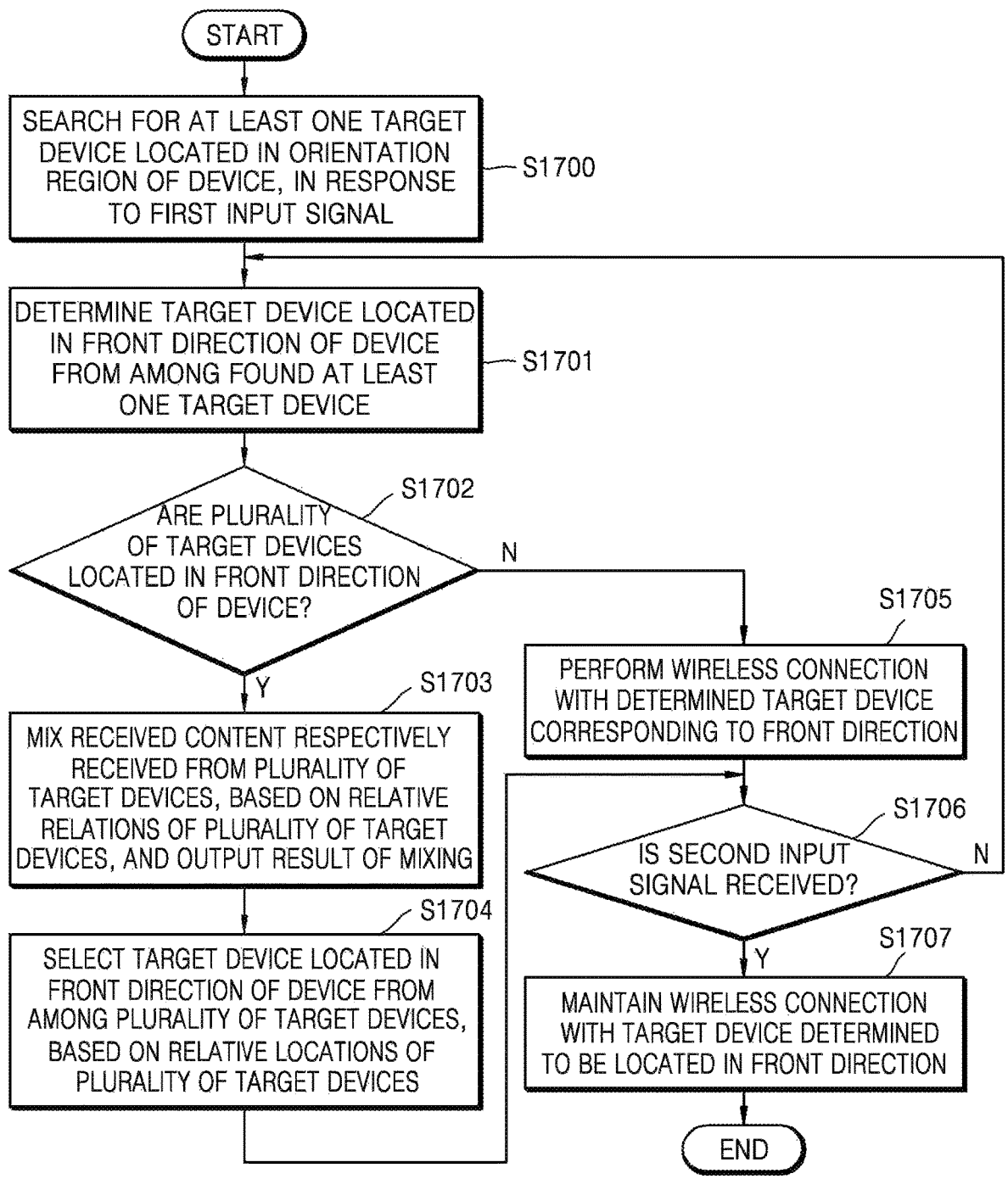
FIG. 17 is a flowchart of another example of a method of wirelessly connecting a device with a target device according to various embodiments of the present disclosure.

FIG. 17 is a flowchart of another example of a method of wirelessly connecting a device to a target device according to various embodiments of the present disclosure.

Referring to FIG. 17, when a plurality of target devices are overlapped with each other in the front direction of the device 1000, the device 1000 may mix content respectively received from the plurality of target devices and provide a result of the mixing to a user such that the user may intuitively determine whether a wireless connection with a target device is maintained.

In operation S1700, in response to a first input signal, the device 1000 searches for at least one target device 2000 located in an orientation region of the device 1000.

In operation S1701, the device 1000 may determine a target device located in the front direction of the device 1000 from among found at least one target device 2000. For example, the device 1000 may receive device information including direction (angle) information from the found at least one target device 2000. Thus, the device 1000 may determine, as the target device located in the front direction of the device 1000, a target device located most directly in front of the device 1000 from among the found at least one target device, by using the received direction information.

In operation S1702, the device 1000 may determine whether a plurality of target devices are located in the front direction of the device 1000.

If a plurality of target devices are not located in the front direction of the device 1000, the method proceeds to operation S1705 to perform a wireless connection with the determined target device corresponding to the front direction.

If a plurality of target devices are located in the front direction of the device 1000, the method proceeds to operation S1703 to receive content from the plurality of target devices. For example, if a plurality of target devices are located in the front direction of the device 1000, the plurality of target devices are overlapped with each other in the front direction. In this case, to receive content from each of the plurality of target devices, the device 1000 may temporarily perform a wireless connection with the plurality of target devices.

The device 1000 mixes the received content according to the front direction of the device 1000 in consideration of relative relations of the plurality of target devices, and outputs a result of the mixing. For example, the device 1000 may output content respectively received from target devices located on left and right sides of the front direction with a lower volume than content received from a target device more centrally located in the front direction. Alternatively, as for a target device located on the left side of the front direction, a left speaker for content received therefrom may be allocated with a high volume. As for a target device located on the right side of the front direction, a right speaker for content received therefrom may be allocated with a high volume.

In operation S1704, the device 1000 may select a target device located in the front direction of the device 1000 from among the plurality of target devices, based on the relative locations of the plurality of target devices. For example, the device 1000 may select a center target device from among the plurality of target devices located in the front direction.

Alternatively, the device 1000 may determine a specific target device from among the plurality of target devices, according to a third input (for example, a voice and a gesture) of a user.

If it is determined in operation S1706 that a second input signal is received, the device 1000 maintains the wireless connection with the target device determined to be located in the front direction, in operation S1707. In the case where a plurality of target devices are located in the front direction, a wireless connection with the selected target device may be maintained, and wireless connections with the other target devices may be disconnected.

Thus, even when a plurality of target devices are located in the front direction, the device 1000 may setup a wireless connection with a target device desired by a user by performing an additional selection process.

FIG. 18 illustrates an example of a wireless connecting method when a plurality of target devices are located in a front direction of a device according to various embodiments of the present disclosure.

Referring to FIG. 18, the device 1000 may be a mobile terminal, and target devices may include a camera 2181, a TV 2182, or an audio player 2183.

In response to a first input, the device 1000 may search for the target devices 2181, 2182, and 2123 located in an orientation region of the device 1000 and perform a wireless connection with a target device located in the front direction of the device 1000 from among found target devices. For example, in response to an input of pushing a button 1180, the device 1000 may search for target devices 2181, 2182, and 2183 located in the orientation region of the device 1000. The first input is not limited to the input of pushing the physical button 1180, and may include a button input, a touch input, a gesture, a voice, an eye direction, and device-motion recognition.

When a plurality of target devices 2182 and 2183 are overlapped with each other in the front direction and thus it is difficult to specify one target device from among the target devices 2182 and 2183, the device 1000 may mix content respectively received from the plurality of target devices 2182 and 2183, which are located in the front direction, in correspondence with relative locations of plurality of target devices 2182 and 2183 and output a result of the mixing. For example, the device 1000 may display the content received from the target device 2182, which is located on the left side of the center of the front direction, on a left portion 1182 of a display of the device 1000, and display the content received from the target device 2183, which is located on the right side of the center of the front direction, on a right portion 1183 of the display of the device 1000. The device 1000 may display the content received from the target device 2183, which is closer to the center of the front direction from among the plurality of target devices 2182 and 2183, as having a larger size.

Accordingly, a user may intuitively recognize that a target device that transmits content being displayed as having the largest size is a target device corresponding to the front direction, and the device 1000 may select a target device closest to the center of the front direction according to relative locations of a plurality of target devices.

In response to a second input, the device 1000 may determine that a wireless connection with the selected target device is maintained. The device 1000 may disconnect the wireless connection with an unselected target device. For example, in response to an input of releasing the button 1180, the device 1000 may determine that the wireless connection with the selected target device is maintained. The second input is not limited to the input of pushing the physical button 1180, and may include a button input, a touch input, a gesture, a voice, an eye direction, and device-motion recognition.

FIG. 19 illustrates another example of a wireless connecting method when a plurality of target devices are located in a front direction of a device according to various embodiments of the present disclosure.

Referring to FIG. 19, the device 1000 may be a headset, and target devices may include an audio player 2191, a mobile terminal 2192, and a TV 2193.

In response to a first input, the device 1000 may search for the target devices 2191, 2192, and 2193 located in an orientation region of the device 1000 and perform a wireless connection with a target device located in the front direction of the device 1000 from among found target devices.

When a plurality of target devices 2192 and 2193 are overlapped with each other in the front direction and thus it is difficult to specify one target device from among the target devices 2192 and 2193, the device 1000 may mix content respectively received from the plurality of target devices 2182 and 2183, which are located in the front direction, in correspondence with relative locations of plurality of target devices 2192 and 2193 and output a result of the mixing. For example, the device 1000 may output the content received from the target device 2182, which is located on the left side of the center of the front direction, via a left speaker of the device 1000, and output the content received from the target device 2183, which is located on the right side of the center of the front direction, on a right speaker of the device 1000. The device 1000 may display the content received from the target device 2183, which is closer to the center of the front direction from among the plurality of target devices 2182 and 2183, as having a larger volume.

Accordingly, a user may intuitively recognize that a target device that transmits content being displayed as having the largest volume is a target device corresponding to the front direction. Since a volume according to a change in the relative locations of target devices varies every time the front direction of the device 1000 is changed, the user may induce the device 1000 to be accurately oriented toward a desired target device.

The device 1000 may select a target device close to the center of the front direction, according to the relative locations of the plurality of target devices.

Accordingly, in response to a second input, the device 1000 may determine that the wireless connection with the selected target device is maintained. The device 1000 may disconnect the wireless connection with an unselected target device.

Figure 20:
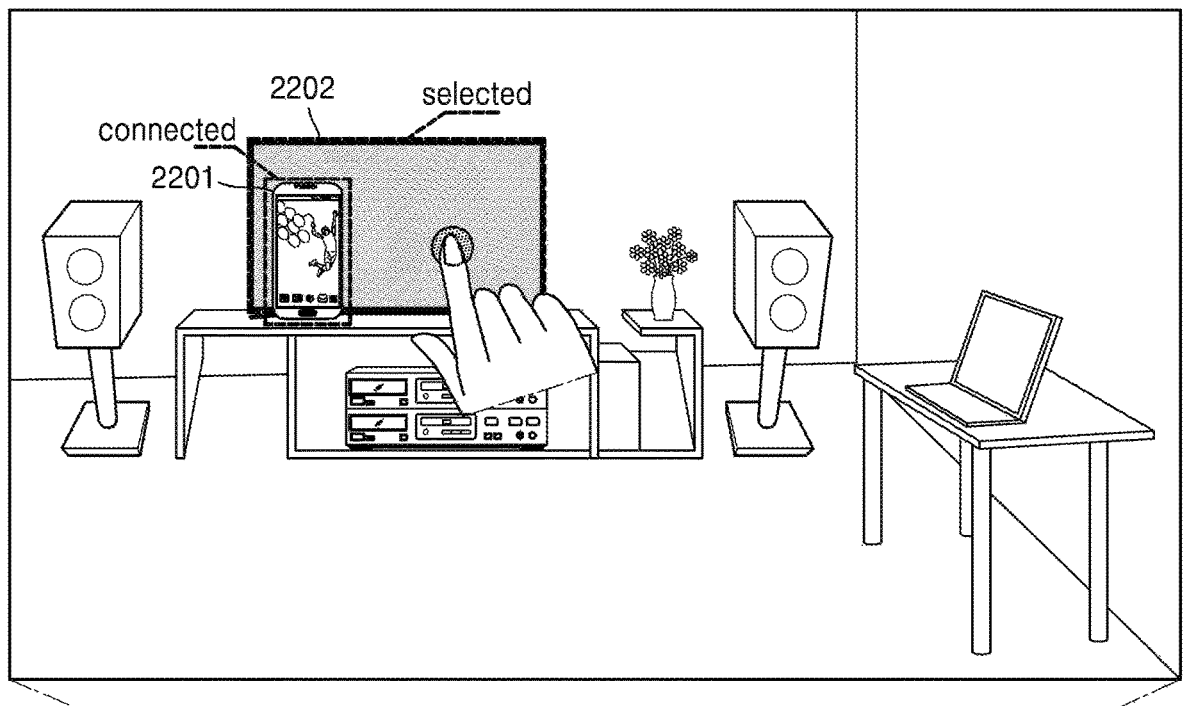
FIG. 20 illustrates another example of a wireless connecting method when a plurality of target devices are located in a front direction of a device according to various embodiments of the present disclosure.

FIG. 20 illustrates another example of a wireless connecting method when a plurality of target devices are located in a front direction of a device according to various embodiments of the present disclosure.

Referring to FIG. 20, the device 1000 may be a device capable of providing augmented reality to a user, and target devices may include a mobile terminal 2201 and a TV 2202.

When a plurality of target devices 2201 and 2202 are overlapped with each other in the front direction and thus it is difficult to specify one target device from among the target devices 2201 and 2202, the device 1000 may temporarily perform a wireless connection with the plurality of target devices 2201 and 2202, which are located in the front direction, and display the wireless connections of the device 1000 on the augmented reality.

The device 1000 may recognize a gesture (for example, an operation of selecting the target device 2202 in augmented reality) of a user and thus select the target device 2202 from the plurality of target devices 2201 and 2202.

Accordingly, the user intuitively selects a target device recognized as being located in the front direction via augmented reality, and thus the device 1000 may determine that the wireless connection with the selected target device is maintained. The device 1000 may disconnect the wireless connection with an unselected target device.

FIG. 21 illustrates another example of a wireless connecting method when a plurality of target devices are located in a front direction of a device according to various embodiments of the present disclosure.

Referring to FIG. 21, the device 1000 may be a device capable of recognizing a voice of a user, and target devices may include a TV 2211, a camera 2212, and a mobile terminal 2213.

When a plurality of target devices 2211 and 2212 are overlapped with each other in the front direction and, thus, it is difficult to specify one target device from among the target devices 2211 and 2212, the device 1000 may temporarily perform a wireless connection with the plurality of target devices 2211 and 2212, which are located in the front direction, and represent that the target devices 2211 and 2212 have been wirelessly connected.

In this case, the device 1000 may recognize a voice of a user indicting a specific location, and thus select the target device 2212 from the plurality of target devices 2211 and 2212. For example, when a plurality of target devices are overlapped with one another and are lined up and the device recognizes a word "the first" from the user, the device 1000 may select a first target device.

Accordingly, the user intuitively selects a target device recognized as being located in the front direction via voice recognition, and thus the device 1000 may determine that the wireless connection with the selected target device is maintained. The device 1000 may disconnect the wireless connection with an unselected target device.

In the aforementioned embodiment of the present disclosure, when a plurality of target devices are located in the front direction of the device 1000, one target device is selected. However, in response to a special third input, wireless connections with all of the plurality of target devices may be maintained. For example, in the case of devices that are wirelessly connected with the device 1000 together, such as a keyboard, a mouse, and a monitor, it may be convenient to perform the wireless connections simultaneously according to a single input signal.

Figure 22:
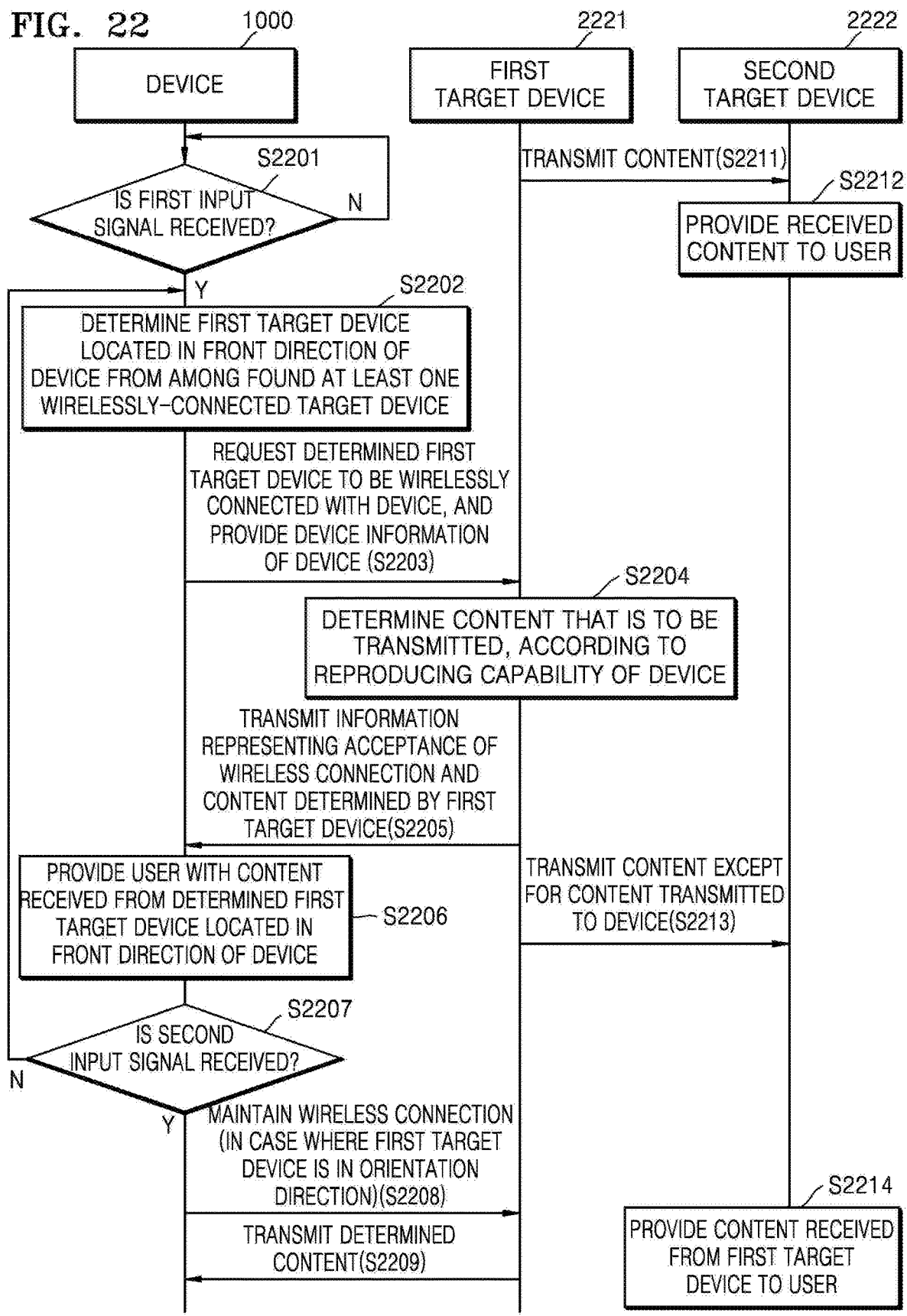
FIG. 22 is a flowchart of an example in which a device is simultaneously wirelessly connected with a second target device and a first target device according to various embodiments of the present disclosure.

FIG. 22 is a flowchart of an example in which a device is simultaneously wirelessly connected with a second target device and a first target device according to various embodiments of the present disclosure.

In operation S2201, the device 1000 determines whether a first input signal is received, and, as the first input signal is received, the device 1000 searches for at least one target device located in an orientation region of the device 1000.

In operation S2202, the device 1000 may determine the first target device 2221 located in a front direction of the device 1000 from among found at least one target device 2000.

In operation S2203, the device 1000 may request the determined first target device 2221 to be wirelessly connected with the device 1000, and provide device information of the device 1000. The device information may include information about a reproducing capability of the device 1000. For example, when the device 1000 is a headphone, the device information may include information representing that the device 1000 is able to reproduce only sound content.

In operation S2204, the first target device 2221 determines content that is to be transmitted, according to the reproducing capability of the device 1000. The first target device 2221 may have already transmitted content to the second target device 2222, in operation S2211, and the second target device 2222 may have already provided received content to a user, in operation S2212.

In this case, the first target device 2221 may determine the reproducing capabilities of the device 1000 and the second target device 2222 and transmit content having the most appropriate form to the device 1000 and the second target device 2222. For example, when the device 1000 is a headset and the second target device 2222 is a TV, the first target device 2221 may transmit sound content to the device 1000 and transmit image content to the second target device 2222.

Accordingly, in operation S2205, the device 1000 may receive, from the first target device 2221, information representing acceptance of a wireless connection and the content determined by the first target device 2221. Thus, the device 1000 may provide the received content to the user, in operation S2206. When a second input signal is received in operation S2207, the device 1000 may maintain wireless connection, in operation S2208. In operation S2209, the device 1000 may receive the determined contents from the first target device 2221.

In operation S2213, the second target device 2222 may receive content except for the content that is transmitted to the device 1000. In operation S2214, the second target device 2222 may provide the content received from the first target device 2221 to the user.

Figure 23B:
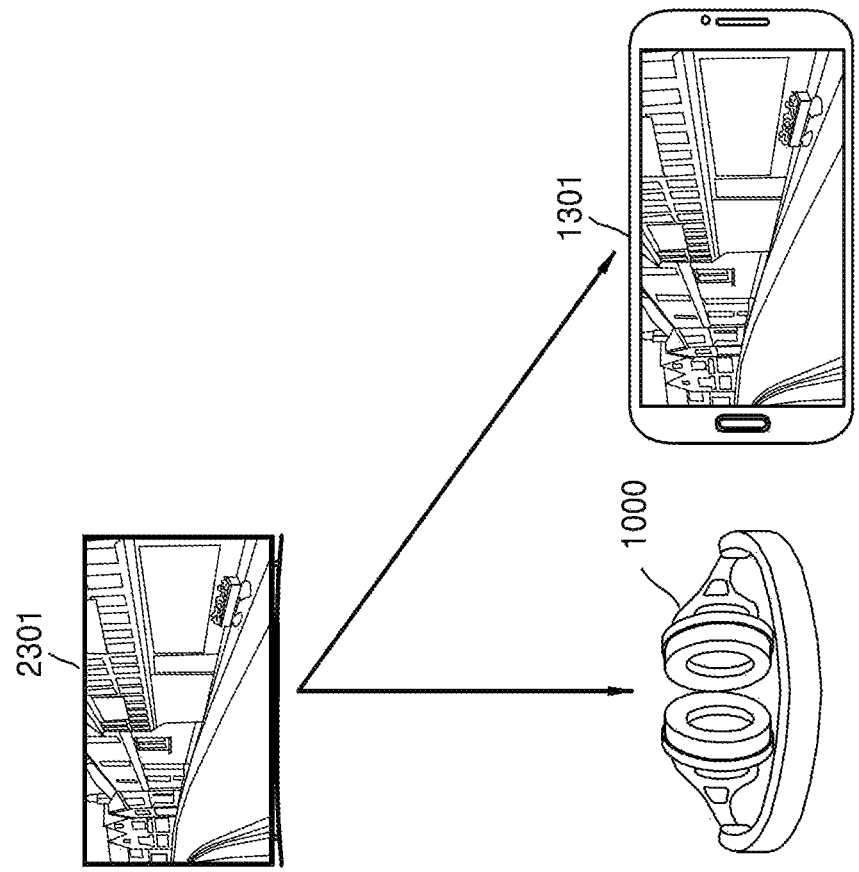
FIGS. 23A and 23B illustrate an example in which a device selectively receives content based on a reproducing capability according to various embodiments of the present disclosure.
Figure 23A:
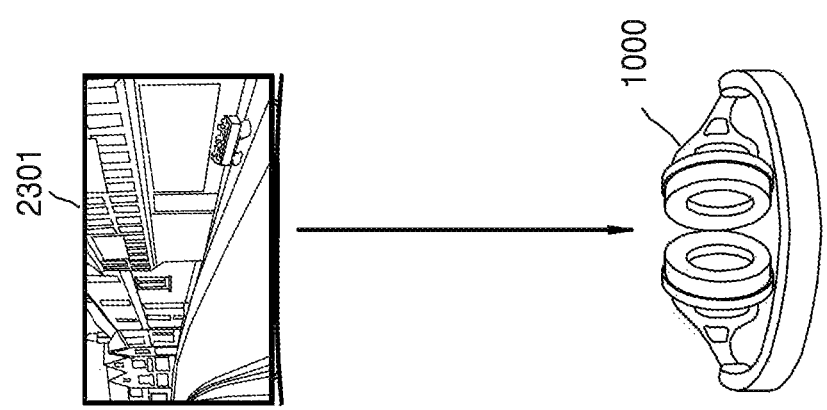

FIGS. 23A and 23B illustrate an example in which a device selectively receives content based on a reproducing capability according to various embodiments of the present disclosure.

Referring to FIG. 23A, when a first target device 2301 is capable of providing image content and sound content, but the device 1000 is a headset capable of outputting only sound content, the device 1000 may receive only the sound content.

Referring to FIG. 23B, when a first target device 2301 is capable of providing image content and sound content, but a second target device 1301 capable of outputting image content and sound content is connected to a device 1000 capable of outputting only sound content and is additionally connected to the first target device 2301, the first target device 2301 may transmit image content and sound content to the device 1000 and the second target device 1301, respectively. In this case, the second target device 1301 may receive only image content. In other words, since the second target device 1301 is connected to both the device 1000, capable of outputting only sound content, and the first target device 2301 even when the second target device 1301 is capable of outputting both image content and sound content, the second target device 1301 may output content having the most optimal form in consideration of a usage behavior.

Figure 24:
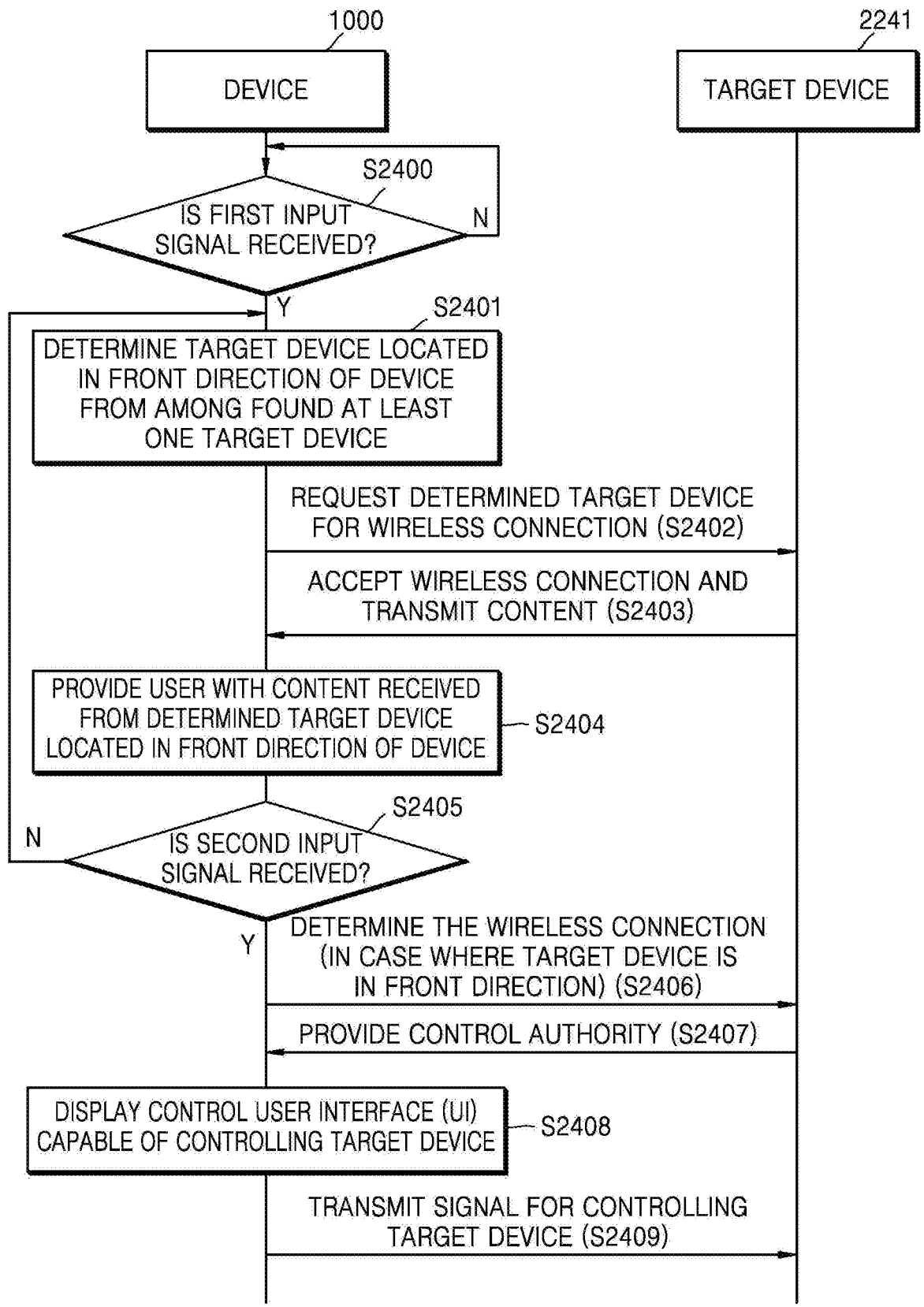
FIG. 24 is a flow diagram of an additional operation when a device has been wirelessly connected to a target device according to various embodiments of the present disclosure.

FIG. 24 is a flow diagram of an additional operation when a device has been wirelessly connected to a target device according to various embodiments of the present disclosure.

Referring to FIG. 24, in operation S2400, the device 1000 determines whether a first input signal is received, and, as the first input signal is received, the device 1000 searches for at least one target device located in an orientation region of the device 1000.

In operation S2401, the device 1000 may determine the target device 2241 located in a front direction of the device 1000 from among found at least one target device.

In operation S2402, the device 1000 requests the determined target device 2241 for wireless connection. When the determined target device 2241 accepts the wireless connection in operation S2403, the device 1000 receives content from the target device 2241, in operation S2404.

In operation S2405, the device 1000 determines whether a second input signal is received. If the second input signal is not received, the device 1000 informs the determined target device 2241 that wireless connection with the determined target device 2241 is maintained, in operation S2406.

In operation S2407, as the wireless connection with the determined target device 2241 is determined to be maintained, the device 1000 may receive a control authority from the target device 2241.

Thus, in operation S2408, the device 1000 may display a control UI capable of controlling the target device 2241.

In operation S2409, the device 1000 may transmit a signal for controlling the target device 2241, based on a selection by the user.

Thus, the device 1000 may induce a wireless connection with the target device 2241 to be intuitively performed, by providing the user with content received from the target device 2241 located in the front direction. After the wireless connection is performed, the device 1000 may receive additional content, such as an authority to control a target device, and control the target device 2241.

Figure 25:
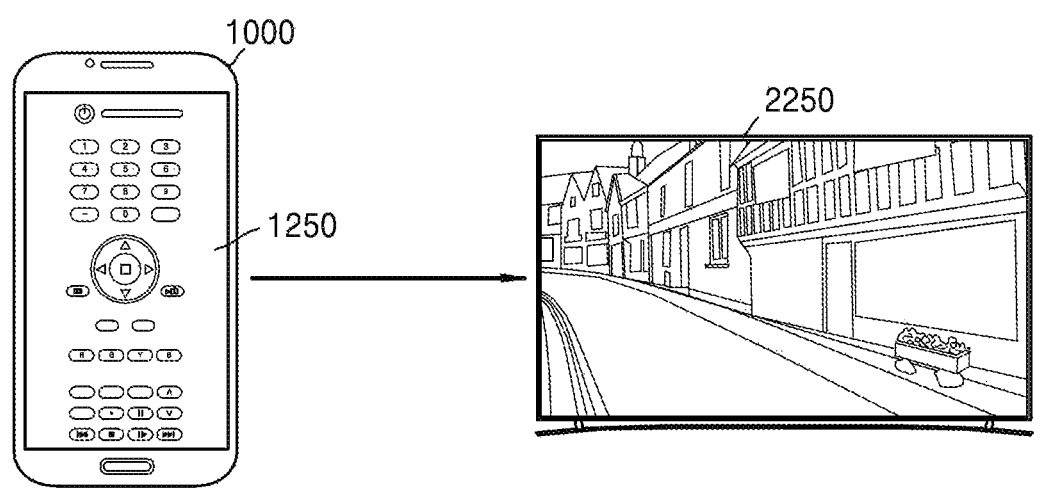
FIG. 25 illustrates an example of an additional operation performed when a device has been wirelessly connected to a target device according to various embodiments of the present disclosure.

FIG. 25 illustrates an example of an additional operation performed when a device has been wirelessly connected to a target device according to various embodiments of the present disclosure.

Referring to FIG. 25, when a wireless connection between the device 1000 and a target device 2250 is determined to be maintained, an output unit 1250 of the device 1000 may provide a UI for controlling the target device 2250.

Figure 26:
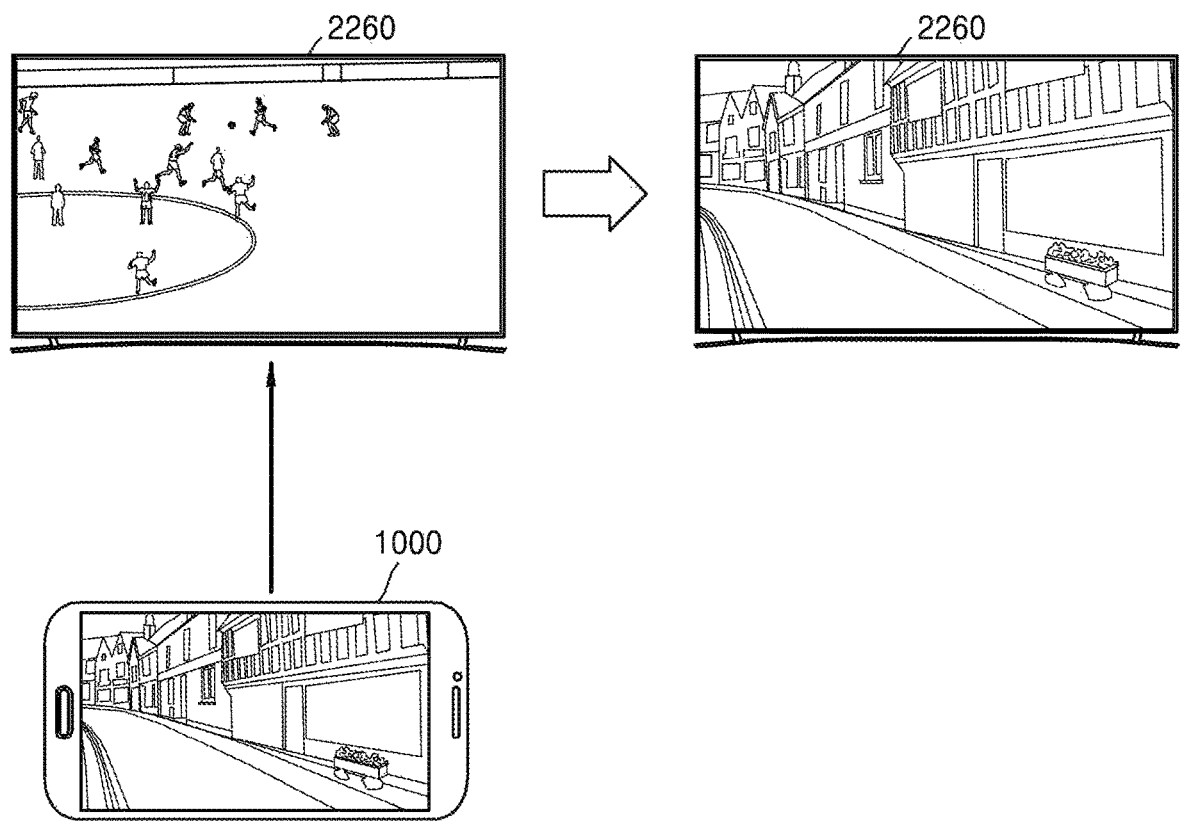
FIG. 26 illustrates another example of an additional operation performed when a device has been wirelessly connected to a target device according to various embodiments of the present disclosure.

FIG. 26 illustrates another example of an additional operation performed when a device has been wirelessly connected to a target device according to various embodiments of the present disclosure.

Referring to FIG. 26, when a wireless connection between the device 1000 and a target device 2260 is determined to be maintained, content that is being reproduced by the device 1000 may be provided to the target device 2260 and may be output via the target device 2260.

In other words, when the device 1000 selects a target device 2260 located in a front direction of the device 1000, the device 1000 receives content from the target device 2260 and outputs the received content. However, after maintenance of the wireless connection between the device 1000 and the target device 2260 is determined as a second input is received, the device 1000 may transmit the content that is being reproduced thereby to the target device 2260.

Figure 27:
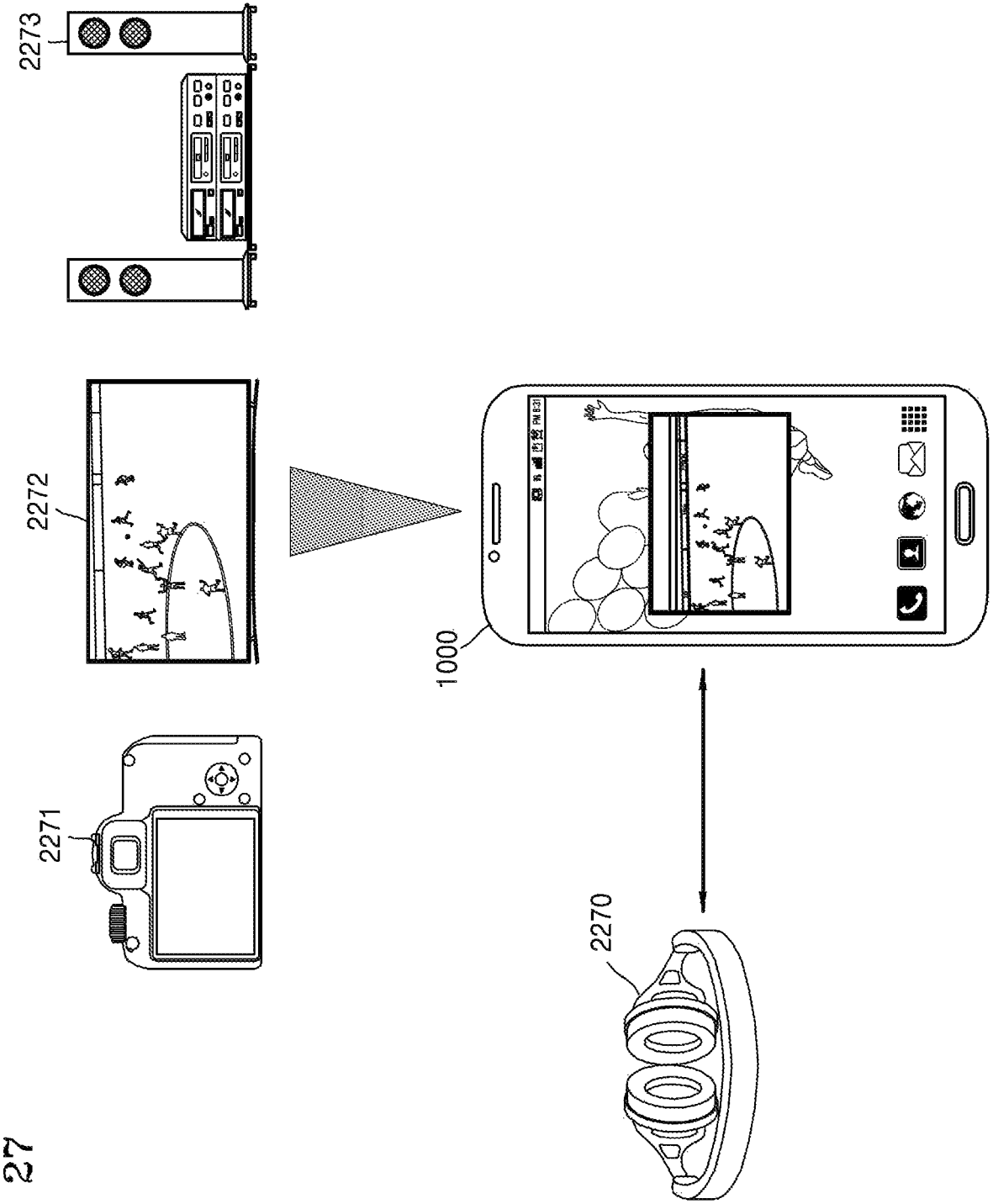
FIG. 27 illustrates another example of an additional operation performed when a device has been wirelessly connected to a target device according to various embodiments of the present disclosure.

FIG. 27 illustrates another example of an additional operation performed when a device has been wirelessly connected to a target device according to various embodiments of the present disclosure.

Referring to FIG. 27, when it is determined according to various embodiments that the wireless connection of the device 1000 with a headset 2270 previously located in a front direction of the device 1000 is maintained, the wireless connection is independently maintained independently of a change in the front direction of the device 1000. Thus, while the wireless connection of the device 1000 with the headset 2270 is being maintained, the device 1000 may additionally search for target devices 2271, 2272, and 2273 located in an orientation region of the device 1000 in response to a first input signal. In response to a second input signal, the device 1000 may determine that an additional wireless connection to the target device 2272 located in a front direction of the device 1000 is maintained.

Figure 28:
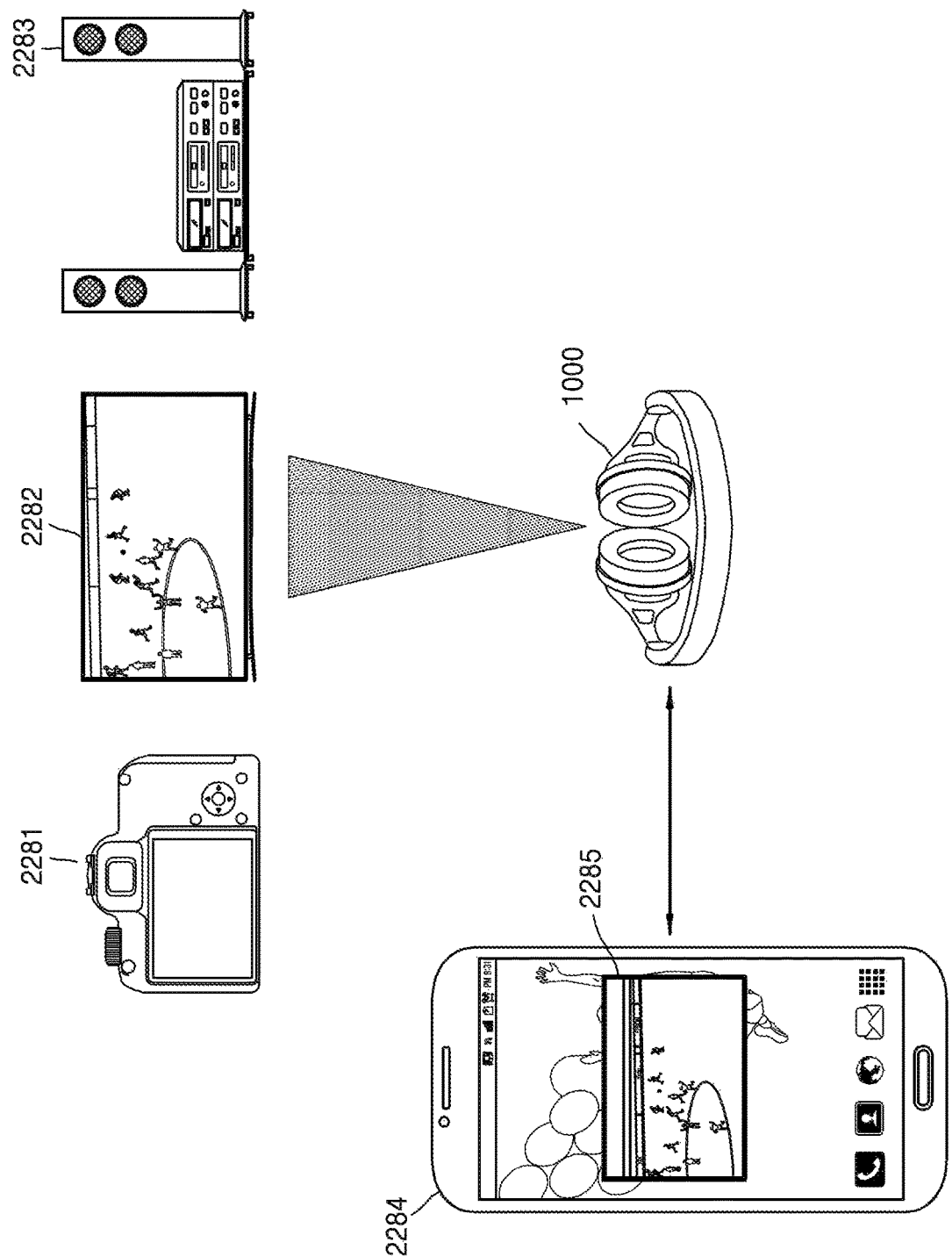
FIG. 28 illustrates another example of an additional operation performed when a device has been wirelessly connected to a target device according to various embodiments of the present disclosure.

FIG. 28 illustrates another example of an additional operation performed when a device has been wirelessly connected to a target device according to various embodiments of the present disclosure.

Referring to FIG. 28, when it is determined according to various embodiments that a wireless connection of the device 1000 with a target device 2284 previously located in a front direction of the device 1000 is maintained, the wireless connection is independently maintained independently of a change in the front direction of the device 1000.

Thus, as described above with reference to the embodiment of FIG. 27, while the wireless connection of the device 1000 with the target device 2284 is being maintained, the device 1000 may additionally search for target devices 2281, 2282, and 2283 located in an orientation region of the device 1000 in response to a first input signal. However, when the device 1000 includes no displays as in the case of headsets, it may be difficult to determine a front direction device. In this case, the device 1000 may determine whether the target device 2284 including a display 2285 exists among target devices of which wireless connections are maintained, and display content received from the target device 2282, which is located in the front direction of the device 1000, on the display 2285 of the target device 2284 of which the wireless connection is maintained. Thus, a user may intuitively determine whether connection with the target device 2282 is maintained.

Figure 29:
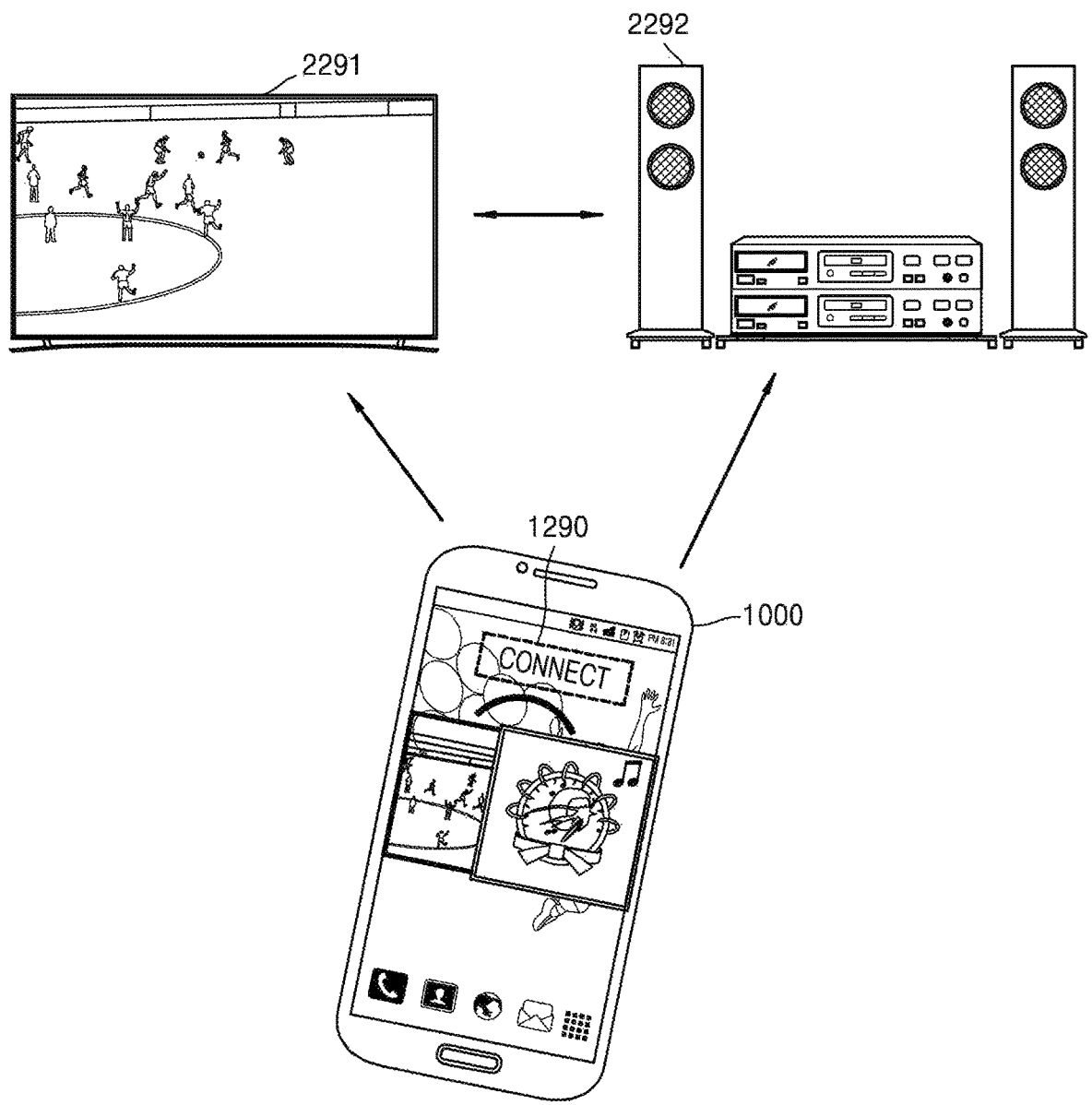
FIG. 29 illustrates another example of an additional operation performed when a device has been wirelessly connected to a target device according to various embodiments of the present disclosure.

FIG. 29 illustrates another example of an additional operation performed when a device has been wirelessly connected to a target device according to various embodiments of the present disclosure.

Referring to FIG. 29, when maintenance of a wireless connection of the device 1000 with a plurality of target devices, namely, first and second target devices 2291 and 2292, is determined, the device 1000 may provide a user with a popup window 1290 asking whether to perform a wireless connection between the first and second target devices 2291 and 2292, and may enable the wireless connection to be performed between the first and second target devices 2291 and 2292.

In other words, the user may use the device 1000 to perform the wireless connection between the first target device 2291 and the second target device 2292.

For example, the first target device 2291 located in a front direction of the device 1000 when a first input signal is received by the device 1000, and a second target device 2292 located in a front direction of the device 1000 when a second input signal is received by the device 1000 may be controlled to be connected to each other. Thus, content that is being reproduced by the first target device 2291 may be transmitted to the second target device 2292 and reproduced by the second target device 2292.

When the device 1000, the first target device 2291, and the second target device 2292 are all wirelessly connected to one another, the device 1000 may select and control data that is transmitted or received between the first target device 2291 and the second target device 2292. For example, data copied from the first target device 2291 may be pasted to the second target device 2292.

Figure 30A:
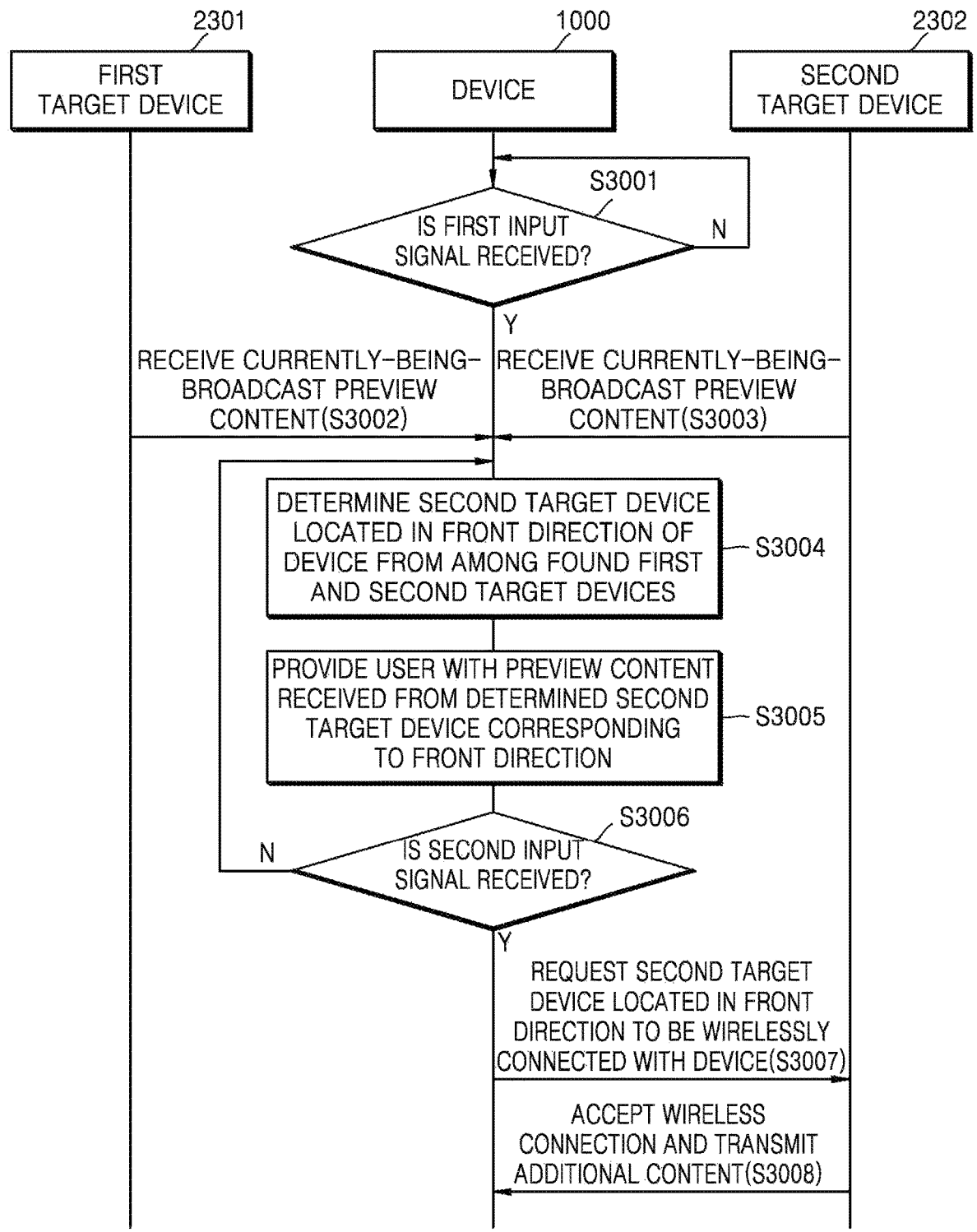
FIG. 30A is a flow diagram of another example in which a device is wirelessly connected with a target device according to various embodiments of the present disclosure.

FIG. 30A is a flow diagram of another example in which a device is wirelessly connected with a target device according to various embodiments of the present disclosure.

Referring to FIG. 30A, a device 1000 may receive and output preview content in order to determine whether to maintain a wireless connection of the device 1000 with a second target device 2302 corresponding to the front direction according to a first input signal. When it is determined that the wireless connection is maintained, the device 1000 may transmit additional content to thereby minimize data loss.

In detail, in operation S3001, the device 1000 determines whether the first input signal is received, and, when the first input signal is received, the device 1000 searches for at least one target device located in an orientation region of the device 1000.

In operations S3002 and S3003, the device 1000 receives currently-being-broadcast preview content from each of found first and second target devices 2301 and 2302. The preview content may include preview data about the content that is respectively reproduced by the first target device 2301 and the second target device 2302. For example, if a target device is reproducing a moving picture, preview data may be a still image, and if the target device is displaying a picture, preview data may be a thumbnail of the picture. The preview data may further include sound data for identifying a target device.

In operation S3004, the device 1000 may determine the second target device 2302 located in the front direction of the device 1000 from among the found first and second target devices 2301 and 2302.

In operation S3005, the device 1000 may provide a user with preview content received from the determined second target device 2302 corresponding to the front direction.

The user may determine whether the second target device 2302 corresponding to the front direction is a target device intended to be connected to the device 1000, via the preview content. In other words, even before the wireless connection is performed, the device 1000 may receive preview content from a target device located in the front direction of the device 1000 and output the received preview content.

In operation S3006, the device 1000 determines whether a second input signal is received. If the second input signal is not received, operations S3004 and S3005 are repeated. At this time, if the front direction is changed, the device 1000 may provide a user with content received from a target device located in the changed front direction.

When the second input signal is received, the device 1000 may request the second target device 2302 located in the front direction to be wirelessly connected with the device 1000, in operation S3007.

In operation S3008, when the wireless connection with the second target device 2302 is completed, the device 1000 may receive additional content from the second target device 2302. For example, the device 1000 may receive content that is currently being reproduced by the second target device 2302.

Although preview content is broadcast in the present embodiment of the present disclosure, embodiments are not limited thereto, and the device 1000 may receive content from a target device located in a front direction of the device 1000.

Figure 30B:
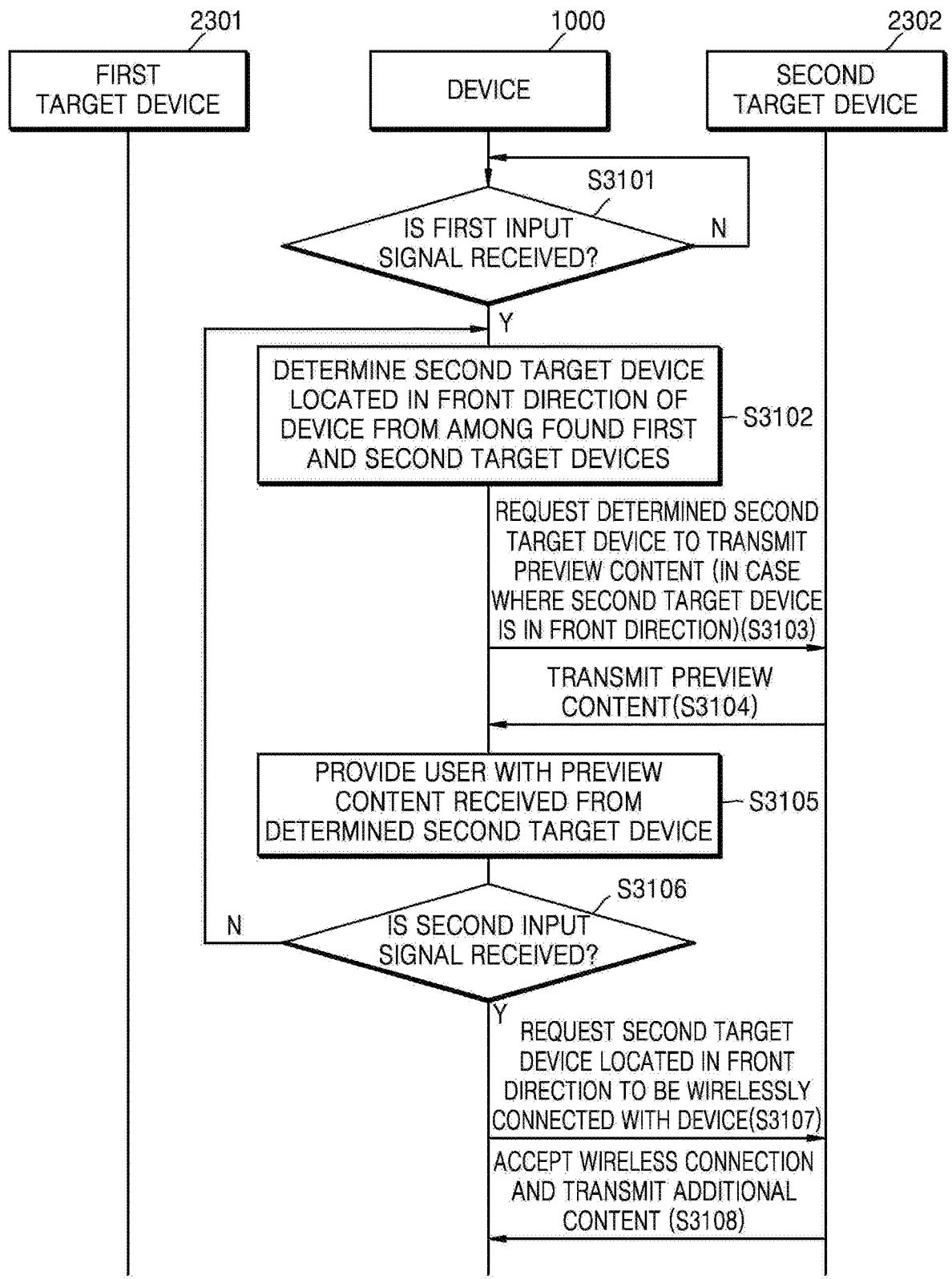
FIG. 30B is a flow diagram of another example in which a device is wirelessly connected with a target device according to various embodiments of the present disclosure.

FIG. 30B is a flow diagram of another example in which a device is wirelessly connected with a target device according to various embodiments of the present disclosure.

Referring to FIG. 30B, in operation S3101, the device 1000 determines whether the first input signal is received, and, when the first input signal is received, the device 1000 searches for at least one target device located in an orientation region of the device 1000.

In operation S3102, the device 1000 may determine a second target device 2302 located in the front direction of the device 1000 from among found first and second target devices 2301 and 2302.

In operation S3103, the device 1000 requests the determined second target device 2302 to transmit preview content. In operation S3104, the device 1000 may receive the preview content from the determined second target device 2302.

In operation S3105, the device 1000 may provide a user with the preview content received from the determined second target device 2302 corresponding to the front direction.

Accordingly, even before the wireless connection is performed, the device 1000 may receive preview content from a target device located in the front direction of the device 1000 and output the received preview content.

In operation S3106, the device 1000 determines whether a second input signal is received. If the second input signal is not received, operations S3102 through S3105 are repeated. At this time, if the front direction is changed, the device 1000 may provide a user with content received from a target device located in the changed front direction.

When the second input signal is received, the device 1000 may request the second target device 2302 located in the front direction to be wirelessly connected with the device 1000, in operation S3107.

In operation S3108, when the wireless connection with the second target device 2302 is completed, the device 1000 may receive additional content from the second target device 2302. For example, the device 1000 may receive content that is currently being reproduced by the second target device 2302, or may control the second target device 2302.

Figure 31:
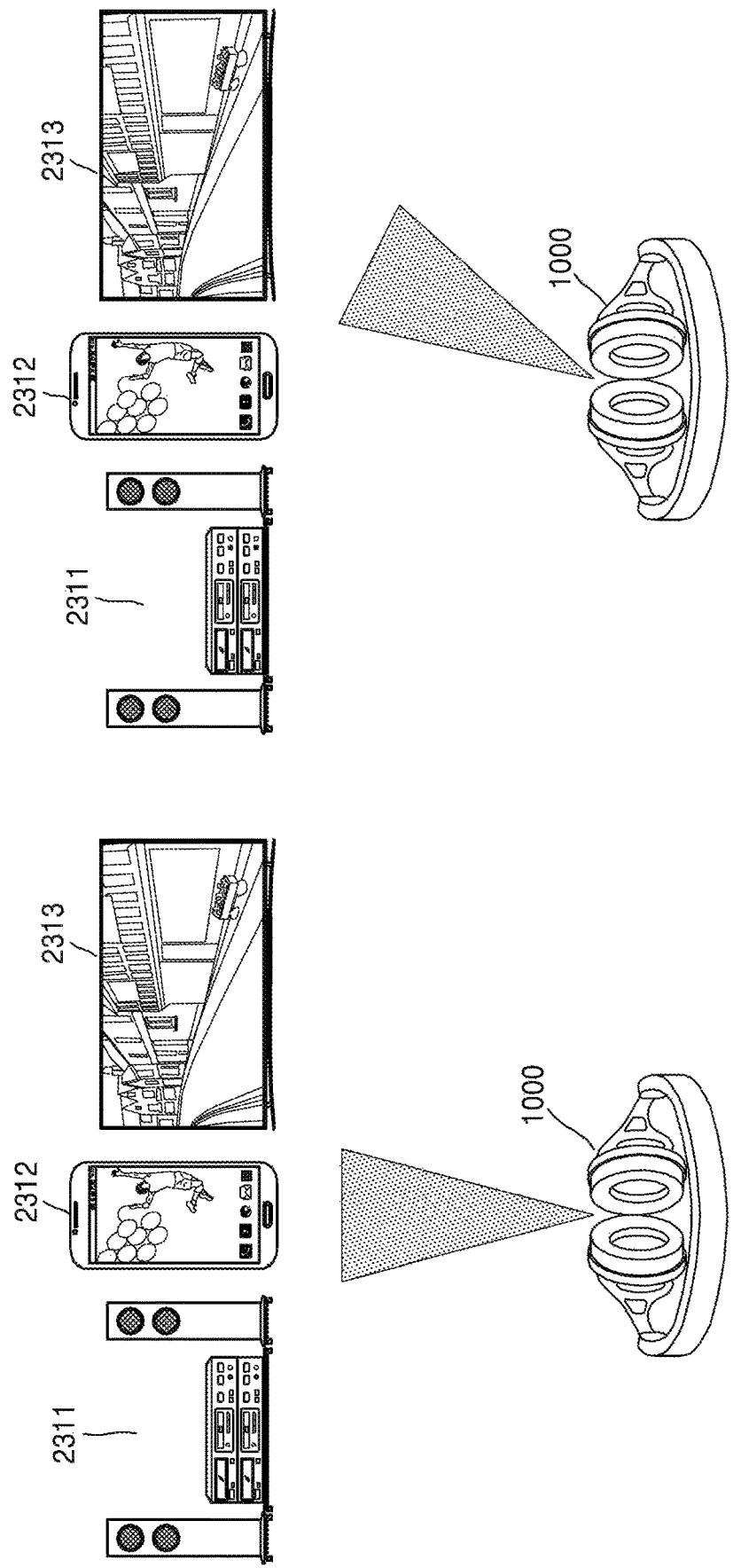
FIG. 31 illustrates an example in which a device receives preview content from a target device according to various embodiments of the present disclosure.

FIG. 31 illustrates an example in which a device receives preview content from a target device according to various embodiments of the present disclosure.

Referring to FIG. 31, the device 1000 may be a headset, and target devices may include an audio player 2311, a mobile terminal 2312, and a TV 2313.

In response to a first input, the device 1000 may search for the target devices 2311, 2312, and 2313 located in an orientation region of the device 1000 and receive preview content from found target devices. The device 1000 may determine the front direction and provide a user with the preview content received from the target device 2312 located in the front direction from among the received preview content.

When the front direction is changed, the device 1000 may also provide the user with the preview content received from the target device 2313 located in the changed front direction. Thus, since the device 1000 provides the user with preview content having less data than content that is actually reproduced by a target device, the device 1000 may receive content from a target device located in a front direction of the device 1000 at a high speed.

In response to a second input signal, the device 1000 may perform a wireless connection to the target device 2313 from which the device 1000 currently receives preview content.

Figure 32:
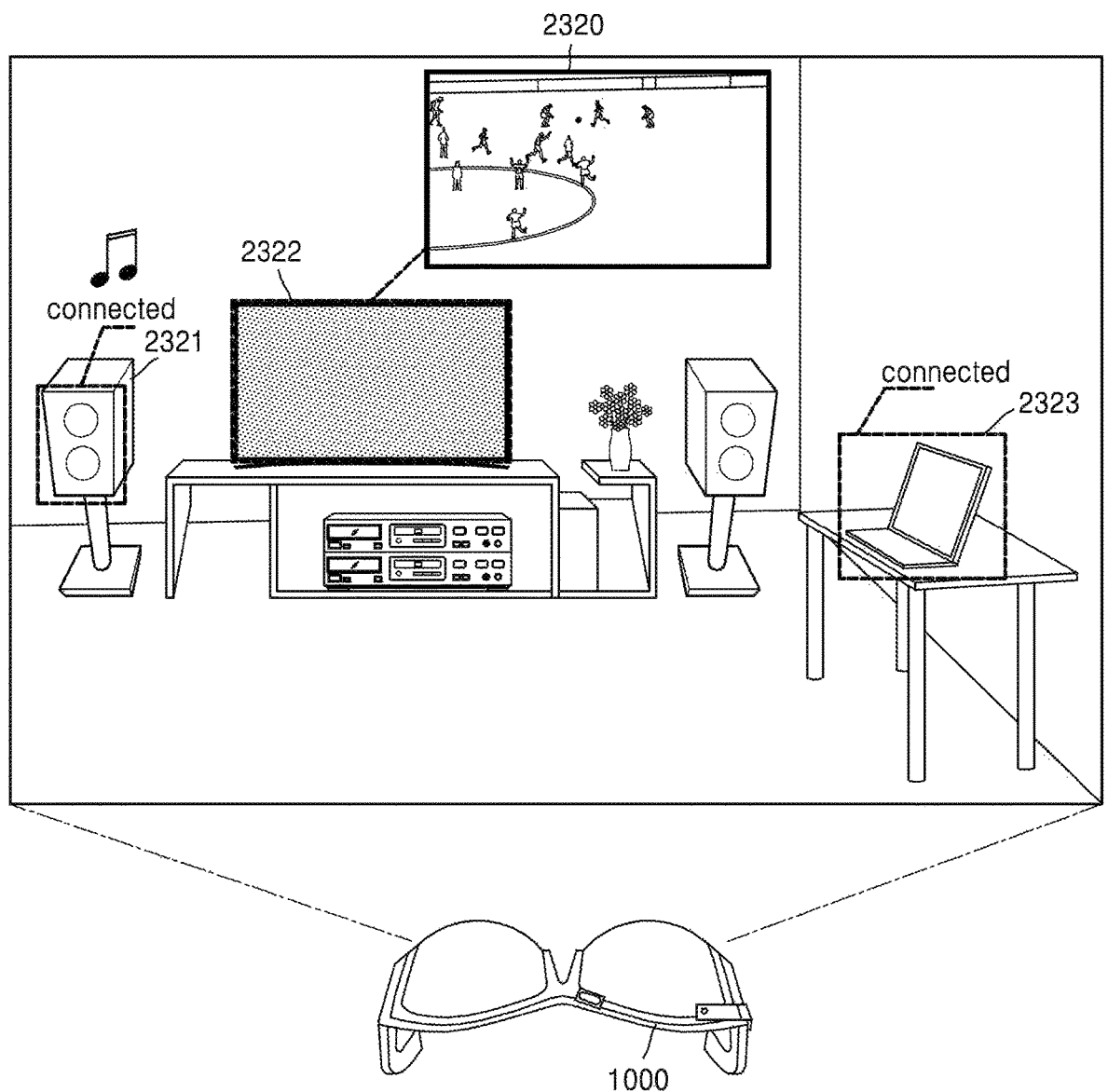
FIG. 32 illustrates another example in which a device receives preview content from a target device according to various embodiments of the present disclosure.

FIG. 32 illustrates another example in which a device receives preview content from a target device according to various embodiments of the present disclosure.

Referring to FIG. 32, the device 1000 may be a device capable of providing augmented reality to a user, and target devices may be an audio player 2321, a TV 2322, and a computer 2323.

The device 1000 may provide a user with preview content received from the target devices 2321, 2322, and 2323 found from an orientation region of the device 1000, via augmented reality. The device 1000 may apply a graphical indicator 2320 to a target device corresponding to a current front direction of the device 1000 such that the user may recognize the graphical indicator 2320. Thus, by specifically indicating, as indicated by graphical indicator 2320, a target device located in the front direction of the device 1000 via augmented reality, the user may intuitively determine a target device that is to be wirelessly connected to the device 1000. Thus, the device 1000 may increase data processing efficiency by outputting the graphical indicator 2320 to the target device 2322 located in the front direction via the preview content.

Figure 33:
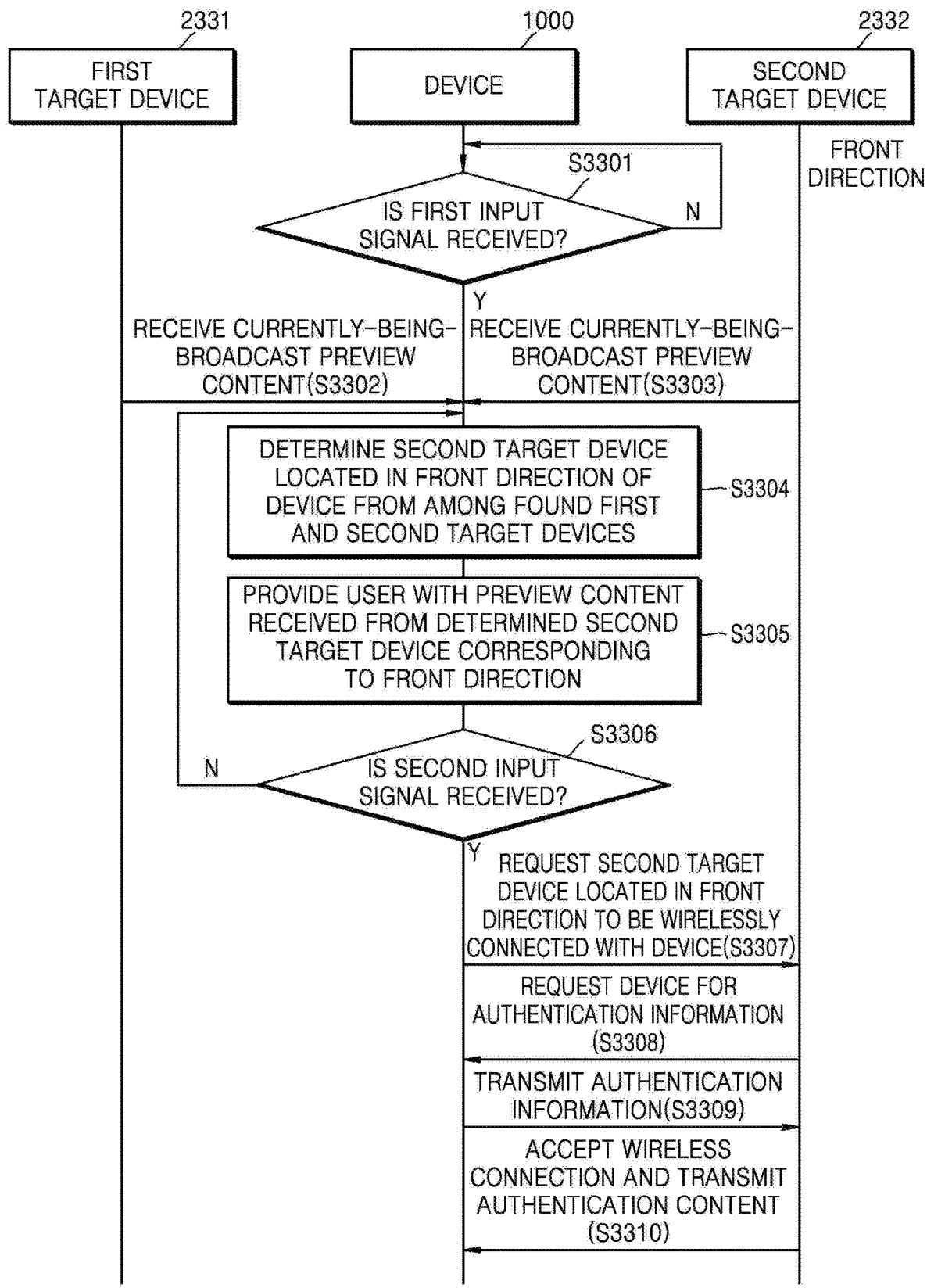
FIG. 33 is a flow diagram of another example in which a device is wirelessly connected with a target device according to various embodiments of the present disclosure.

FIG. 33 is a flow diagram of another example in which a device is wirelessly connected with a target device according to various embodiments of the present disclosure.

Referring to FIG. 33, in operation S3301, a device 1000 determines whether the first input signal is received, and, when the first input signal is received, the device 1000 searches for at least one target device located in an orientation region of the device 1000.

In operations S3302 and S3303, the device 1000 receives currently-being-broadcast preview content from each of found first and second target devices 2331 and 2332. The preview content may include preview data about the content that is respectively reproduced by the first target device 2331 and the second target device 2332. For example, the preview data may be data enough to be made public without authentication, and an authority to control a target device, for example, may be excluded.

In operation S3304, the device 1000 may determine the second target device 2332 located in the front direction of the device 1000 from among the found first and second target devices 2331 and 2332.

In operation S3305, the device 1000 may provide a user with the preview content received from the determined second target device 2332 corresponding to the front direction.

The user may determine whether the second target device 2332 corresponding to the front direction is a target device intended to be connected to the device 1000, via the preview content.

In operation S3306, the device 1000 determines whether a second input signal is received. If the second input signal is not received, operations S3304 and S3305 are repeated. At this time, if the front direction is changed, the device 1000 may provide a user with content received from a target device located in the changed front direction.

When the second input signal is received, the device 1000 may request the second target device 2332 located in the front direction to be wirelessly connected with the device 1000, in operation S3307.

In operation S3308, the second target device 2332 may request the device 1000 for authentication information. In operation S3309, the device 1000 may transmit the authentication information to the second target device 2332. In operation S3310, the second target device 2332 may accept the wireless connection and transmit authentication content.

Figure 34:
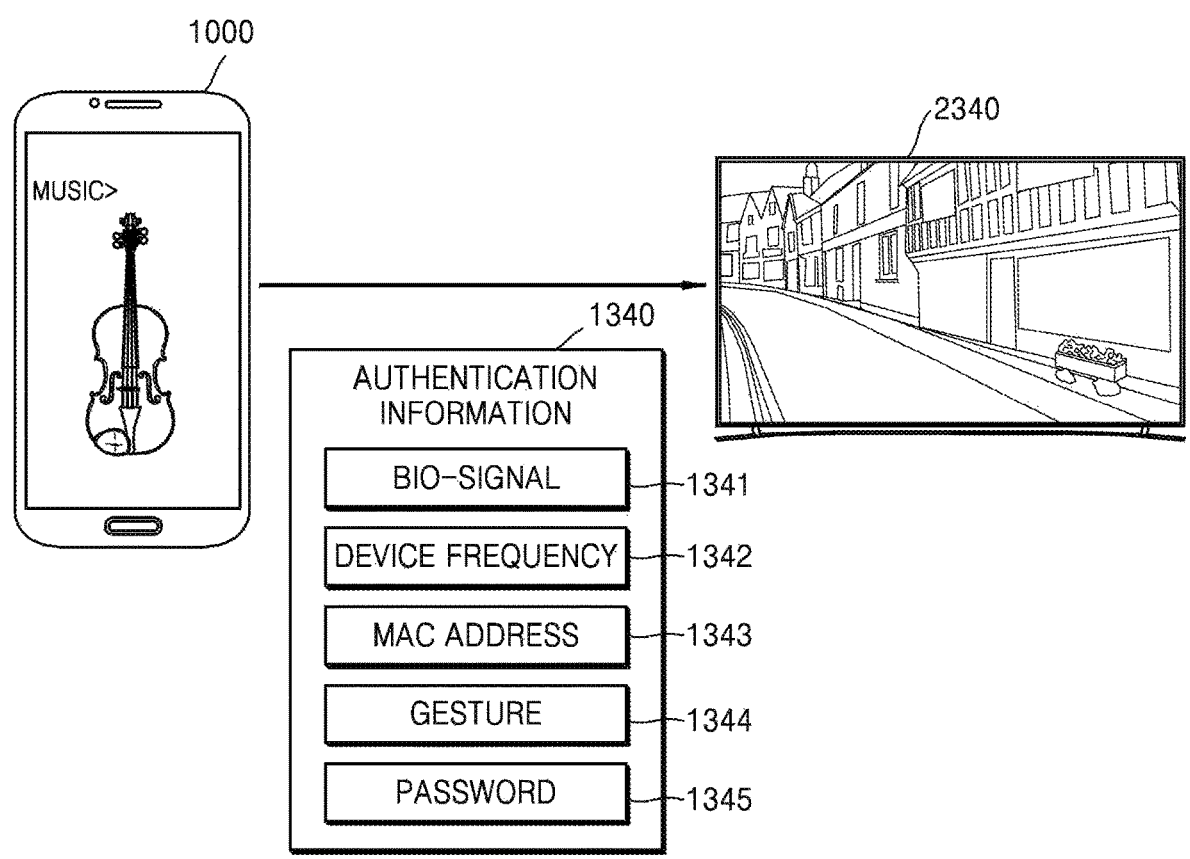
FIG. 34 illustrates authentication information for a device to receive authentication data from a target device according to various embodiments of the present disclosure.

FIG. 34 illustrates authentication information for a device to receive authentication data according to various embodiments of the present disclosure.

Referring to FIG. 34, authentication information 1340 transmitted from the device to a target device 2340 may include a bio-signal 1341, a device frequency 1342, a media access control (MAC) address 1343, a gesture 1344, and a password 1345. The authentication information 1340 may be registered when the device 1000 and the target device 2340 have been wirelessly connected to each other. The authentication information 1340 may be stored in an internal memory of each of the device 1000 and the target device 2340.

Figure 35:
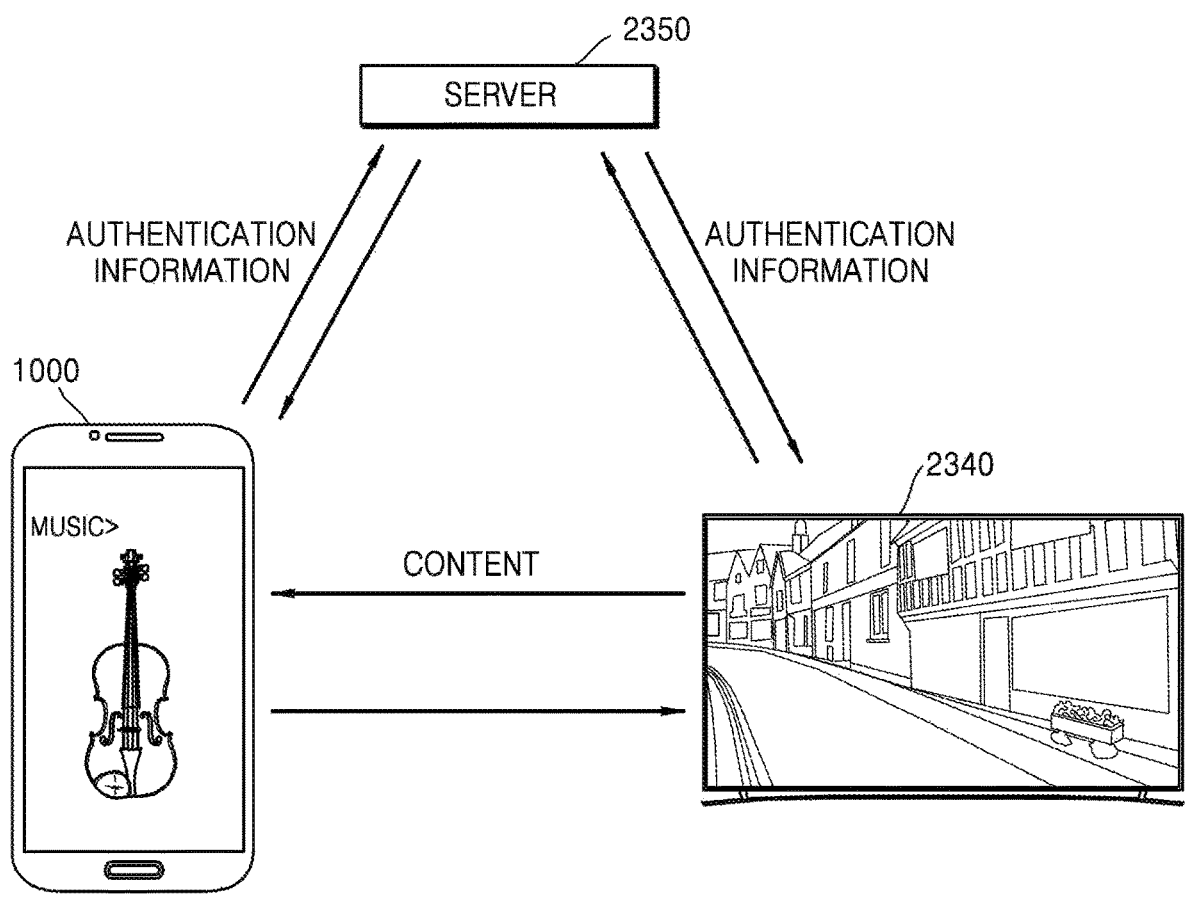
FIG. 35 illustrates authenticating devices via a server according to various embodiments of the present disclosure.

FIG. 35 illustrates authenticating devices via a server according to various embodiments of the present disclosure.

Referring to FIG. 35, an authentication procedure between the device 1000 and a target device 2340 may be performed via a sever 2350, and content may be directly transmitted and received between the device 1000 and the target device 2340.

Accordingly, even when the device 1000 does not repeatedly generate and store authentication information for target devices, the device 1000 may perform authentication with respect to a target device connected with the server 2350, by once performing a procedure of registering authentication information.

The target device may set an authentication level and may provide the device 1000 with different content for each authentication level identified via an authentication procedure.

Referring back to FIG. 33, in operation S3310, when the second target device 2332 accepts a wireless connection and, thus, the wireless connection with the device 1000 is completed, the device 1000 may receive authentication content from the second target device 2302 in operation S3310. For example, the device 1000 may receive a personal picture and a moving picture file that are stored in the second target device 2302.

After receiving the authentication content, the device 1000 may receive and output preview content in order to determine whether to maintain the wireless connection with the second target device 2332 corresponding to the front direction of the device 1000 according to a first input signal. When it is determined according to the second input signal that the wireless connection is maintained, the device 1000 may transmit authentication content according to whether the second target device 2332 is authorized, thereby protecting the privacy of a user of the device 1000.

Figure 36:
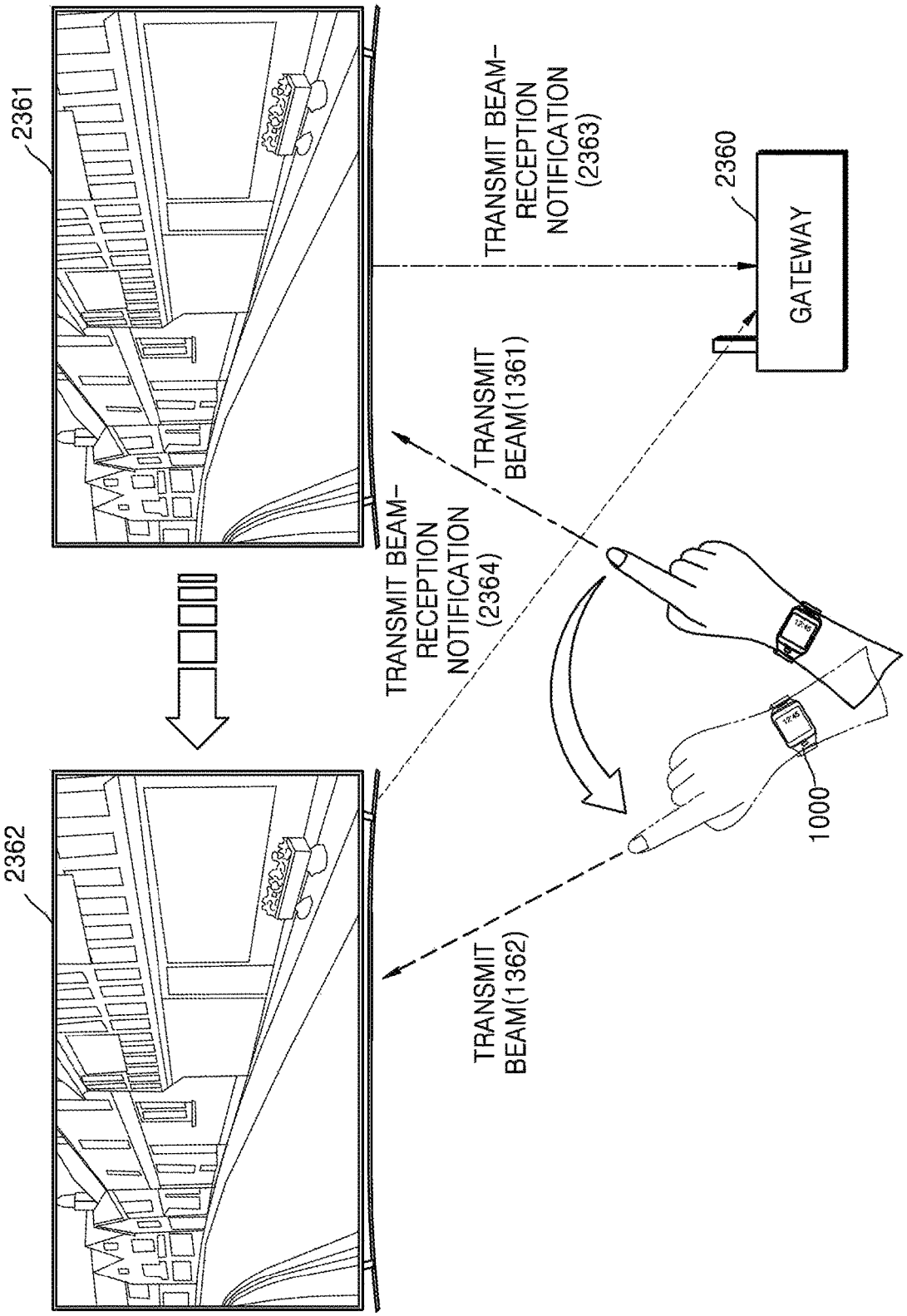
FIG. 36 illustrates an example of a method of performing a wireless connection between target devices according to various embodiments of the present disclosure.

FIG. 36 illustrates a method of performing a wireless connection between target devices according to various embodiments of the present disclosure.

Referring to FIG. 36, the device 1000 may transmit and receive data between a first target device 2361 and a second target device 2362 as an intuitive trigger motion of a user is sensed. In other words, the device 1000 may control data communications between a plurality of target devices.

For example, when a user of the device 1000 senses a trigger motion of transferring content being displayed on the first target device 2361 to the second target device 2362, the device 1000 may sequentially transmit a beam to at least one target device, namely, the first and second target devices 2361 and 2362, corresponding to the trigger motion, as indicated by reference numerals 1361 and 1362. The device 1000 may be a wearable device, such as a smart watch, a smart band, or a smart ring, and may be worn on a hand or a finger, for example, of a user and thus sense a trigger motion. An example of sensing a trigger motion will be described in detail below with reference to FIG. 38. The beam may be formed with directivity, like infrared (IR) light or ultrasound waves, but embodiments are not limited thereto. Thus, the beam may mean a beamforming-type wireless connection signal. The beam may include motion information of the device 1000 or information about content sharing between the first target device 2361 and the second target device 2362. The motion information of the device 1000 may include an orientation direction of the device 1000, a location change thereof, and an angle change thereof. The information about the content sharing may include identification information of the first target device 2361 or the second target device 2362, information about content for which the first target device 2361 is requested, and information about content that is to be displayed on the second target device 2362.

The first and second target devices 2361 and 2362 may be media-reproducible devices including a monitor, a TV, a mobile phone, a tablet PC, a smart watch, smart glasses, or an audio player. The media-reproducible devices may also include things capable of wireless data communications, which will be described below with reference to FIGS. 41A to 41D.

Next, when the first and second target devices 2361 and 2362 receive beams, the first and second target devices 2361 and 2362 transmit reception notifications to a gateway 2360, as indicated by reference numerals 2363 and 2364, and thus the gateway 2360 may receive notification signals according to the sequence in which the first and second target devices 2361 and 2362 receive beams. Thus, the gateway 2360 may request the first and second target devices 2361 and 2362 to transmit and receive data to and from each other according to the sequence of beams received. For example, when the first target device 2361 has received a beam first, the gateway 2360 may request the first target device 2361 to transmit currently-being-reproduced content to the second target device 2362 such that the same screen image is shared by the first and second target devices 2361 and 2362.

Alternatively, the gateway 2360 may request the device 1000 to display a screen image representing information about the first target device 2361 or a screen image capable of controlling the first target device 2361 on the second target device 2362.

The gateway 2360 may be included in a server (not shown) that controls wired and wireless connections between the first target device 2361 and the second target device 2362. The server may transmit beam reception information of the second target device 2362 to the first target device 2361 such that the first target device 2361 may transmit content to the second target device 2362.

Accordingly, in the method of performing a wireless connection between target devices by using the device 1000 according to various embodiments of the present disclosure, without passing through a complicated connecting process between media-reproducible devices located within a certain region, the device 1000 may intuitively transmit or receive content or control a target device, by sensing a trigger motion of a user.

Although the first and second target devices 2361 and 2362 share a screen image according to an action of pointing a finger in FIG. 3, embodiments are not limited thereto.

Figure 37A:
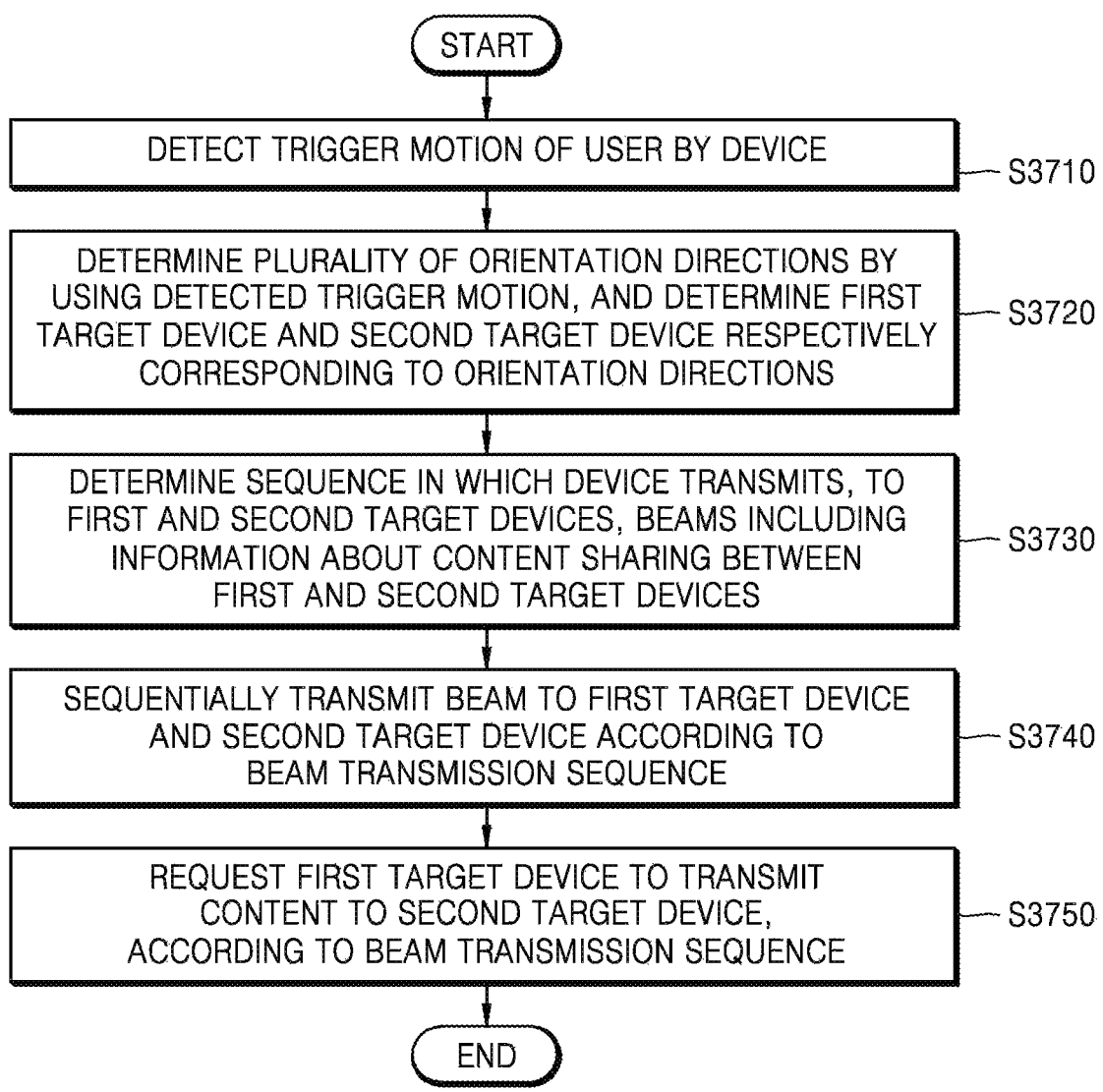
FIG. 37A is a flowchart of a method of performing a wireless connection between target devices by using the wearable device according to various embodiments of the present disclosure.

FIG. 37A is a flowchart of a method for performing a wireless connection between target devices by using a wearable device according to various embodiments of the present disclosure.

Referring to FIG. 37A, in operation S3710, a device 1000 may detect a trigger motion of a user. For example, the trigger motion may be an action of unfolding an arm with only an index finger unfolded, an action of making a fist, an action of unfolding a specific finger, an action of waving an arm, or an action of pointing at an object with a hand, and the device 1000 may detect a trigger motion of a user by using a camera, a motion sensor, an electromyogram sensor, or the like. The trigger motion is not limited thereto, and the trigger motion may be any action of performing triggering so that a beam may be transmitted to a target device by using a part of a body. The trigger motion may be sensed by any other structure capable of recognizing a motion of a user, besides a camera, a motion sensor, or an electromyogram sensor.

In operation S3720, the device 1000 may determine a plurality of orientation directions by using the detected trigger motion, and determine a first target device and a second target device respectively corresponding to the orientation directions.

The device 1000 according to an embodiment may determine the plurality of orientation directions by using the detected trigger motion. For example, the device 1000 may acquire a first orientation direction representing a direction primarily pointed by a user with his or her index finger and a second orientation direction representing a direction secondarily pointed by the user with his or her index finger. The device 1000 may determine that the first target device corresponds to the first orientation direction and the second target device corresponds to the second orientation direction. For example, the device 1000 may determine, as the first target device, a target device located in the first orientation direction from among the plurality of target devices. In another example, the device 1000 may determine, as the second target device, a target device located in the second orientation direction from among the plurality of target devices.

An orientation direction according to an embodiment may mean a direction that is acquired via the detected trigger motion. For example, when a direction of the first target device that is to transmit content is acquired according to the detected trigger motion, a direction in which the device 1000 faces the first target device may be the first orientation direction. In another example, when a direction of the second target device that is to receive content is acquired according to the detected trigger motion, a direction in which the device 1000 faces the second target device may be the second orientation direction. In another example, a direction in which the device 1000 faces a refrigerator that is to transmit content is the first orientation direction according to a primarily-detected trigger motion, and a direction in which the device 1000 faces a TV that is to receive content is the second orientation direction according to a secondarily-detected trigger motion.

In operation S3730, the device 1000 determines a sequence in which the device 1000 transmits beams to the first and second target devices determined in operation S3720.

The beams may include information about content sharing between the first target device and the second target device. Information about content sharing according to an embodiment may include networking information of at least one of the first target device, the second target device, and the device 1000. For example, the beams may include connection information of at least one of the first target device, the second target device, and the device 1000. The access information may include information for use in network access, such as an IP address and a MAC address.

The device 1000 according to an embodiment may determine the sequence in which the device 1000 transmits beams to the first and second target devices, according to a preset method.

For example, the device 1000 may determine the beam transmission sequence, according to the sequence in which a user points at the first and second target devices. When the device 1000 detects a trigger motion corresponding to the first orientation direction earlier than a trigger motion corresponding to the second orientation direction, the device 1000 may determine a beam transmission sequence such that a beam may be transmitted to the first target device corresponding to the first orientation direction earlier than to the second target device corresponding to the second orientation direction.

In operation S3740, the device 1000 may sequentially transmit a beam to the first target device and the second target device according to the beam transmission sequence determined in operation S3730.

For example, when the beam transmission sequence is the first target device and the second target device, the device 1000 may transmit a beam to the first target device and then transmit a beam to the second target device. In another example, when the beam transmission sequence is the second target device and the first target device, the device 1000 may transmit a beam to the second target device and then transmit a beam to the first target device.

When an orientation direction acquired according to the detected trigger motion is moved from the first orientation direction to the second orientation direction, the first target device is placed at a location corresponding to the first orientation direction, the second target device is placed at a location corresponding to the second orientation direction, and no target devices exist between the first orientation direction and the second orientation direction, the device 1000 according to an embodiment may transmit a first beam to the first target device and, after the lapse of a predetermined period of time, may transmit a second beam to the second target device. Alternatively, in this case, the device 1000 according to an embodiment may transmit the first beam to the first target device when the device 1000 recognizes that the first target device is placed in the first orientation direction, and transmit the second beam to the second target device when the device 1000 recognizes that the second target device is placed in the second orientation direction.

The device 1000 according to an embodiment may transmit a beam having directivity, such as IR light or ultrasound waves, or transmit a beamforming-type wireless connection signal.

In operation S3750, the device 1000 may request the first target device to transmit content to the second target device, according to the sequence in which the device 1000 transmits beams.

For example, the device 1000 may request the first target device having first received a beam to transmit content to the second target device having received a beam later.

In another example, the device 1000 may request the second target device having first received a beam to transmit content to the first target device having received a beam later.

A device 1000 according to an embodiment may request a server to send a content transmission request signal to the first target device that transmits, to the server, a reception signal representing that a beam has been received. When the first target device receives a beam, the first target device may transmit, to the server, a reception signal representing that a beam has been received. The server may transmit the content transmission request signal to the first target device that has received a beam earlier than the second target device. In this case, the server may transmit the content transmission request signal to the first target device in response to a request signal received from the device 1000.

A device 1000 according to another embodiment may request a server to send a content reception request signal to the second target device that transmits, to the server, a reception signal representing that a beam has been received. When the second target device receives a beam, the second target device may transmit, to the server, a reception signal representing that a beam has been received. The server may transmit the content reception request signal to the second target device that has received a beam later than the first target device. In this case, the server may transmit the content transmission request signal to the second target device in response to a request signal received from the device 1000.

Content may be transmitted from the first target device to the second target device. In this case, content may be transmitted from the first target device to the second target device as the server sends a content transmission request signal to the first target device that transmits, to the server, a reception signal representing that a beam has been received, and sends a content reception request signal to the second target device that transmits, to the server, a reception signal representing that a beam has been received.

A content transmission request signal according to an embodiment may include a signal requesting the first target device to transmit content stored therein to the second target device.

A content reception request signal according to an embodiment may include a signal requesting the second target device to receive the content transmitted by the first target device.

The beams may include motion information of the device 1000 or information about content sharing between the first target device and the second target device. The motion information of the device 1000 may include an orientation direction of the device 1000, a location change thereof, and an angle change thereof. The information about the content sharing may include identification information of the first target device or the second target device, information about content for which the first target device is requested, and information about content that is to be displayed on the second target device.

For example, beams received by target devices may include motion information of the device 1000, and a target device may predict a location of another target device corresponding to a trigger motion sensed by the device 1000 by using the motion information of the device 1000. Accordingly, a target device having received a beam may perform a wireless connection with another target device having a predicted location.

In another example, target devices may transmit notification signals to a gateway, according to the sequence in which beams are received by the target devices. Accordingly, the gateway may control transmission or reception of content between the target devices according to the beam receiving sequence.

Figure 37B:
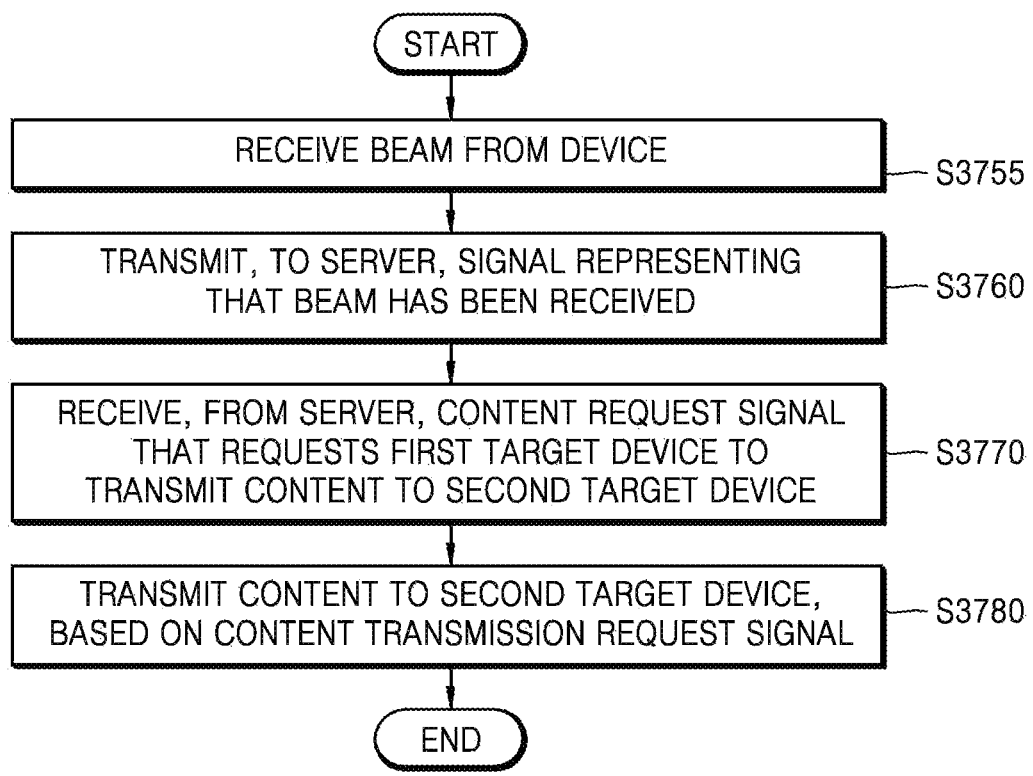
FIG. 37B is a flowchart of a method of performing a wireless connection between the target devices by using a device according to various embodiments of the present disclosure.

FIG. 37B is a flowchart of a method for performing a wireless connection between target devices by using a device according to various embodiments of the present disclosure.

Referring to FIG. 37B, in operation S3755, at least one target device may receive a beam from the device 1000. For example, a first target device may receive a first beam from the device 1000 and a second target device may receive a second beam from the device 1000. For example, as the device 1000 senses a trigger motion, beams are sequentially received by the first target device and the second target device. At this time, as in operation S3760, the first target device and the second target device respectively transmit first beam reception information and second beam reception information to a server. Beam reception information may mean a signal representing that a beam has been received.

In operation S3770, the first target device according to an embodiment may receive from the server a content request signal that requests the first target device to transmit content to the second target device. The second target device according to an embodiment may be an external target device that has received a beam. For example, the second target device may be a target device that has received a second beam.

The server may include a gateway that connects a network with the first target device and the second target device. The content transmission request signal received by the first target device from the server may include, for example, network information, unique information of the second target device, and state information of the second target device.

In operation S3780, the first target device may transmit content to the second target device, based on the content transmission request signal.

The first target device according to an embodiment may determine the content that is to be transmitted to the second target device based on the content transmission request signal. The content that is to be transmitted to the second target device may include, for example, content that is currently being displayed on the first target device, or unique information of the first target device.

An operation in the case where the first target device has received a beam may be pre-set. For example, when the first target device and the second target device receive beams, the first target device and the second target device may be previously set to share certain content according to the sequence in which the first target device and the second target device receive beams. Alternatively, when the first target device and the second target device receive beams, the first target device and the second target device may transmit beam reception information to the server according to the sequence in which the first target device and the second target device receive beams, and may be previously set to be controlled by the server content. An operation after the first target device has received a beam may be set by using a certain application or the like.

According to an embodiment of the present disclosure, the first target device may transmit determined content to the second target device. Alternatively, the first target device may transmit, to the second target device, information about content that is to be shared with the second target device.

Figure 37C:
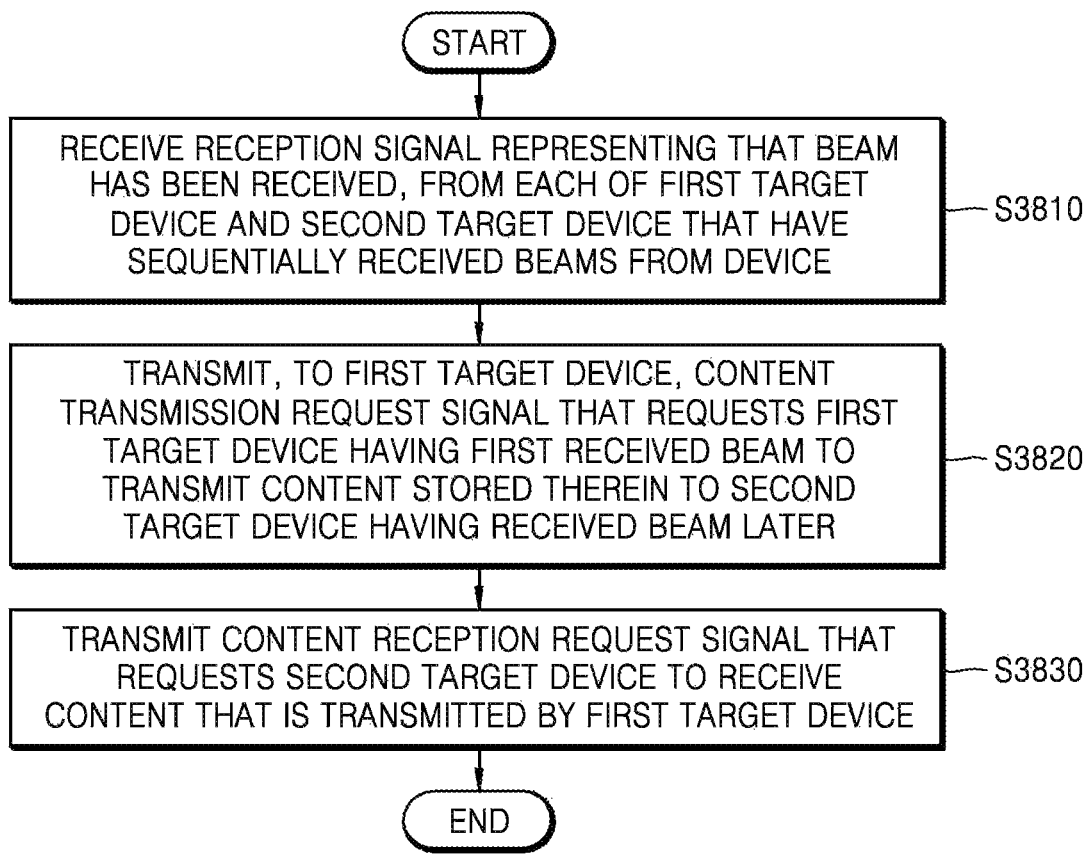
FIG. 37C is a flowchart of a method for performing a wireless connection between the target devices by using a device according to various embodiments of the present disclosure.

FIG. 37C is a flowchart of a method for performing a wireless connection between target devices by using a device according to various embodiments of the present disclosure.

Referring to FIG. 37C, in operation S3810, a server according to an embodiment receives a reception signal representing that a beam has been received, from each of the first target device and the second target device that have sequentially received beams from the device 1000.

When the first and second target devices have received beams, each of the first and second target devices may transmit, to the server, a reception signal representing that a beam has been received. The reception signal may include information about a time point when a beam has been received, information about a time point when the device 1000 has transmitted the beam, or information about a target device.

In operation S3820, the server according to an embodiment transmits, to the first target device, a content transmission request signal that requests the first target device having first received a beam to transmit content stored therein to the second target device having received a beam later. The first target device may transmit content to the second target device, based on the content transmission request signal.

In operation S3830, the server according to an embodiment transmits a content reception request signal that requests the second target device to receive the content that is transmitted by the first target device. The second target device may receive content from the first target device, based on the content reception request signal.

Various embodiments of transmitting and receiving predetermined content between the first target device and the second target device will be described in detail below with reference to FIGS. 40-41D.

Figure 38:
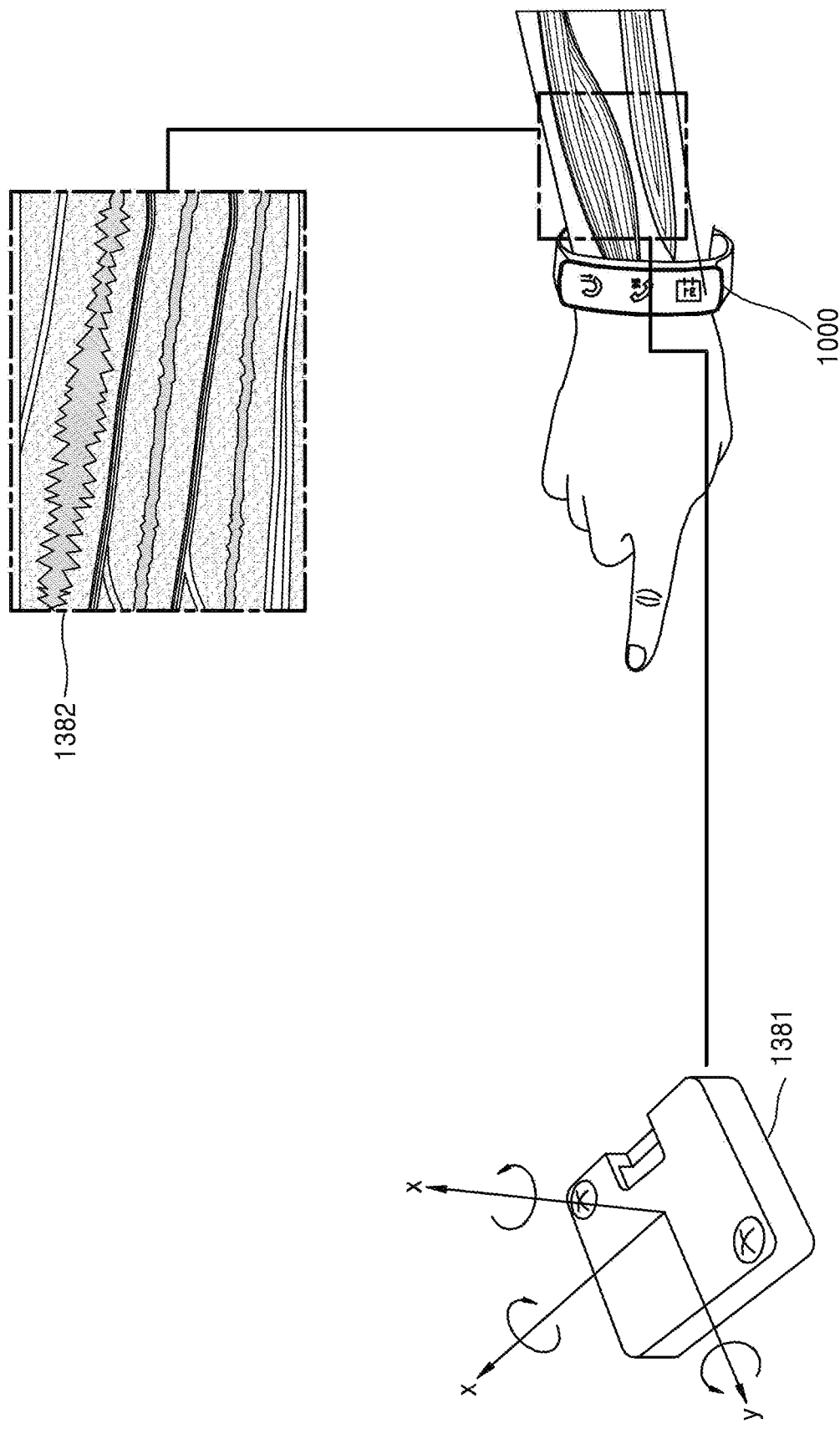
FIG. 38 illustrates a method in which a device recognizes a trigger motion according to various embodiments of the present disclosure.

FIG. 38 illustrates a method in which a device recognizes a trigger motion according to various embodiments of the present disclosure.

Referring to FIG. 38, when the trigger motion is an action of unfolding an arm with only an index finger unfolded, the device 1000 may sense whether a user makes a trigger motion, by using an electromyogram sensor 1382. Alternatively, to recognize the action of unfolding an arm with only an index finger unfolded, a motion sensor 1381 may be used. Examples of the trigger motion may include an action of unfolding an arm with only an index finger unfolded, an action of making a fist, an action of unfolding a specific finger, an action of waving an arm, and an action of pointing at an object with a hand.

The device 1000 may enhance the accuracy of recognizing the trigger motion of a user, by applying a learning algorithm to a process of repeating an operation of inputting a trigger motion.

The device 1000 includes motion information acquired by the motion sensor 1381 or the electromyogram sensor 1382 in a beam and transmits the beam including the acquired motion information to a target device, thereby controlling the target device having received the beam to perform a specific operation. The motion information of the device 1000 may include an orientation direction of the device 1000, a location change thereof, and an angle change thereof. For example, the motion information may be transmitted separately from the beam, but the device 1000 may determine whether a user takes a trigger motion, by using the motion information received by the target device. When a user takes a trigger motion for sharing a screen image of a first device 1000 with a second device, the device 1000 may specify a location of the second device by using an orientation direction of the first device and an angle change thereof that are included in motion information. In other words, the device 1000 may enable a target device to easily find a target device to or from which the former target device is to transmit or receive content, by using the motion information.

Figure 39:
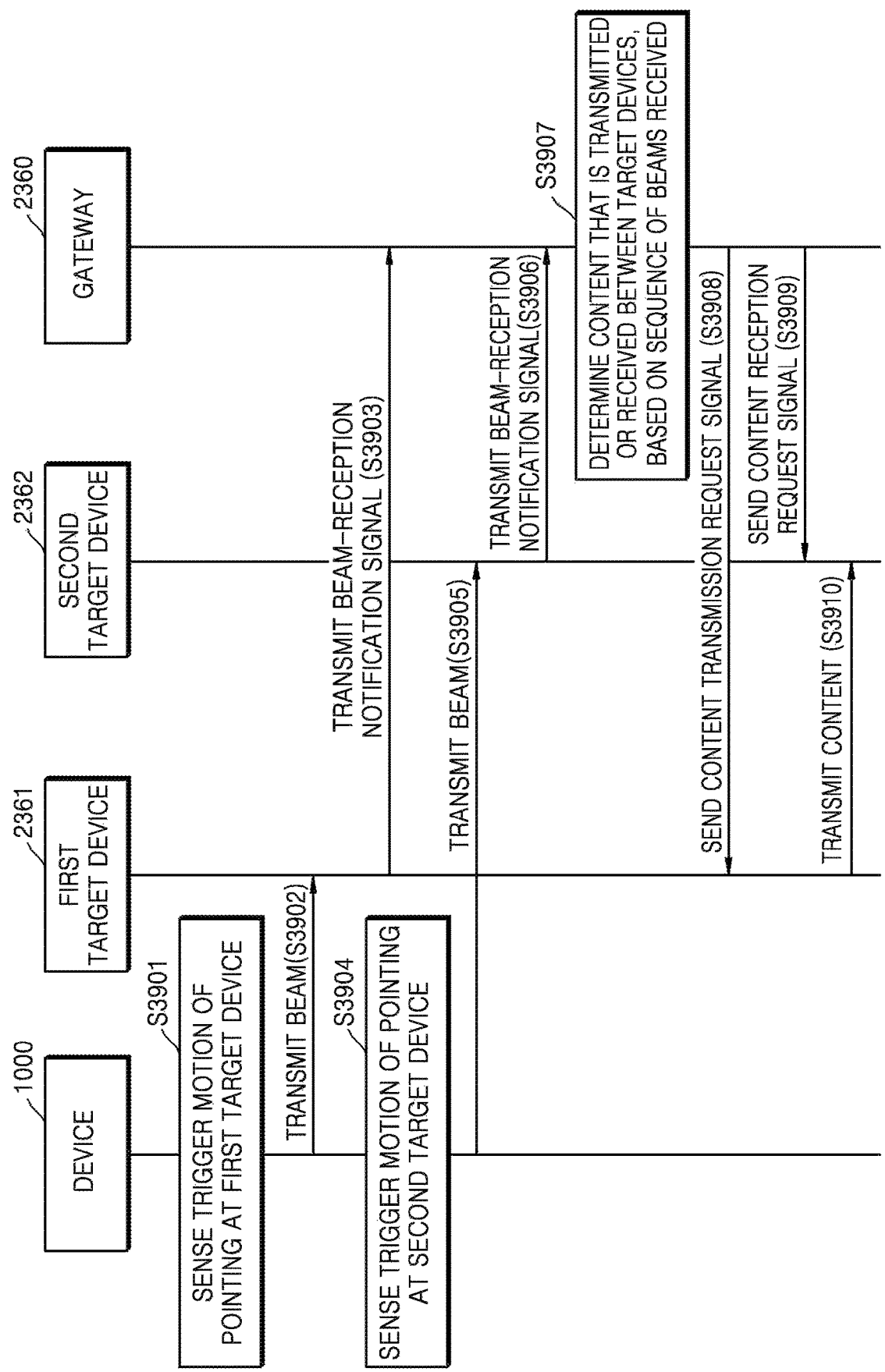
FIG. 39 is a flow diagram of another example of a method for performing a wireless connection between target devices by using a device according to various embodiments of the present disclosure.

FIG. 39 is a flow diagram of another example of a method for performing a wireless connection between target devices by using a device according to various embodiments of the present disclosure.

Referring to FIG. 39, in operation S3901, a device 1000 may sense a trigger motion of pointing at a first target device 2361. In operation S3902, the device 1000 may transmit a beam to the first target device 2361, as the trigger motion is sensed. In operation S3903, the first target device 2361 may transmit a beam reception notification signal to a gateway 2360.

Next, when the device 1000 senses a trigger motion of pointing at a second target device 2362 in operation S3904, the device 1000 may transmit a beam to the second target device 2362, in operation S3905. In operation S3906, the second target device 2362 may transmit a beam reception notification signal to the gateway 2360.

In operation S3907, the gateway 2360 may determine content that is transmitted or received between target devices, based on the sequence of beams received. For example, the gateway 2360 may transmit or receive a request signal such that media content being reproduced by the first target device 2361 having first received a beam may be shared with the second target device 2362. In this case, in operation S3908, the gateway 2360 may send a content transmission request signal to the first target device 2361. In operation S3909, the gateway 2360 may send a content reception request signal to the second target device 2362. According to the content transmission request signal and the content reception request signal, the first target device 2361 may transmit content to the second target device 2362, in operation S3910.

In the aforementioned embodiment of the present disclosure, when a first target device and a second target device receive beams, content that is to be transmitted or received is determined. However, embodiments are not limited thereto. For example, even when the first target device fails to receive a beam and only the second target device receives a beam due to an obstruction such as an indoor environment, the second target device may determine the first target device by using motion information included in the beam. The second target device may receive content from the determined first target device.

Figure 40:
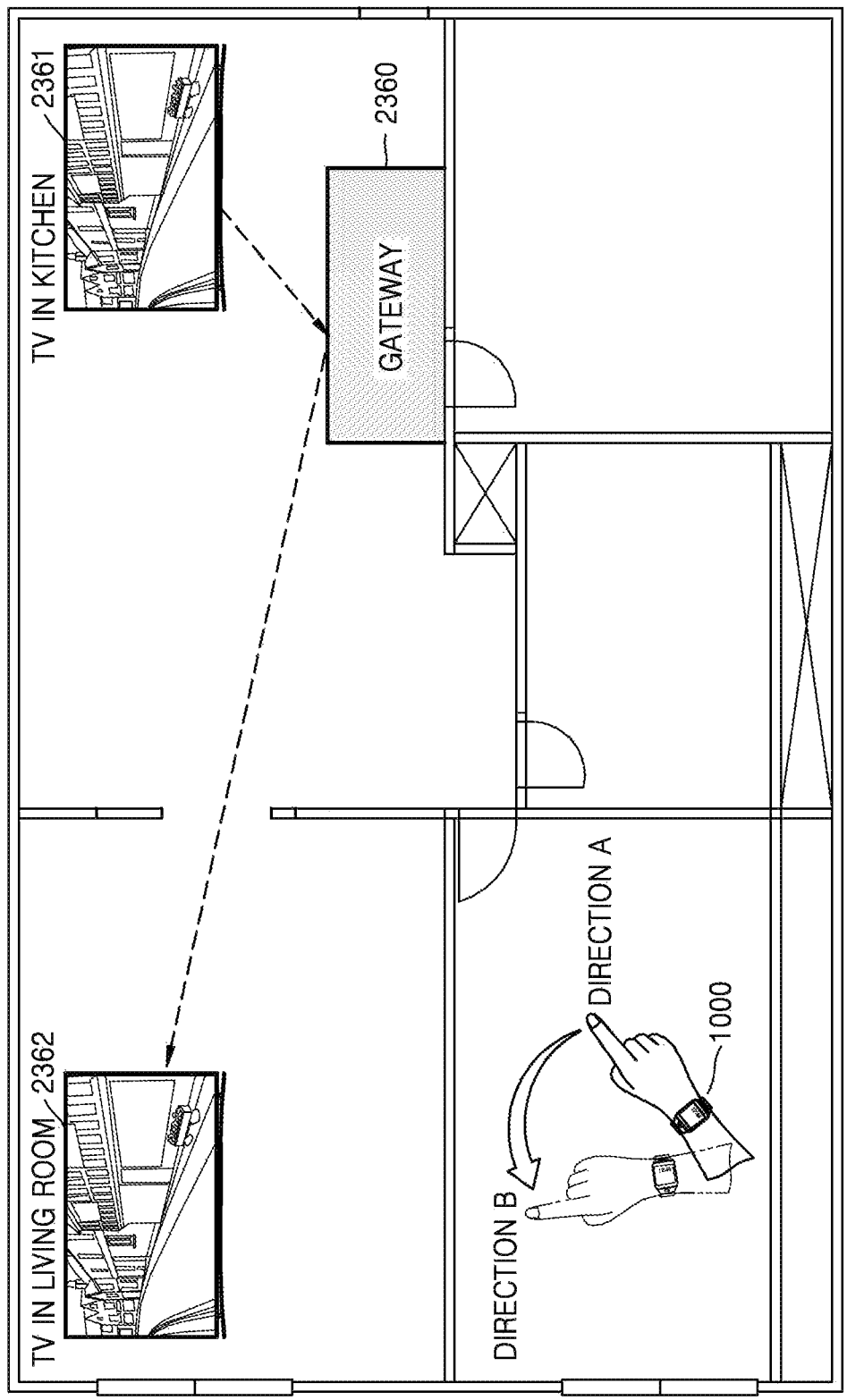
FIG. 40 illustrates another example of performing a wireless connection between target devices by using a device according to various embodiments of the present disclosure.

FIG. 40 illustrates another example of performing a wireless connection between target devices by using a device according to various embodiments of the present disclosure.

Referring to FIG. 40, when the device 1000 may transmit beams to the first and second target devices 2361 and 2362 as the device 1000 senses a trigger motion (direction A→direction B), the device 1000 may also transmit motion information (direction and angle) to the first and second target devices 2361 and 2362. Thus, when the first target device 2361, the second target device 2362, or the gateway 2360 receives a beam signal, the device 1000 may estimate locations of the first target device 2361 and the second target device 2362. In other words, even when the first target device 2361 fails to receive a beam due to obstructions and distance restrictions, the gateway 2360 may ascertain the location of the first target device 2361, based on the motion information.

Based on the ascertained location of the first target device 2361, the gateway 2360 may control content to be transmitted from the first target device 2361 to the second target device 2362.

Accordingly, even content transmission to target devices that user's eyes do not reach may be performed, and thus spatial restrictions may be reduced.

Although FIG. 40 illustrates an example in which content is transmitted between the first and second target devices 2361 and 2362 each having a display, embodiments are not limited to this embodiment of the present disclosure, and the device 1000 may control a wireless connection to be performed between a target device having no displays and a target device having a display.

Figure 41A:
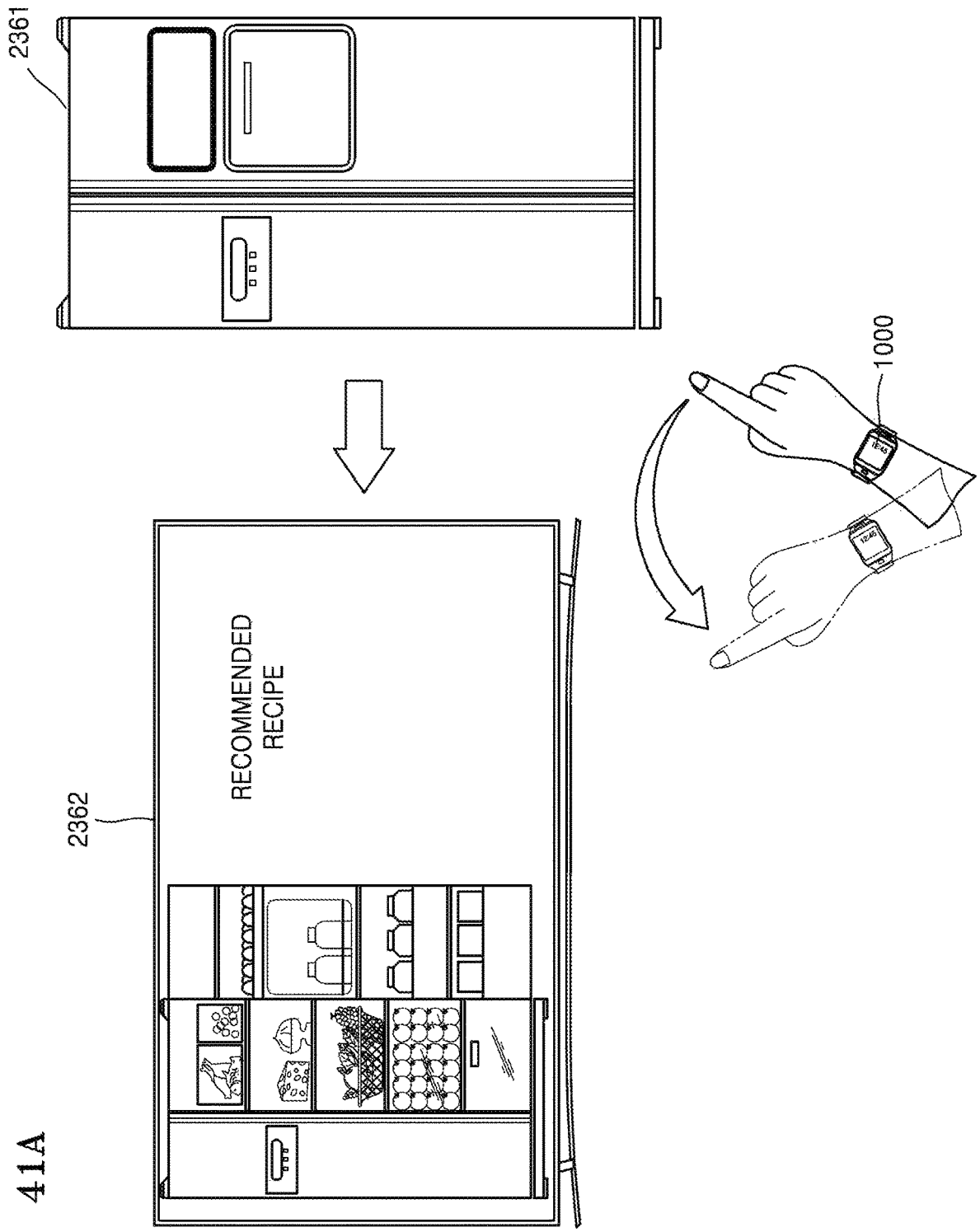

FIGS. 41A to 42 illustrate examples performing a wireless connection between target devices by using a device according to various embodiments of the present disclosure.

Referring to FIG. 41A, when only the second target device 2362 from among the first and second target devices 2361 and 2362 determined to transmit or receive content therebetween includes a display according to various embodiments of the present disclosure, unique information of the first target device 2361 may be displayed on the display of the second target device 2362, based on a trigger motion of the device 1000.

The unique information may mean unique information including, for example, a specification of the target device 2631, a current status thereof, and a manipulation interface thereof.

For example, when the first target device 2361 is a refrigerator and the second target device 2362 is a TV, the second target device 2362 may display a current temperature or operating mode of the refrigerator or information (for example, a recommended recipe) related with the food preserved in the refrigerator. Thus, in the internet of things (IoT) environment, a trigger motion of the device 1000 is sensed and thus information about a target device including no displays may be displayed on a target device including a display.

The first target device 2361 may be, for example, a washing machine, a dish washer/drier, a cleaner, an air-conditioner, an oven, a gas stove, a humidifier, a dehumidifier, or an air cleaner.

Figure 41B:
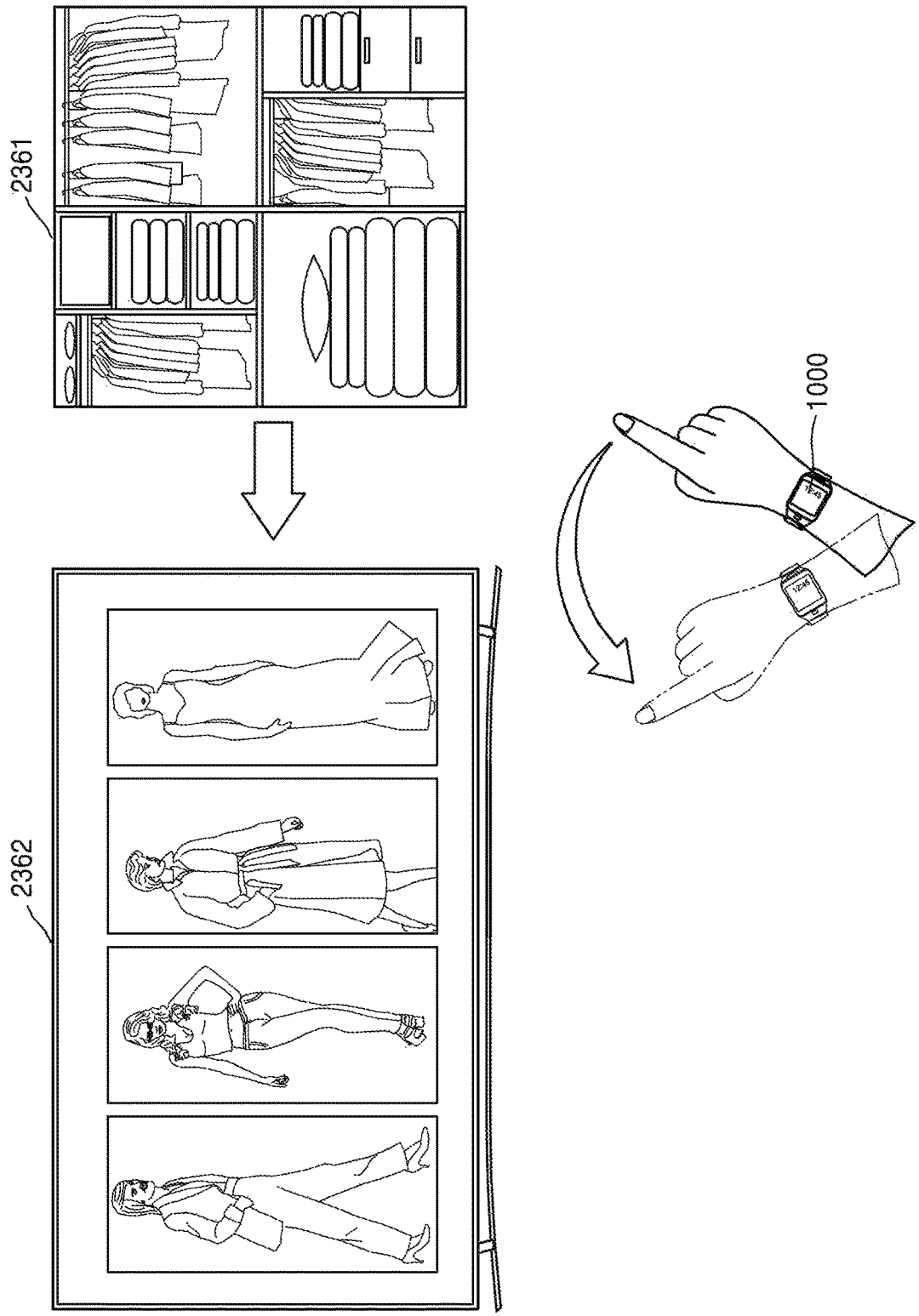

Referring to FIG. 41B, when the first target device 2361 is an air-conditioner/heater, a setting temperature and an indoor temperature of the air-conditioner/heater, for example, may be displayed on the second target device 2362.

When unique information of the first target device 2361 is displayed on the second target device 2362, an interface for adjusting the settings of the first target device 2361 may be additionally displayed, and thus the second target device 2362 may change the settings of the first target device 2361 (for example, temperature control of a refrigerator).

In another example, when the first target device 2361 is a washing machine, unique information of the washing machine (for example, a cleaning mode, a period of time left until cleaning completion, and the amount of laundry) may be displayed on the second target device 2362.

In another example, when the first target device 2361 is a dish washer/drier, operational status information of the dish washer/drier may be displayed on the second target device 2362.

In another example, when the first target device 2361 is a cleaner, filter information and charging information of the cleaner, for example, may be displayed on the second target device 2362.

In another example, when the first target device 2361 is an oven/gas stove, temperature information and working or non-working of the oven/gas stove, for example, may be displayed on the second target device 2362.

The first target device 2361 is not limited to these examples, and the first target device 2361 may be any of various devices of which unique information and an interface may be displayed on the second target device 2362.

Referring to FIG. 41C, even when the first target device 2361 from among the first and second target devices 2361 and 2362 determined to transmit or receive content therebetween is a fixed type furniture according to various embodiments of the present disclosure, unique information of the first target device 2361 may be displayed on the display of the second target device 2362, based on a trigger motion of the device 1000.

For example, when the first target device 2361 is a wardrobe, information about clothes kept in the wardrobe may be transmitted to the second target device 2362, and the second target device 2362 may display, for example, a list of the clothes kept in the wardrobe or coordination of clothes. For example, coordination recommended in consideration of an external temperature and weather may be displayed on the second target device 2362.

In another example, when the first target device 2361 is a laundry basket, information about laundry may be transmitted to the second target device 2362, and the second target device 2362 may display the information about the laundry. Alternatively, recommended cleaning methods for different types of laundry may be displayed on the second target device 2362.

In another example, when the first target device 2361 is a drawer, information about the objects contained in the drawer may be transmitted to the second target device 2362, and the second target device 2362 may display the information about the objects contained in the drawer.

In another example, when the first target device 2361 is a desk, a dressing table, or a table, information about the objects contained in the desk, the dressing table, or the table may be transmitted to the second target device 2362, and the second target device 2362 may display the information about the objects contained in the desk, the dressing table, or the table drawer.

Figure 41D:
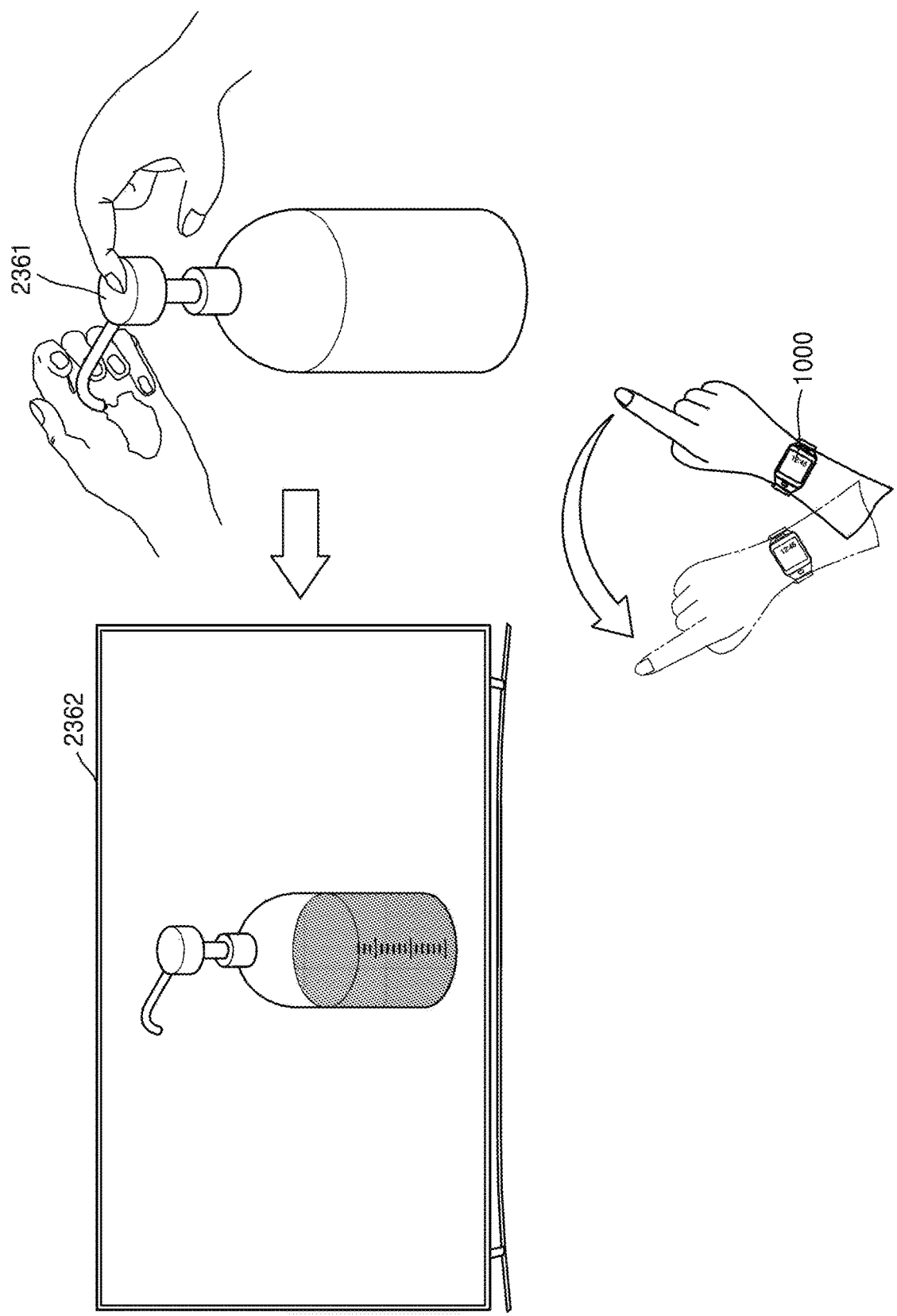

Referring to FIG. 41D, even when the first target device 2361 from among the first and second target devices 2361 and 2362 determined to transmit or receive content therebetween is consumer goods, such as a shampoo, a detergent, or cosmetics, according to various embodiments of the present disclosure, unique information of the first target device 2361 may be displayed on the display of the second target device 2362, based on a trigger motion of the device 1000.

For example, when the first target device 2361 is a shampoo, the second target device 2362 may display, for example, the residual quantity of the shampoo and the state thereof.

In the aforementioned embodiments of the present disclosure, when the first target device 2361 is a device having no wireless communication functions, the above-described operations may be executed via an additional device capable of collecting and transmitting unique information of the first target device 2361 and receiving a signal for changing settings from an external input. The additional device may be a patch that may be attached to the first target device 2361. This patch may include a processor for remote control or an output unit for providing an interface. Furthermore, the patch may further include functions such as motion recognition, residual check, location confirm, environment sensing, heat sensing, approach sensing, and open sensing.

For example, a patch including a remote control function may be attached to, for example, an air-conditioner, an illuminator, a robot cleaner, an audio player, or a set-top box, and thus the second target device 2362 may remotely control the first target device 2361. A patch including an interfacing function may be attached to various indoor locations and thus may receive or display a user input. A patch including a motion sensing function may be attached to a medicine container, sporting goods, a sleeping bed, a toothbrush, or the like and thus may determine use or non-use of the medicine container, the sporting goods, the sleeping bed, the toothbrush, or the like. A residual check patch may be attached to a rice container, a food storage container, a shampoo container, cosmetics, or the like and thus may determine the residual quantity of rice, food, shampoo, and cosmetics. A patch including a location confirm function may be attached to a key, a wallet, a remote controller, valuables, a bag, a digital camera, or the like and thus may determine the location of the key, the wallet, the remote controller, the valuables, the bag, the digital camera, or the like. A patch including an environment sensing function may be attached to a gas valve, a food storage container, a wardrobe, a wall, or the like and thus may determine leakage or non-leakage of gas, temperature/humidity, illuminance, or the like. A patch including a heat sensing function may be attached to a baby bottle, an iron, a heater, a gas stove, a multi-tap, or the like and thus may determine the temperature of the baby bottle, the iron, the heater, the gas stove, the multi-tap, or the like. A patch including an approach sensing function may be attached to a dangerous space/product (for babies), a safety deposit box, or the like and thus may determine whether a human or an object approaches the dangerous space/product (for babies), the safety deposit box, or the like. A patch including an open sensing function may be attached to a front door, a window, a refrigerator, a safety deposit box, or the like and thus may determine whether the front door, the window, the refrigerator, the safety deposit box, or the like is open.

Referring to FIG. 42, when a device 1000 according to various embodiments controls data to be transmitted or received between a first target device 2361 and a second target device 2362 as the device 1000 senses a trigger motion of a user, a popup window 2420 asking to perform device connection may be displayed on each of the screens of the first and second target devices 2361 and 2362 before data is transmitted or received between the first target device 2361 and the second target device 2362, because a target device undesired by the user may be determined to transmit or receive data according to the trigger motion. Thus, the first and second target devices 2361 and 2362 may show information about a connection-target device and it may be confirmed whether content is shared, via the pop-up windows 2420.

The device 1000, the first target device 2361, and the second target device 2362 may enhance the accuracy of a wireless connection between target devices according to a trigger motion of a user by applying a learning algorithm to a process of repeating an operation of selecting a target device desired by the user via the pop-up windows 2420.

In another example, each of the pop-up windows 2420 may include an authentication window for performing an authentication procedure in order to transmit or receive data between the first target device 2361 and the second target device 2362.

Figure 43:
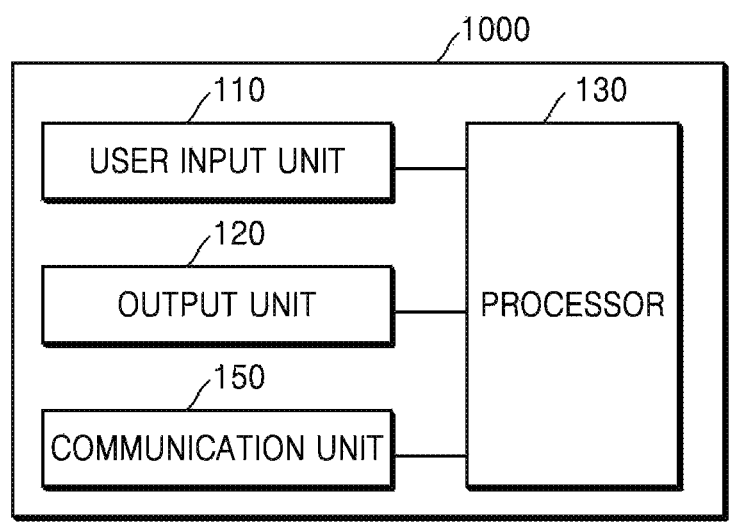
FIGS. 43 and 44 are block diagrams of a device according to various embodiments of the present disclosure.
Figure 44:
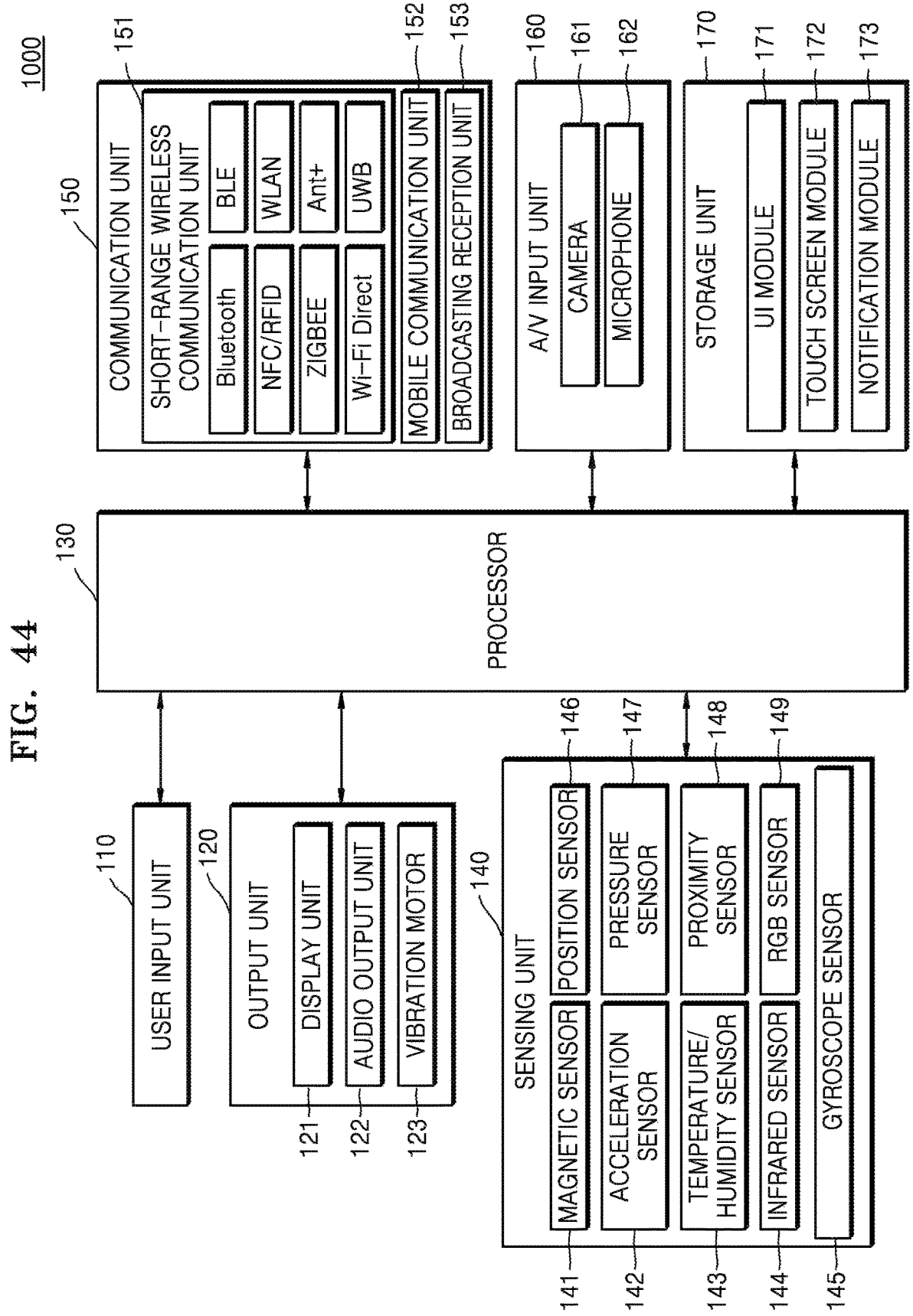

FIGS. 43 and 44 are block diagrams of a device according to various embodiments of the present disclosure.

The device 1000 and the target device 2000 are capable of performing the above-described methods of performing a wireless connection with the target device 2000 according to a front direction of the device 1000, and thus the device 1000 and the target device 2000 may implement all embodiments for performing the above-described methods of performing wireless connection. Thus, although omitted, the matters described above with reference to FIGS. 1-35 may be performed via the device 1000 and the target device 2000 illustrated in FIGS. 36-38.

Referring to FIG. 43, the device 1000 may include a user input unit 110, an output unit 120, a processor 130, and a communication unit 150. More or less components than those illustrated in FIG. 43 may constitute the device 1000.

Referring to FIG. 44, the device 1000 may further include a user input unit 110, a sensing unit 140, a communication unit 150, an audio/video (A/V) input unit 160, and a storage unit 170.

The user input unit 110 denotes a unit via which a user inputs data for controlling the device 1000. For example, the user input unit 110 may be, but not limited to, a key pad, a dome switch, a touch pad (e.g., a capacitive overlay type, a resistive overlay type, an IR beam type, an integral strain gauge type, a surface acoustic wave type, a piezo electric type, or the like), a jog wheel, or a jog switch.

The user input unit 110 may receive a user input for searching for target devices, and a user input for determining whether to maintain a wireless connection with a target device.

The output unit 120 may output an audio signal, a video signal, or a vibration signal, and may include a display 121, an audio output unit 122, and a vibration motor 123. According to various embodiments of the present disclosure, the output unit 120 may output received sound content and received image content.

The display 121 displays information that is processed by the device 1000. For example, the display 121 may output content received from a target device and may display an interface for controlling the target device.

When the display 121 forms a layer structure together with a touch pad to construct a touch screen, the display 121 may be used as an input device as well as an output device. The display 121 may include at least one of a liquid crystal display (LCD), a thin film transistor-liquid crystal display (TFT-LCD), an organic light-emitting diode (OLED), a flexible display, a 3D display, and an electrophoretic display. According to embodiments of the device 1000, the device 1000 may include at least two displays 121. The at least two displays 121 may be disposed to face each other by using a hinge.

The audio output unit 122 may output audio data that is received from the communication unit 150 or stored in the storage unit 170. The audio output unit 122 may also output an audio signal (for example, a call signal receiving sound, a message receiving sound, a notification sound) related with a function of the device 1000. The audio output unit 122 may include, for example, a speaker and a buzzer.

The vibration motor 123 may output a vibration signal. For example, the vibration motor 123 may output a vibration signal corresponding to an output of audio data or video data (for example, a call signal receiving sound or a message receiving sound). The vibration motor 123 may also output a vibration signal when a touch screen is touched.

The processor 130 typically controls all operations of the device 1000. For example, the processor 130 may control the user input unit 110, the output unit 120, the sensing unit 140, the communication unit 150, the A/V input unit 160, and the like by executing programs stored in the storage unit 170.

In detail, the processor 130 may search for at least one target device located in an orientation region of the device 1000 as a first input signal is received, determine a target device located in a front direction of the device 1000 from among found at least one target device, control a wireless connection with the determined target device to be performed, and determine whether to maintain the wireless connection with the determined target device as a second input signal is received. The processor 130 may use direction information of antennas respectively included in the device 1000 and the target device, which is received during beamforming of the communication unit 150, in order to determine the target device located in the front direction.

The processor 130 may also control the output unit 120 to output the content received from the determined target device. The processor 130 may determine content that is reproducible by the device 1000, and may receive the determined content from the target device.

The processor 130 may also control content respectively received from a plurality of target devices to be mixed in real time based on distances to the plurality of target devices and directions of the plurality of target devices and be output.

When a plurality of target devices are located in the front direction, the processor 130 may determine whether to maintain wireless connections with the plurality of target devices located in the front direction, as a third input is received.

The processor 130 may control data of a first target device wirelessly connected to the device 1000 to be transmitted to a second target device wirelessly connected to the device 1000.

When the wireless connection with a target device is determined to be maintained, the processor 130 performs authentication with respect to the target device of which the wireless connection is maintained. When the authentication is completed, the processor may control authentication content to be received from the target device.

The processor 130 may transmit a beam to the at least one target device as a trigger motion is sensed, and control content to be transmitted or received between target devices that have received beams.

The sensing unit 140 may sense the status of the device 1000 or the status of the surrounding of the device 1000 and may transmit information corresponding to the sensed status to the processor 130.

The sensing unit 140 may include, but is not limited thereto, at least one selected from a magnetic sensor 141, an acceleration sensor 142, a temperature/humidity sensor 143, an IR sensor 144, a gyroscope sensor 145, a position sensor (e.g., a GPS) 146, a pressure sensor 147, a proximity sensor 148, and an RGB sensor 149 (i.e., an illumination sensor). Functions of most of the sensors are understood by one of ordinary skill in the art in view of their names and thus detailed descriptions thereof will be omitted herein.

The communication unit 150 may include at least one component that enables communication between the device 1000 and the target device 2000. For example, the communicator 150 may include a short-range wireless communication unit 151, a mobile communication unit 152, and a broadcasting reception unit 153.

The short-range wireless communication unit 151 may include, but is not limited to, a Bluetooth device, a Bluetooth low energy (BLE) communicator, a near field communication (NFC) unit, a wireless local area network (WLAN) (e.g., Wi-Fi) communicator, a WiGig communicator, a ZigBee communicator, an infrared Data Association (IrDA) communicator, a Wi-Fi direct (WFD) communicator, an ultra wideband (UWB) communicator, an Ant+ communicator, and the like.

The communication unit 150 may transmit or receive a beam having directivity, such as IR light or ultrasound waves. The beam may include motion information of the device 1000.

The mobile communication unit 152 may exchange a wireless signal with at least one selected from a base station, an external terminal, and a server on a mobile communication network. Examples of the wireless signal may include a voice call signal, a video call signal, and various types of data generated during a short message service (SMS)/multimedia messaging service (MMS).

The broadcasting reception unit 153 receives a broadcasting signal and/or broadcasting-related information from an external source via a broadcasting channel. The broadcasting channel may be a satellite channel, a ground wave channel, or the like. According to embodiments of the present disclosure, the device 1000 may not include the broadcasting reception unit 153.

The communication unit 150 may communicate with the target device 2000 in order to display the windows included in a work group.

The A/V input unit 160 inputs an audio signal or a video signal, and may include, for example, the camera 161 and a microphone 162. The camera 161 may acquire an image frame, such as a still image or a moving picture, via an image sensor in a video call mode or a photography mode. An image captured via the image sensor may be processed by the processor 130 or a separate image processor (not shown).

The image frame obtained by the camera 161 may be stored in the storage unit 170 or transmitted to the outside via the communication unit 150. At least two cameras may be included according to embodiments of the structure of a terminal.

The microphone 162 receives an external audio signal and converts the external audio signal into electrical audio data. For example, the microphone 162 may receive an audio signal from an external device or a speaking person. The microphone 162 may use various noise removal algorithms in order to remove noise that is generated while receiving the external audio signal.

The storage unit 170 may store a program used by the processor 130 to perform processing and control, and may also store data that is input to or output from the device 1000.

The storage unit 170 may include at least one type of storage medium selected from among a flash memory type, a hard disk type, a multimedia card micro type, a card type memory (for example, a secure digital (SD) or extreme digital (XD) memory), a random access memory (RAM), a static random access memory (SRAM), a read-only memory (ROM), an electrically erasable programmable ROM (EEPROM), a programmable ROM (PROM), magnetic memory, a magnetic disk, and an optical disk.

The programs stored in the storage unit 170 may be classified into a plurality of modules according to their functions, for example, a UI module 171, a touch screen module 172, and a notification module 173.

The UI module 171 may provide a UI, GUI, or the like that is specialized for each application and interoperates with the device 1000. The touch screen module 172 may detect a touch gesture on a touch screen of a user and transmit information regarding the touch gesture to the processor 130. The touch screen module 172 according to various embodiments may recognize and analyze a touch code. The touch screen module 172 may be configured by separate hardware including a controller.

In order to detect the actual touch or the proximate touch on the touch pad, the touch screen may internally or externally have various sensors. An example of a sensor used to detect the real touch or the proximity touch on the touch screen is a tactile sensor. The tactile sensor denotes a sensor that detects a touch by a specific object to a degree to which a human feels or more. The tactile sensor may detect various types of information, such as the roughness of a touched surface, the hardness of the touching object, the temperature of a touched point, and the like.

Another example of a sensor used to detect the real touch or the proximity touch on the touch screen is a proximity sensor.

The proximity sensor is a sensor that detects the existence of an object that approaches a predetermined detection surface or that exists nearby, by using an electromagnetic force or IR rays, without using any mechanical contact. Examples of the proximity sensor include a transmission-type photoelectric sensor, a direct reflection-type photoelectric sensor, a mirror reflection-type photoelectric sensor, a high frequency oscillation-type proximity sensor, a capacity-type proximity sensor, a magnetic proximity sensor, an infrared-type proximity sensor, or the like. Examples of the touch gesture of the user may include tap, touch and hold, double tap, drag, panning, flick, drag and drop, swipe, and the like.

The notification module 173 may generate a signal for notifying that an event has been generated in the device 1000. Examples of the event generated in the device 1000 may include call signal receiving, message receiving, a key signal input, schedule notification, and the like. The notification module 173 may output a notification signal in the form of a video signal via the display unit 121, in the form of an audio signal via an audio output unit 122, or in the form of a vibration signal via a vibration motor 123.

Figure 45:
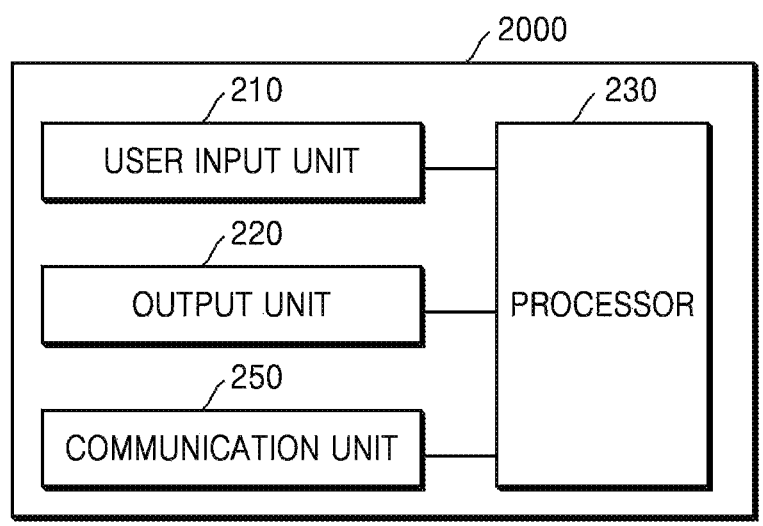
FIG. 45 is a block diagram of a target device according to various embodiments of the present disclosure.

FIG. 45 is a block diagram of a target device according to various embodiments of the present disclosure.

Referring to FIG. 45, a target device 2000 may include a user input unit 210, an output unit 220, a processor 230, and a communication unit 250.

The user input unit 210, the output unit 220, the processor 230, and the communication unit 250 are the same as the user input unit 110, the output unit 120, the processor 130, and the communication unit 150 of the device 1000, respectively, and thus detailed description thereof will be omitted.

The present disclosure can also be embodied as a storage medium including instruction codes executable by a computer such as a program module executed by the computer. A computer readable medium can be any usable medium which can be accessed by the computer and includes all volatile/non-volatile and removable/non-removable media. Further, the computer readable medium may include all computer storage and communication media. The computer storage medium includes all volatile/non-volatile and removable/non-removable media embodied by a certain method or technology for storing information such as computer readable instruction code, a data structure, a program module or other data. The communication medium typically includes the computer readable instruction code, the data structure, the program module, or other data of a modulated data signal such as a carrier wave, or other transmission mechanism, and includes any information transmission medium.

A "unit" used herein may be a hardware component such as a processor or a circuit, and/or a software component that is executed by a hardware component such as a processor.

Although the embodiments of the present disclosure have been disclosed for illustrative purposes, one of ordinary skill in the art will appreciate that diverse variations and modifications are possible, without departing from the spirit and scope of the disclosure. Thus, the above embodiments should be understood not to be restrictive but to be illustrative, in all aspects. For example, respective elements described in an integrated form may be dividedly used, and the divided elements may be used in a state of being combined.

The various embodiments should be considered in a descriptive sense only and not for purposes of limitation. Descriptions of features or aspects within each embodiment should typically be considered as available for other similar features or aspects in other embodiments.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. A method of receiving content from a target device, the method comprising:
   receiving, at a mobile communication device, a first input by a user;
   searching for a plurality of target devices located in an orientation region that is based on a direction in which the mobile communication device is oriented, in response to the first input;
   based on a wireless connection between the mobile communication device and the plurality of target devices via a first communication protocol, displaying a plurality of display portions corresponding to the plurality of target devices, respectively, wherein each of the plurality of display portions has a same shape and includes a different image specific thereto identifying a respective target device of the plurality of target devices by other than the image comprising an alphanumeric target device identifier and other than the image comprising a visual representation of a physical appearance of the respective target device;
   based on a determination of a target device among the plurality of target devices that is most in a front direction in which the mobile communication device is oriented while changing the direction in which the mobile communication device is oriented, displaying a display portion, which corresponds to the target device among the plurality of target devices that is most in the direction in which the mobile communication device is oriented, with an enlarged size of a same display portion;
   selecting the target device in response to a second input;
   wirelessly receiving a preview content directly from the target device with a second communication protocol different from the first communication protocol;
   wirelessly receiving, with the second communication protocol, content corresponding to the preview content directly from the target device in response to a determination of receiving the content corresponding to the preview content from the target device;
   receiving second content from a second target device located in the front direction of the mobile communication device; and
   simultaneously outputting, at the mobile communication device, mixed content which contains the content corresponding to the preview content and the second content.

2. The method of claim 1, further comprising:
   establishing a wireless connection between the mobile communication device and the target device based on the selecting of the target device.

3. The method of claim 1, further comprising
   displaying an indication of a wireless connection between the mobile communication device and the target device via augmented reality.

4. The method of claim 1, further comprising:
   establishing wireless connections with each of the plurality of target devices based on the direction in which the mobile communication device is oriented; and
   disconnecting the wireless connections with the plurality of target devices other than the target device most in the direction in which the mobile communication device is oriented, based on the second input.

5. The method of claim 1, further comprising:
   displaying, on a screen, a representation of whether to connect with the target device before the receiving of the content.

6. The method of claim 1, further comprising:
   establishing the wireless connection between the mobile communication device and the plurality of target devices via the first communication protocol.

7. The method of claim 6, further comprising:
   displaying, at the mobile communication device, all of the plurality of target devices with which the mobile communication device is capable of communicating content through a wireless connection.

8. The method of claim 1, further comprising:
   providing a user interface for interacting with the target device.

9. The method of claim 1, wherein a data amount of the preview content is less than a data amount of the content.

10. A mobile communication device comprising:
    a user input device;
    at least one processor configured to:
      receive a first input via the user input device,
      search for a plurality of target devices located in an orientation region that is based on a direction in which the mobile communication device is oriented, in response to the first input,
      based on a wireless connection between the mobile communication device and the plurality of target devices via a first communication protocol, control to display a plurality of display portions corresponding to the plurality of target devices, respectively, wherein each of the plurality of display portions has a same shape and includes a different image specific thereto identifying a respective target device of the plurality of target devices by other than the image comprising an alphanumeric target device identifier and other than the image comprising a visual representation of a physical appearance of the respective target device, based on a determination of a target device among the plurality of target devices that is most in a front direction in which the mobile communication device is oriented while changing the direction in which the mobile communication device is oriented, display a display portion, which corresponds to the target device among the plurality of target devices that is most in the direction in which the mobile communication device is oriented, with an enlarged size of a same display portion, and select the target device in response to a second input;

a transceiver configured to:
 wirelessly receive a preview content directly from the target device with a second communication protocol different from the first communication protocol,
 wirelessly receive, with the second communication protocol, content corresponding to the preview content directly from the target device in response to a determination of receiving the content corresponding to the preview content from the target device, and
 receive second content from a second target device located in the front direction of the mobile communication device; and an output device configured to simultaneously output, at the mobile communication device, mixed content containing the content corresponding to the preview content and the second content.

11. The mobile communication device of claim 10, wherein the at least one processor is further configured to control to display, on a screen, a representation of whether to connect with the target device before the content is transmitted.

12. The mobile communication device of claim 10, wherein the at least one processor is further configured to establish the wireless connection between the mobile communication device and the plurality of target devices via the first communication protocol.

13. The mobile communication device of claim 10, wherein the at least one processor is further configured to:
 establish wireless connections with each of the plurality of target devices based on the direction in which the mobile communication device is oriented, and
 disconnect the wireless connections with the plurality of target devices other than the target device most in the direction in which the mobile communication device is oriented, based on the second input.

14. A non-transitory computer-readable recording medium having recorded thereon a computer program, which, when executed by at least one processor of a mobile communication device, causes the at least one processor to:
 control to receive, at the mobile communication device, a first input by a user;
 search for a plurality of target devices located in an orientation region that is based on a direction in which the mobile communication device is oriented, in response to the first input;
 based on a wireless connection between the mobile communication device and the plurality of target devices via a first communication protocol, display a plurality of display portions corresponding to the plurality of target devices, respectively, wherein each of the plurality of display portions has a same shape and includes a different image specific thereto identifying a respective target device of the plurality of target devices by other than the image comprising an alphanumeric target device identifier and other than the image comprising a visual representation of a physical appearance of the respective target device;
 based on a determination of a target device among the plurality of target devices that is most in a front direction in which the mobile communication device is oriented while changing the direction in which the mobile communication device is oriented, displaying a display portion, which corresponds to the target device among the plurality of target devices that is most in the direction in which the mobile communication device is oriented, with an enlarged size of a same display portion;
 select the target device in response to a second input;
 control to wirelessly receive a preview content directly from the target device with a second communication protocol different from the first communication protocol;
 control to wirelessly receive, with the second communication protocol, content corresponding to the preview content directly from the target device in response to a determination of receiving the content corresponding to the preview content to the target device;
 control to receive second content from a second target device located in the front direction of the mobile communication device; and
 control to simultaneously output, at the mobile communication device, mixed content which contains the content corresponding to the preview content and the second content.

* * * * *